(12) United States Patent
Niwa et al.

(10) Patent No.: US 11,910,108 B2
(45) Date of Patent: Feb. 20, 2024

(54) SOLID-STATE IMAGING APPARATUS AND IMAGING APPARATUS

(71) Applicant: SONY SEMICONDUCTOR SOLUTIONS CORPORATION, Kanagawa (JP)

(72) Inventors: Atsumi Niwa, Kanagawa (JP); Motonari Honda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/153,488

(22) Filed: Jan. 12, 2023

(65) Prior Publication Data
US 2023/0141384 A1    May 11, 2023

Related U.S. Application Data

(63) Continuation of application No. 17/424,684, filed as application No. PCT/JP2020/002412 on Jan. 23, 2020, now Pat. No. 11,558,565.

(30) Foreign Application Priority Data

Jan. 31, 2019 (JP) .................. 2019-016465
Apr. 26, 2019 (JP) .................. 2019-086853

(51) Int. Cl.
*H04N 25/40* (2023.01)
*H04N 25/44* (2023.01)
(Continued)

(52) U.S. Cl.
CPC ............. *H04N 25/40* (2023.01); *H04N 25/00* (2023.01); *H04N 25/44* (2023.01);
(Continued)

(58) Field of Classification Search
CPC ........ H04N 5/335; H04N 5/341; H04N 5/345; H04N 5/3454; H04N 5/3456; H04N 5/376;
(Continued)

(56) References Cited

U.S. PATENT DOCUMENTS

| | | | |
|---|---|---|---|
| 2014/0009648 A1* | 1/2014 | Kim ...................... | H04N 25/42 348/272 |
| 2016/0093273 A1 | 3/2016 | Wang et al. | |

(Continued)

FOREIGN PATENT DOCUMENTS

| | | |
|---|---|---|
| CN | 107079115 A | 8/2017 |
| CN | 108370424 A | 8/2018 |

(Continued)

OTHER PUBLICATIONS

International Search Report and Written Opinion of PCT Application No. PCT/JP2020/002412, dated Apr. 14, 2020, 10 pages of English Translation and 07 pages of ISRWO.

(Continued)

*Primary Examiner* — Lin Ye
*Assistant Examiner* — Chriss S Yoder, III
(74) *Attorney, Agent, or Firm* — CHIP LAW GROUP

(57) ABSTRACT

Time deviation between event detection and gradation acquisition is reduced. A solid-state imaging apparatus according to an embodiment includes: a pixel array unit (300) including a plurality of pixel blocks (310) arrayed in a matrix; and a drive circuit (211) that generates a pixel signal in a first pixel block in which firing of an address event has been detected among the plurality of pixel blocks, each of the plurality of pixel blocks including a first photoelectric conversion element (331) that generates an electric charge according to an amount of incident light, a detection unit (400) that detects the firing of the address event based (Continued)

on the electric charge generated in the first photoelectric conversion element, a second photoelectric conversion element (321) that generates an electric charge according to an amount of incident light, and a pixel circuit (322, 323, 324, 325, 326) that generates a pixel signal based on the electric charge generated in the second photoelectric conversion element.

20 Claims, 38 Drawing Sheets

(51) Int. Cl.
*H04N 25/74* (2023.01)
*H04N 25/75* (2023.01)
*H04N 25/443* (2023.01)
*H04N 25/445* (2023.01)
*H04N 25/00* (2023.01)

(52) U.S. Cl.
CPC ......... *H04N 25/443* (2023.01); *H04N 25/445* (2023.01); *H04N 25/74* (2023.01); *H04N 25/75* (2023.01)

(58) Field of Classification Search
CPC ........ H04N 5/378; H04N 25/00; H04N 25/40; H04N 25/44; H04N 25/443; H04N 25/445; H04N 25/74; H04N 25/75
See application file for complete search history.

(56) References Cited

U.S. PATENT DOCUMENTS

| | | |
|---|---|---|
| 2016/0094796 A1 | 3/2016 | Govil |
| 2018/0091747 A1 | 3/2018 | Rhee et al. |
| 2018/0348381 A1 | 12/2018 | Nishihara et al. |

FOREIGN PATENT DOCUMENTS

| | | |
|---|---|---|
| CN | 110546945 A | 12/2019 |
| JP | 2017-535999 A | 11/2017 |
| JP | 2018-186478 A | 11/2018 |
| WO | 2017/104438 A1 | 6/2017 |

OTHER PUBLICATIONS

International Preliminary Report on Patentability of PCT Application No. PCT/JP2020/002412, dated Aug. 12, 2021, 10 pages of English Translation and 04 pages of IPRP.

Notice of Allowance for U.S. Appl. No. 17/424,684, dated Sep. 21, 2022, 10 pages.

Non-Final Office Action for U.S. Appl. No. 17/424,684, dated Apr. 28, 2022, 18 pages.

Brandli, et al., "A 240 x 180 130 dB 3 µs Latency Global Shutter Spatiotemporal Vision Sensor", IEEE Journal of Solid-State Circuits, vol. 49, No. 10, XP055598640, Oct. 2014, pp. 2333-2341.

* cited by examiner

SOLID-STATE IMAGING APPARATUS AND IMAGING APPARATUS

CROSS REFERENCE TO RELATED APPLICATIONS

This application is a continuation application of U.S. patent application Ser. No. 17/424,684, filed on Jul. 21, 2021, is a U.S. National Phase of International Patent Application No. PCT/JP2020/002412 filed on Jan. 23, 2020, which claims priority benefit of Japanese Patent Application No. JP 2019-016465 filed in the Japan Patent Office on Jan. 31, 2019, which claims priority benefit of Japanese Patent Application No. JP 2019-086853 filed in the Japan Patent Office on Apr. 26, 2019. Each of the above-referenced applications is hereby incorporated herein by reference in its entirety.

FIELD

The present disclosure relates to a solid-state imaging apparatus and an imaging apparatus.

BACKGROUND

A conventional synchronous solid-state imaging apparatus that images image data (frames) in synchronization with a synchronization signal such as a vertical synchronization signal has been used in an imaging apparatus or the like. In this general synchronous solid-state imaging apparatus, image data can be acquired only every synchronization signal cycle (for example, $\frac{1}{60}$ seconds), so that the general synchronous solid-state imaging apparatus is difficult to correspond to a case where faster processing is required in fields related to transportation and robots. Therefore, an asynchronous solid-state imaging apparatus has been proposed in which a detection circuit for detecting in real time that an amount of received light exceeds a threshold as an address event is provided for each pixel. An asynchronous solid-state imaging apparatus that detects an address event for each pixel is also called a dynamic vision sensor (DVS).

In recent years, a DVS that acquires a gradation image together with detection of an address event has also been developed.

CITATION LIST

Patent Literature

Patent Literature 1: Japanese Translation of PCT International Application Publication No. 2017-535999

SUMMARY

Technical Problem

As a DVS that acquires a gradation image together with detection of an address event, a method has been proposed, the method of arranging a detection circuit not for each pixel but for each pixel block, and while detecting an event for each pixel block, acquiring gradation for each pixel. However, in such a method, since it is necessary to perform both event detection and gradation acquisition in time division using the same pixel, and therefore, in a scene where the change is fast, there is a possibility that a gradation image of a subject to be imaged cannot be acquired due to time deviation between the event detection and the gradation acquisition.

Therefore, the present disclosure proposes a solid-state imaging apparatus and an imaging apparatus capable of reducing time deviation between event detection and gradation acquisition.

Solution to Problem

To solve the above-described problem, a solid-state imaging apparatus according to one aspect of the present disclosure comprises: a pixel array unit including a plurality of pixel blocks arrayed in a matrix; and a drive circuit that generates a pixel signal in a first pixel block in which firing of an address event is detected among the plurality of pixel blocks, each of the plurality of pixel blocks including a first photoelectric conversion element that generates an electric charge according to an amount of incident light, a detection unit that detects the firing of the address event based on the electric charge generated in the first photoelectric conversion element, a second photoelectric conversion element that generates an electric charge according to an amount of incident light, and a pixel circuit that generates a pixel signal based on the electric charge generated in the second photoelectric conversion element.

DESCRIPTION OF EMBODIMENTS

Figure 1:
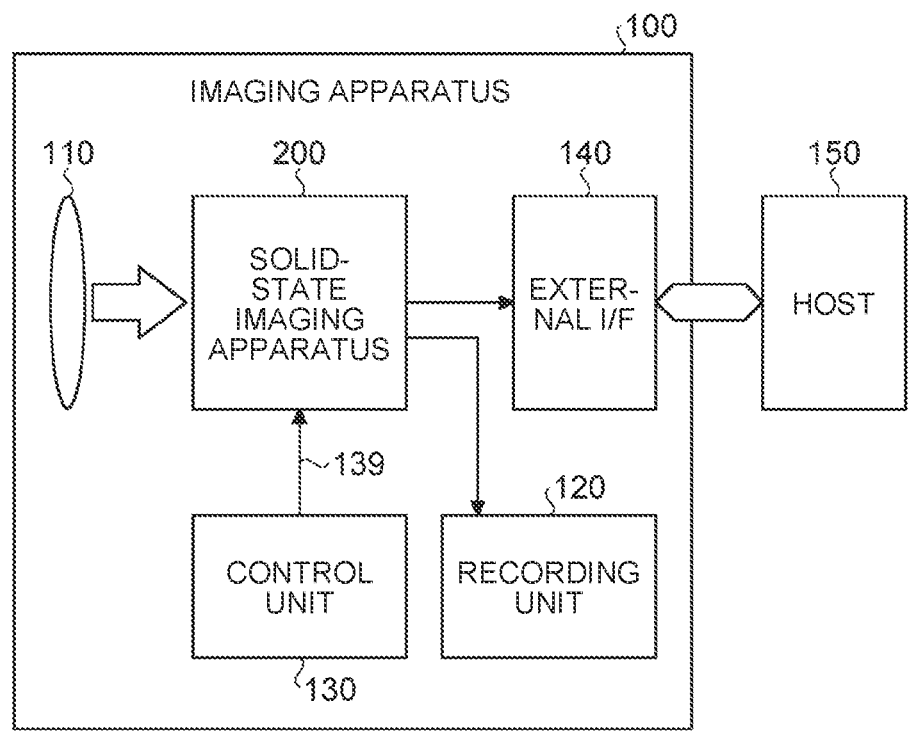
FIG. 1 is a block diagram illustrating a schematic configuration example of an imaging apparatus according to a first embodiment.

Hereinafter, embodiments of the present disclosure will be described in detail with reference to the drawings. In each of the embodiments below, the same parts are designated by the same reference numerals, so that duplicate description will be omitted.

The present disclosure will be described according to the order of items shown below.

1. First Embodiment
1.1 Configuration example of imaging apparatus
1.2 Example of stacked configuration of solid-state imaging apparatus
1.3 Schematic configuration example of solid-state imaging apparatus
1.4 Pixel block configuration example
1.4.1 Pixel block stacked configuration example
1.4.2 Example of plane layout of pixel block in pixel array unit
1.4.3 Circuit configuration example of gradation pixel
1.4.4 Event pixel circuit configuration example
1.4.5 Functional example of address event detection circuit
1.4.6 Configuration example of address event detection circuit
1.4.6.1 Configuration example of current-voltage conversion unit
1.4.6.1.1 Modification of current-voltage conversion unit
1.4.7 Configuration example of subtractor and quantizer
1.4.8 Configuration example of transfer unit
1.4.9 Configuration example of column ADC
1.4.9.1 Configuration example of AD conversion unit
1.4.9.2 Configuration example of control circuit
1.5 Operation example of solid-state imaging apparatus
1.6 Action and effect
1.7 First modification
1.8 Second modification
2. Second Embodiment
2.1 Configuration example of AD conversion unit
2.2 Configuration example of control circuit
2.3 Example of switching control in pixel signal reading 2.4 Action and effect
3. Third Embodiment
3.1 First example
3.2 Second example
3.3 Third example
4. Fourth Embodiment
4.1 Schematic configuration example of solid-state imaging apparatus
4.2 Schematic configuration example of Y arbiter
4.3 Schematic configuration example of event processing unit
4.4 Schematic configuration example of gradation pixel control unit
4.5 Action and effect
5. Fifth embodiment
5.1 Operation example of solid-state imaging apparatus
5.1.1 Event detection operation example
5.1.2 Periodic read operation example
5.2 Gradation image data update operation example
5.2.1 Flowchart
5.2.2 Timing chart
5.3 Action and effect
6. Sixth Embodiment
6.1 Schematic configuration example of event processing unit
6.2 Gradation image data update operation example
6.3 Action and effect
7. Seventh Embodiment
7.1 Pixel block configuration example
7.2 Pixel signal read operation example
7.3 Action and effect
7.4 Modification
8. Eighth Embodiment
8.1 Modification
9. Application example to mobile body 1. First Embodiment First, a first embodiment will be described in detail with reference to the drawings.

1.1 Configuration Example of Imaging Apparatus

FIG. 1 is a block diagram illustrating a schematic configuration example of an imaging apparatus according to the first embodiment. As illustrated in FIG. 1, an imaging apparatus 100 includes an optical system 110, a solid-state imaging apparatus 200, a recording unit 120, a control unit 130, and an external interface (I/F) 140. As the imaging apparatus 100, a camera mounted on an industrial robot, an in-vehicle camera, or the like is assumed.

The optical system 110 includes, for example, a lens or the like, and forms an image of incident light on a light receiving surface of the solid-state imaging apparatus 200.

The solid-state imaging apparatus 200 captures image data by photoelectrically converting incident light while detecting the presence or absence of firing of an address event. A detection result indicating presence or absence of firing of an address event (hereinafter, referred to as event detection data) and image data of a brightness value according to an amount of incident light (hereinafter, referred to as gradation image data) may be input to, for example, the recording unit 120, or may be output to an external host 150 or the like via the external I/F 140.

The external I/F 140 may be a communication adapter for establishing communication with the external host 150 via a communication network that complies with any standard such as controller area network (CAN), local interconnect network (LIN), or FlexRay (registered trademark), in addition to wireless local area network (LAN) and wired LAN.

Here, the host 150 may be, for example, an engine control unit (ECU) mounted on the automobile or the like when the imaging apparatus 100 is mounted on the automobile or the like. When the imaging apparatus 100 is mounted on an autonomous mobile robot such as a domestic pet robot or an autonomous mobile body such as a robot vacuum cleaner, an unmanned aerial vehicle, or a follow-up transport robot, the host 150 may be a control device or the like that controls the autonomous mobile body. In addition, the host 150 may be an information processing device such as a personal computer.

The recording unit 120 includes, for example, a non-volatile memory such as a flash memory, and records event detection data, gradation image data, and various other data input from the solid-state imaging apparatus 200.

The control unit 130 includes, for example, an information processing device such as a central processing unit (CPU), and causes the solid-state imaging apparatus 200 to acquire event detection data and gradation image data.

1.2 Example of Stacked Configuration of Solid-State Imaging Apparatus

Figure 2:
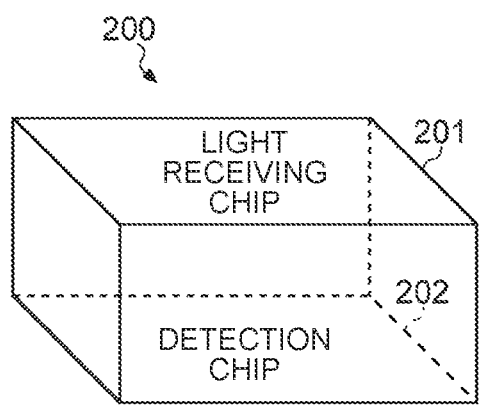
FIG. 2 is a diagram illustrating an example of a stacked structure of a solid-state imaging apparatus according to the first embodiment.

FIG. 2 is a diagram illustrating an example of a stacked structure of a solid-state imaging apparatus according to the first embodiment. As illustrated in FIG. 2, the solid-state imaging apparatus 200 has a stacked chip structure in which a light receiving chip 201 and a detection chip 202 are vertically stacked. For bonding the light receiving chip 201 and the detection chip 202, for example, so-called direct bonding, in which both bonding surfaces are flattened, and bonded by intermolecular force, can be used. However, the present embodiment is not limited to this, and for example, so-called Cu—Cu bonding in which copper (Cu) electrode pads formed on the both bonding surfaces are bonded to each other, bump bonding, or the like can be used.

The light receiving chip 201 and the detection chip 202 are electrically connected via, for example, a connecting portion such as a through-silicon via (TSV) penetrating a semiconductor substrate. For connection using the TSV, for example, the so-called twin TSV method in which two TSVs, a TSV provided on the light receiving chip 201 and a TSV provided from the light receiving chip 201 to the detection chip 202, are connected on an outer surface of the chip, or the so-called shared TSV method, in which the both are connected by a TSV penetrating from the light receiving chip 201 to the detection chip 202, can be adopted.

However, when Cu—Cu bonding or bump bonding is used for bonding the light receiving chip 201 and the detection chip 202, both are electrically connected via a Cu—Cu bonding portion or a bump bonding portion.

1.3 Schematic Configuration Example of Solid-State Imaging Apparatus

Figure 3:
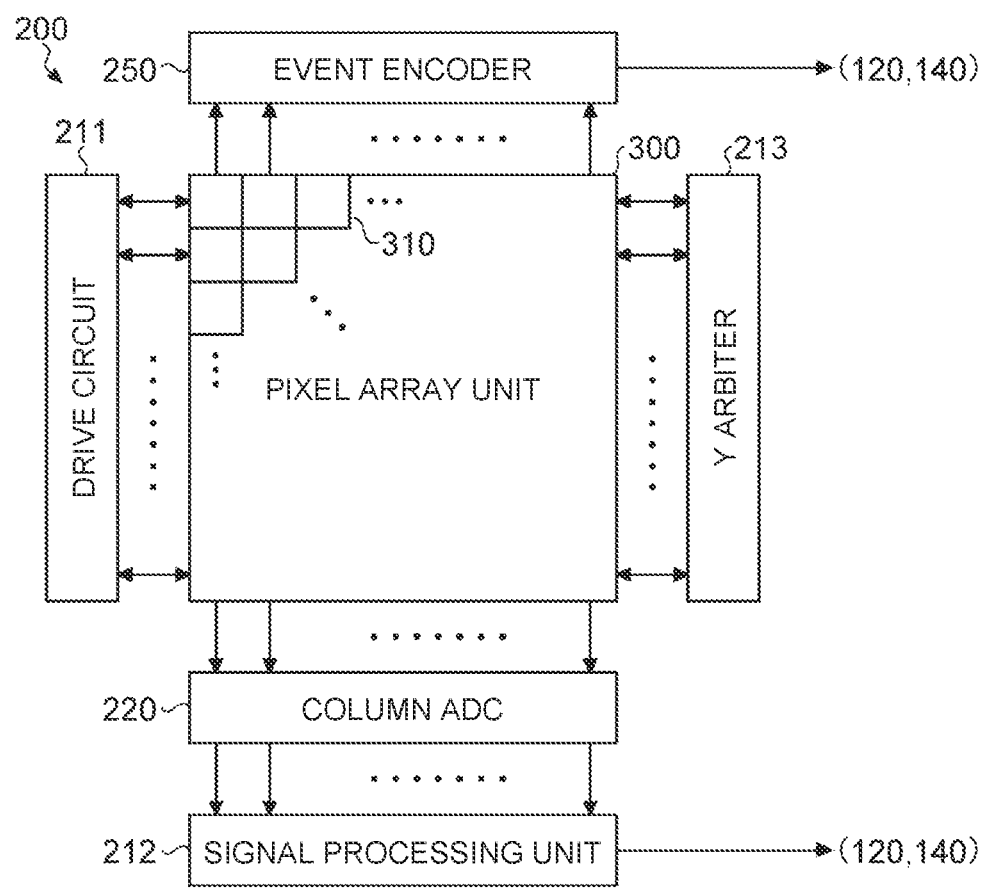
FIG. 3 is a block diagram illustrating a schematic configuration example of the solid-state imaging apparatus according to the first embodiment.

FIG. 3 is a block diagram illustrating a schematic configuration example of the solid-state imaging apparatus according to the first embodiment. As illustrated in FIG. 3, the solid-state imaging apparatus 200 includes a drive circuit 211, a signal processing unit 212, a Y arbiter (arbitration unit) 213, a column ADC (conversion unit) 220, an event encoder 250, and a pixel array unit 300.

The pixel array unit 300 has a configuration in which a plurality of pixel blocks 310 are arrayed in a two-dimensional grid pattern (also referred to as a matrix pattern). Hereinafter, a set of pixel blocks arrayed in the horizontal direction is referred to as a "row", and a set of pixel blocks arrayed in a direction perpendicular to the row is referred to as a "column". The row direction position of each pixel block 310 in the pixel array unit 300 is identified by an X address, and the column direction position is identified by a Y address.

Each pixel block 310 photoelectrically converts incident light to generate an analog pixel signal having a voltage value corresponding to the amount of the incident light. The pixel block 310 detects presence or absence of firing of an address event on the basis of whether or not an amount of change in the amount of incident light exceeds a predetermined threshold.

The pixel block 310 that has detected firing of an address event outputs a request to the Y arbiter 213. When the pixel block 310 receives a response to the request from the Y arbiter, the pixel block 310 transmits a detection signal indicating the detection result of the address event to the drive circuit 211 and the column ADC 220.

The Y arbiter 213 arbitrates the request from the pixel block 310 to determine the reading order for the row to which the pixel block 310, which is the source of the request, belongs, and returns a response to all pixel blocks 310 included in the row to which the pixel block 310, which is the source of the request, belongs, on the basis of the determined reading order. In the following description, arbitrating the request and determining the reading order is referred to as "arbitrating the reading order".

The drive circuit 211 drives each of the pixel blocks 310 that has output the detection signal to cause a pixel signal having a voltage value corresponding to the amount of incident light to a photoelectric conversion element 321 to appear on the vertical signal line 308 to which each of the pixel blocks 310 is connected.

The column ADC 220 converts the analog pixel signal appearing on the vertical signal line 308 of each column into a digital pixel signal for each row to read out the pixel signals in parallel in the column. The column ADC 220 supplies the read digital pixel signal to the signal processing unit 212.

The signal processing unit 212 performs predetermined signal processing such as correlated double sampling (CDS) processing on the pixel signal from the column ADC 220, and outputs gradation image data composed of the pixel signal after the signal processing to the outside.

The event encoder 250 generates data indicating which pixel block 310 the on-event has occurred in and which pixel block 310 the off-event has occurred in for each row in the pixel array unit 300. For example, when the event encoder 250 receives a request from a certain pixel block 310, the event encoder 250 generates event detection data including indication that an on-event or an off-event has occurred in the pixel block 310, and including an X address and a Y address for identifying the position of the pixel block 310 in the pixel array unit 300.

At that time, the event encoder 250 also includes information (time stamp) regarding the time when the firing of the on-event or the off-event is detected in the event detection data. The event encoder 250 outputs the generated event detection data to the outside.

1.4 Pixel Block Configuration Example

Figure 4:
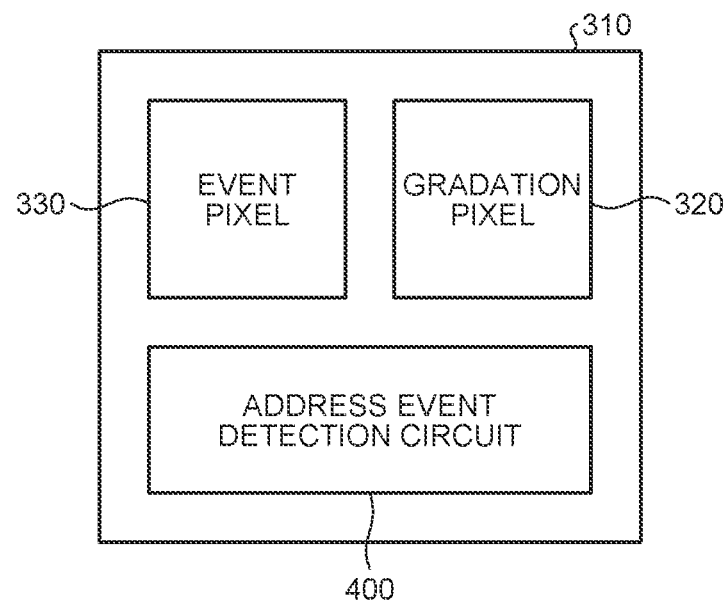
FIG. 4 is a block diagram illustrating a schematic configuration example of a pixel block according to the first embodiment.

FIG. 4 is a block diagram illustrating a schematic configuration example of a pixel block according to the first embodiment. As illustrated in FIG. 4, the pixel block 310 includes a gradation pixel 320 for generating a pixel signal which is gradation information, an event pixel 330 for detecting the presence or absence of firing of an address event, and an address event detection circuit (detection unit) 400 that detects the presence or absence of firing of an address event on the basis of a photocurrent from the event pixel 330.

1.4.1 Pixel Block Stacked Configuration Example

Figure 5:
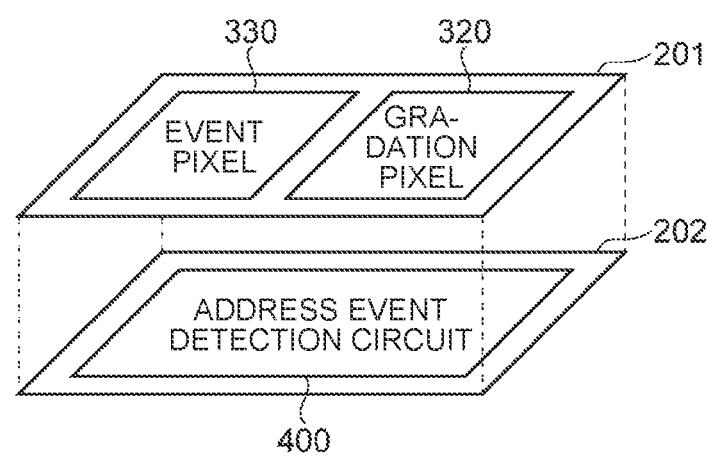
FIG. 5 is a diagram illustrating an example of a stacked configuration when the pixel block illustrated in FIG. 4 is applied to the stacked chip illustrated in FIG. 3.

FIG. 5 is a diagram illustrating an example of a stacked configuration when the pixel block illustrated in FIG. 4 is applied to the stacked chip illustrated in FIG. 3. As illustrated in FIG. among the pixel blocks 310, for example, the gradation pixel 320 and the event pixel 330 are arranged on the light receiving chip 201, and the address event detection circuit 400 is arranged on the detection chip 202.

However, the present embodiment is not limited to this, and various modifications can be made, such as arranging a part of the circuit configuration of the gradation pixel 320 on the detection chip 202.

1.4.2 Example of Plane Layout of Pixel Block in Pixel Array Unit

Figure 6:
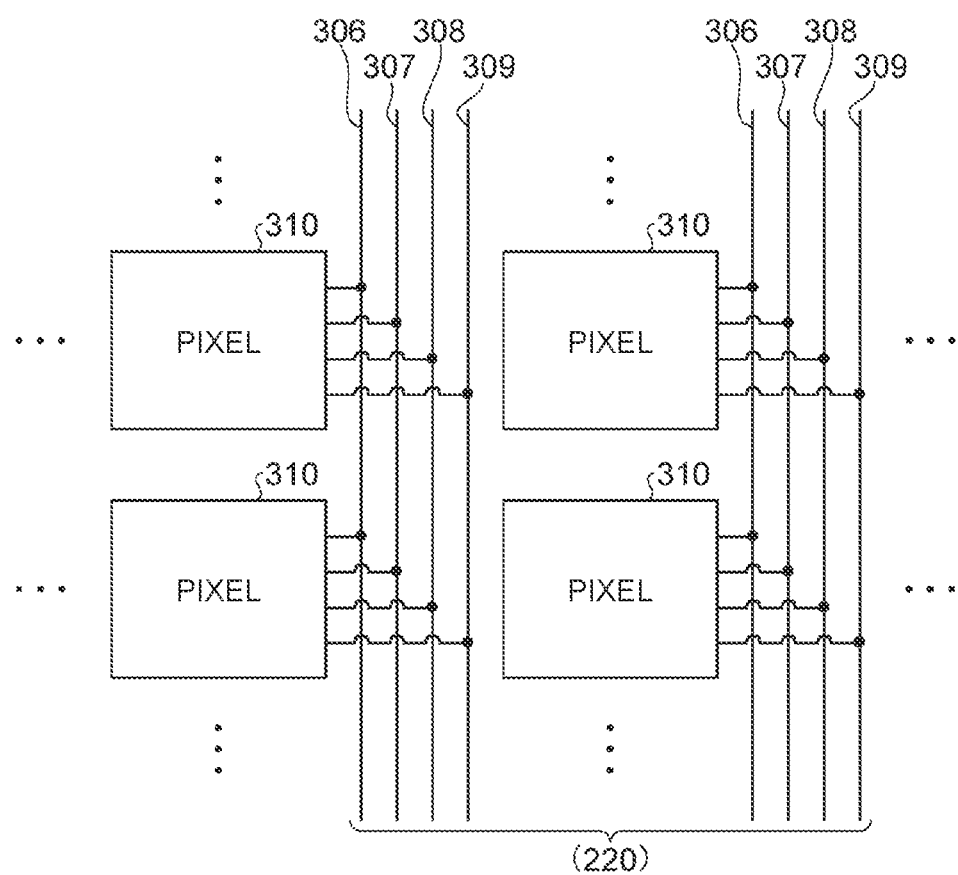
FIG. 6 is a plan view illustrating a plan layout example of a pixel block in a pixel array unit according to the first embodiment.

FIG. 6 is a plan view illustrating a plan layout example of a pixel block in a pixel array unit according to the first embodiment. As illustrated in FIG. 6, the pixel array unit 300 includes a plurality of pixel blocks 310 arrayed in a matrix. In the pixel array unit 300, detection signal lines 306 and 307, vertical signal lines 308, and enable signal lines 309 are wired for each column along the column direction. Each of the pixel blocks 310 is connected to the detection signal lines 306 and 307, vertical signal lines 308, and enable signal lines 309 of the corresponding column.

1.4.3 Circuit Configuration Example of Gradation Pixel

Figure 7:
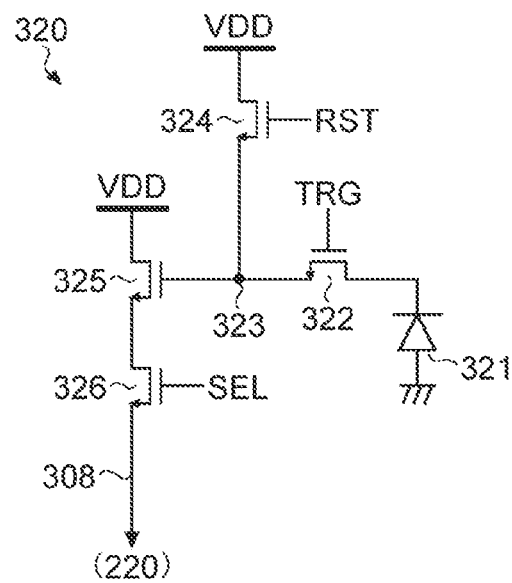
FIG. 7 is a circuit diagram illustrating a circuit configuration example of a gradation pixel according to the first embodiment.

FIG. 7 is a circuit diagram illustrating a circuit configuration example of the gradation pixel 320 according to the first embodiment. As illustrated in FIG. 7, the gradation pixel 320 includes a photoelectric conversion element 321, a transfer transistor 322, a floating diffusion layer 323, a reset transistor 324, an amplification transistor 325, and a selection transistor 326, and generates an analog signal of the voltage according to the photocurrent as a pixel signal Vsig. The configuration of the gradation pixel 320 other than the photoelectric conversion element 321 is also referred to as a pixel circuit. The transfer transistor, the reset transistor 324, the amplification transistor 325, and the selection transistor 326 may be, for example, an N-type metal-oxide-semiconductor (MOS) transistor.

The photoelectric conversion element (second photoelectric conversion element) 321 is composed of, for example, a photodiode or the like, and photoelectrically converts the incident light to generate an electric charge. The transfer transistor 322 transfers an electric charge from the photoelectric conversion element 321 to the floating diffusion layer 323 according to a transfer signal TRG from the drive circuit 211.

The floating diffusion layer 323 is an electric charge storage unit that generates a voltage according to an amount of stored electric charge. The reset transistor 324 emits (initializes) the electric charge of the floating diffusion layer 323 according to a reset signal RST from the drive circuit 211. The amplification transistor 325 amplifies the voltage of the floating diffusion layer 323. The selection transistor 326 causes the amplified voltage signal to appear on the vertical signal line 308 as a pixel signal Vsig according to the selection signal SEL from the drive circuit 211. The pixel signal Vsig appearing on the vertical signal line 308 is read by, for example, the column ADC 220 and converted into a digital pixel signal.

1.4.4 Event Pixel Circuit Configuration Example

Figure 8:
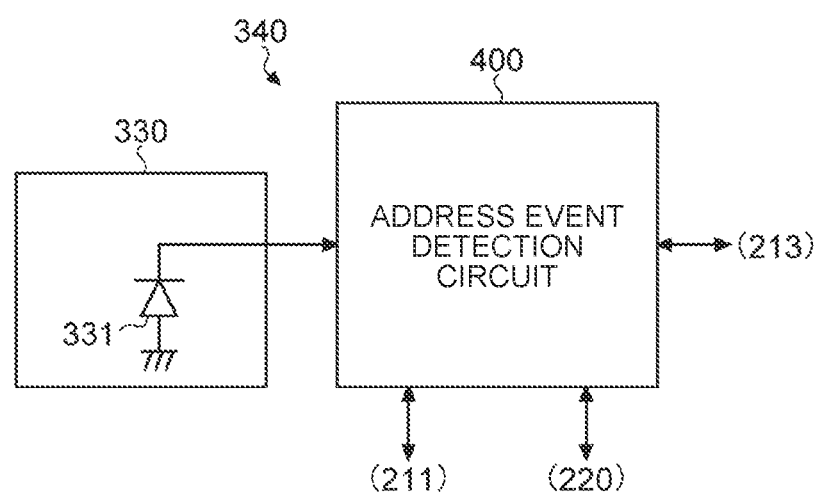
FIG. 8 is a circuit diagram illustrating a circuit configuration example of an event pixel according to the first embodiment.

FIG. 8 is a circuit diagram illustrating a circuit configuration example of an event pixel according to the first embodiment. As illustrated in FIG. 8, the event pixel 330 includes a photoelectric conversion element 331.

As similar to the photoelectric conversion element 321, the photoelectric conversion element (first photoelectric conversion element) 331 is composed of, for example, a photodiode or the like, and photoelectrically converts the incident light to generate an electric charge. The electric charge generated by the photoelectric conversion of the photoelectric conversion element 331 is supplied to the address event detection circuit 400 as a photocurrent.

1.4.5 Functional Example of Address Event Detection Circuit

The address event detection circuit 400 illustrated in FIG. 8 detects the presence or absence of firing of the address event depending on whether or not the amount of change in the photocurrent flowing out from the photoelectric conversion element 331 exceeds a predetermined threshold. This address event includes, for example, an on-event indicating that the amount of change in the photocurrent according to the amount of incident light exceeds the upper limit threshold and an off-event indicating that the amount of change has fallen below the lower limit threshold. In other words, the address event is detected when the amount of change in the amount of incident light is outside the predetermined range from the lower limit to the upper limit. The address event detection signal is composed of, for example, 1 bit indicating an on-event detection result and 1 bit indicating an off-event detection result. The address event detection circuit 400 can also detect only on-events.

The address event detection circuit 400 transmits a request for transmitting a detection signal to the Y arbiter 213 when an address event occurs. When the address event detection circuit 400 receives a response to the request from the Y arbiter 213, the address event detection circuit 400 transmits the detection signals DET+ and DET− to the drive circuit 211 and the column ADC 220. The detection signal DET+ is a signal indicating the detection result of the presence or absence of an on-event, and is transmitted to the column ADC 220 via the detection signal line 306, for example. The detection signal DET− is a signal indicating the detection result of the presence or absence of an off-event, and is transmitted to the column ADC 220 via the detection signal line 307, for example.

The address event detection circuit 400 enables the column enable signal ColEN in synchronization with the selection signal SEL, and transmits the signal to the column ADC 220 via the enable signal line 309. The column enable signal ColEN is a signal for enabling or disabling analog to digital (AD) conversion for the pixel signal of the corresponding column.

When an address event is detected in a certain row, the drive circuit 211 drives that row by a selection signal SEL or the like. Each of the pixel blocks 310 in the driven row causes the pixel signal Vsig to appear on the vertical signal line 308. The pixel signal Vsig appearing on the vertical signal line 308 is read by the column ADC 220 and converted into a digital pixel signal.

The pixel block 310 that has detected the address event in the driven row transmits the enabled column enable signal ColEN to the column ADC 220. On the other hand, the column enable signal ColEN of the pixel block 310 that has not detected an address event is disabled.

1.4.6 Configuration Example of Address Event Detection Circuit

Figure 9:
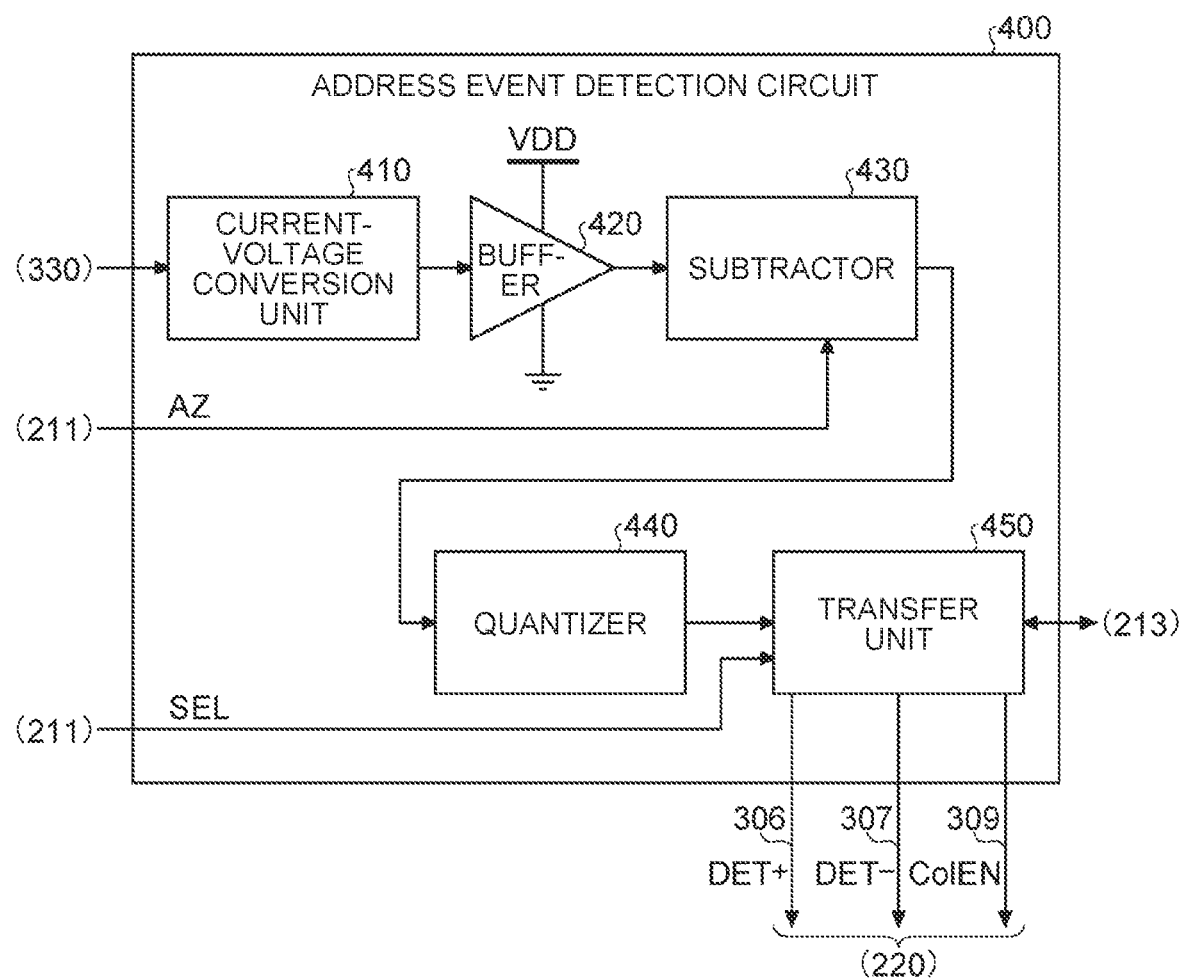
FIG. 9 is a block diagram illustrating a schematic configuration example of an address event detection circuit according to the first embodiment.

FIG. 9 is a block diagram illustrating a schematic configuration example of an address event detection circuit according to the first embodiment. As illustrated in FIG. 9, the address event detection circuit 400 includes a current-voltage conversion unit 410, a buffer 420, a subtractor 430, a quantizer 440, and a transfer unit 450.

The current-voltage conversion unit 410 converts the photocurrent from the event pixel 330 into a logarithmic voltage signal thereof. The current-voltage conversion unit 410 supplies the voltage signal to the buffer 420.

The buffer 420 outputs the voltage signal from the current-voltage conversion unit 410 to the subtractor 430. This buffer 420 can improve the driving force for driving the subsequent stage. Further, the buffer 420 can secure the isolation of noise accompanying the switching operation in the subsequent stage.

The subtractor 430 lowers the level of the voltage signal from a buffer 420 according to the row drive signal from a drive circuit 211. The subtractor 430 supplies the lowered voltage signal to the quantizer 440.

The quantizer 440 quantizes the voltage signal from the subtractor 430 into a digital signal and outputs the result to the transfer unit 450 as a detection signal.

The transfer unit 450 transfers the detection signal from the quantizer 440 to the signal processing unit 212 and the like. When an address event is detected, the transfer unit 450 transmits a request for transmitting a detection signal to the Y arbiter 213 and the event encoder 250. When the transfer unit 450 receives the response to the request from the Y arbiter 213, the transfer unit 450 supplies the detection signals DET+ and DET− to the drive circuit 211 and the column ADC 220. When the selection signal SEL is transmitted, the transfer unit 450 transmits the enabled column enable signal ColEN to the column ADC 220.

1.4.6.1 Configuration Example of Current-Voltage Conversion Unit

Figure 10:
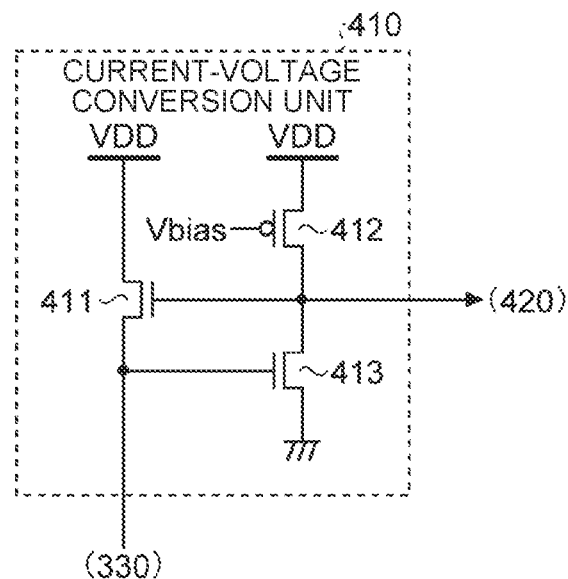
FIG. 10 is a circuit diagram illustrating a schematic configuration example of a current-voltage conversion unit according to the first embodiment.

FIG. 10 is a circuit diagram illustrating a schematic configuration example of a current-voltage conversion unit according to the first embodiment. As illustrated in FIG. 10, the current-voltage conversion unit 410 includes a LoG (LG) transistor 411, an amplification transistor 413, and a load MOS transistor 412. For the LG transistor 411 and the amplification transistor 413, for example, an N-type MOS transistor can be used. On the other hand, the load MOS transistor 412 is a constant current circuit, and a P-type MOS transistor can be used for this.

The source of the LG transistor 411 is connected to a cathode of the photoelectric conversion element 331 in the event pixel 330, and the drain is connected to a power supply terminal. The load MOS transistor 412 and the amplification transistor 413 are connected in series between the power supply terminal and a ground terminal. The connection points of the load MOS transistor 412 and the amplification transistor 413 are connected to the gate of the LG transistor 411 and the input terminal of the buffer 420. A predetermined bias voltage Vbias is applied to the gate of the load MOS transistor 412.

The drains of the LG transistor 411 and the amplification transistor 413 are connected to the power supply side, and such a circuit is called a source follower. The two source followers connected in a loop convert the photocurrent from the photoelectric conversion element 331 into a logarithmic voltage signal thereof. The load MOS transistor 412 supplies a constant current to the amplification transistor 413.

In the configuration illustrated in FIG. 10, for example, the LG transistor 411 and the amplification transistor 413 may be arranged on the light receiving chip 201 illustrated in FIG. 5.

1.4.6.1.1 Modification of Current-Voltage Conversion Unit

Figure 11:
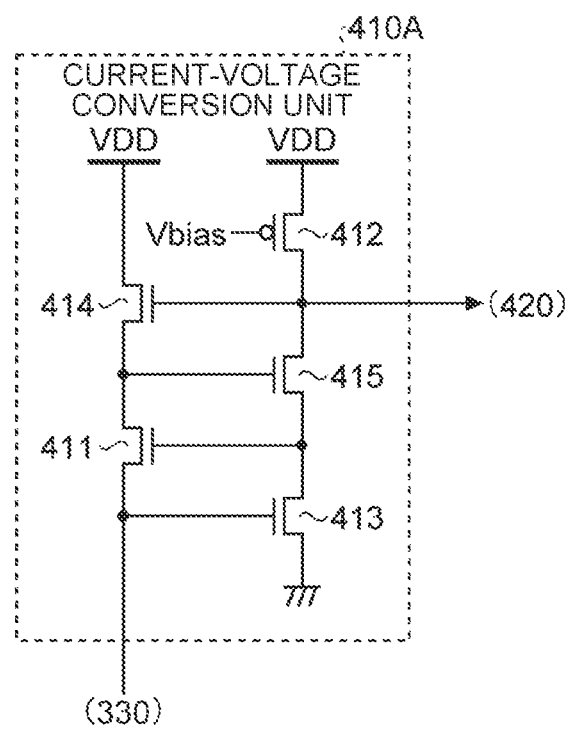
FIG. 11 is a circuit diagram illustrating another schematic configuration example of the current-voltage conversion unit according to the first embodiment.

It is also possible to use a gain boost type current-voltage conversion unit 410A as illustrated in FIG. 11 instead of the source follower type current-voltage conversion unit 410 as illustrated in FIG. 10.

As illustrated in FIG. 11, in the current-voltage conversion unit 410A, the source of the LG transistor 411 and the gate of the amplification transistor 413 are connected to, for example, the cathode of the photoelectric conversion element 331 in the event pixel 330. The drain of the LG transistor 411 is connected to, for example, the source of an LG transistor 414 and the gate of the amplification transistor 413. The drain of the LG transistor 414 is connected to, for example, a power supply terminal VDD.

For example, the source of an amplification transistor 415 is connected to the gate of the LG transistor 411 and the drain of the amplification transistor 413. The drain of the amplification transistor 415 is connected to the power supply terminal VDD via, for example, the load MOS transistor 412.

Even in such a configuration, the photocurrent from the photoelectric conversion element 331 is converted into a logarithmic voltage signal according to the amount of electric charge. The LG transistors 411 and 414 and the amplification transistors 413 and 415 may be composed of, for example, N-type MOS transistors, respectively.

In the configuration illustrated in FIG. 11, for example, the LG transistors 411 and 414 and the amplification transistors 413 and 415 may be arranged on the light receiving chip 201 illustrated in FIG. 5.

1.4.7 Configuration Example of Subtractor and Quantizer

Figure 12:
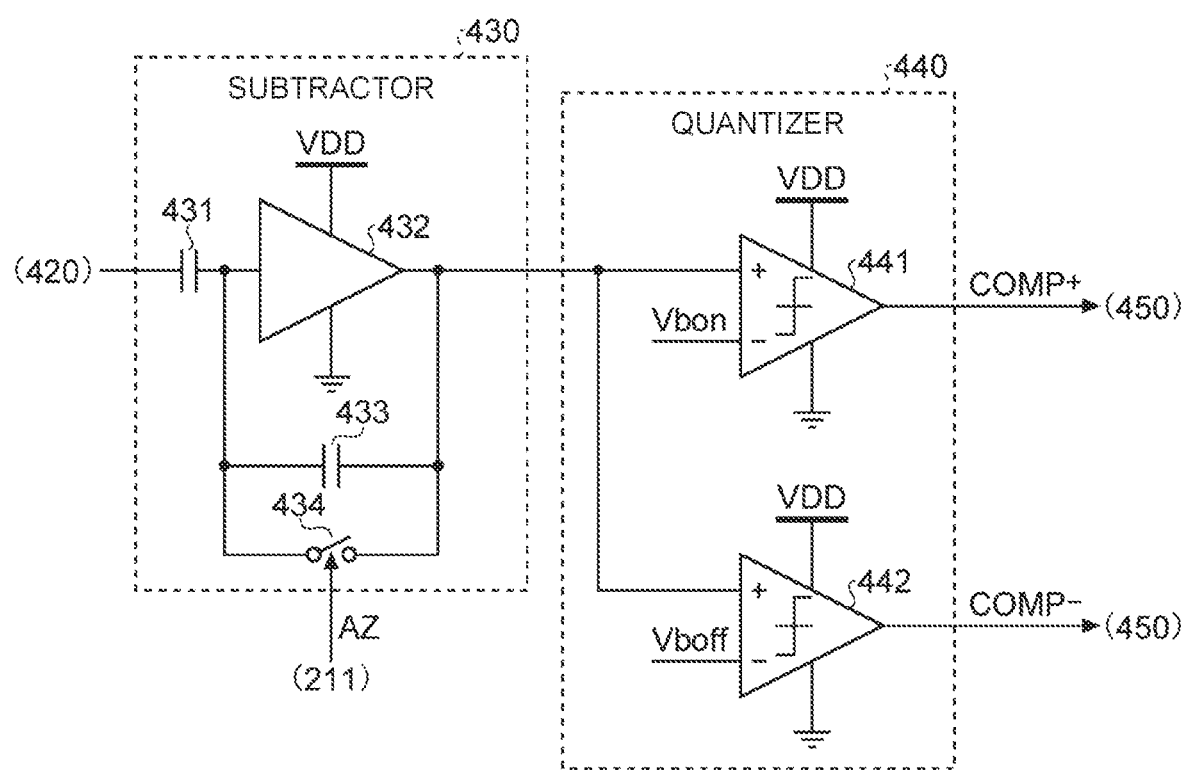
FIG. 12 is a circuit diagram illustrating a schematic configuration example of a subtractor and a quantizer according to the first embodiment.

FIG. 12 is a circuit diagram illustrating a schematic configuration example of a subtractor and a quantizer according to the first embodiment. As illustrated in FIG. 12, the subtractor 430 includes capacitors 431 and 433, an inverter 432, and a switch 434. The quantizer 440 also includes comparators 441 and 442.

One end of the capacitor 431 is connected to an output terminal of the buffer 420, and the other end is connected to an input terminal of the inverter 432. The capacitor 433 is connected in parallel with the inverter 432. The switch 434 opens and closes the path connecting both ends of the capacitor 433 according to an auto-zero signal AZ from the drive circuit 211.

The inverter 432 inverts the voltage signal input via the capacitor 431. This inverter 432 outputs the inverted signal to a non-inverting input terminal (+) of the comparator 441.

When the switch 434 is turned on, the voltage signal Vinit is input to the buffer 420 side of the capacitor 431, and the opposite side becomes a virtual ground terminal. The potential of this virtual ground terminal is set to zero for convenience. At this time, a potential Qinit stored in the capacitor 431 is expressed by the following Equation (1), where C1 is the capacitance of the capacitor 431. On the other hand, since both ends of the capacitor 433 are short-circuited, the accumulated electric charge is zero.

$$Q\text{init} = C1 \times V\text{init} \tag{1}$$

Next, considering the case where the switch 434 is turned off and the voltage on the buffer 420 side of the capacitor 431 changes to become Vafter, an electric charge Qafter stored in the capacitor 431 is expressed by the following Equation (2).

$$Q\text{after} = C1 \times V\text{after} \tag{2}$$

On the other hand, an electric charge Q2 stored in the capacitor 433 is expressed by the following Equation (3), where Vout is the output voltage.

$$Q2 = -C2 \times V\text{out} \tag{3}$$

At this time, since the total amount of electric charges of the capacitors 431 and 433 do not change, the following Equation (4) holds.

$$Q\text{init} = Q\text{after} + Q2 \tag{4}$$

Substituting Equations (1) to (3) into Equation (4) and transforming the result, the following Equation (5) is obtained.

$$V\text{out} = -(C1/C2) \times (V\text{after} - V\text{init}) \tag{5}$$

Equation (5) represents the subtraction operation of the voltage signal, and the gain of the subtraction result is C1/C2. Since it is usually desired to maximize the gain, it is preferable to design C1 to be large and C2 to be small. On the other hand, if C2 is too small, kTC noise may increase and noise characteristics may deteriorate. Therefore, the capacity reduction of C2 is limited to the range in which noise can be tolerated. Since the address event detection circuit 400 including the subtractor 430 is mounted on each pixel block, the capacitances C1 and C2 have area restrictions. The values of the capacities C1 and C2 are determined taking these into consideration.

The comparator 441 compares the voltage signal from the subtractor 430 with the upper limit voltage Vbon applied to the inverting input terminal (−). Here, the upper limit voltage Vbon is a voltage indicating an upper limit threshold. The comparator 441 outputs the comparison result COMP+ to the transfer unit 450. The comparator 441 outputs a high-level comparison result COMP+ when an on-event occurs, and outputs a low-level comparison result COMP+ when there is no on-event.

The comparator 442 compares the voltage signal from the subtractor 430 with the lower limit voltage Vboff applied to the inverting input terminal (−). Here, the lower limit voltage Vboff is a voltage indicating the lower limit threshold. The comparator 442 outputs the comparison result COMP− to the transfer unit 450. The comparator 442 outputs a high-level comparison result COMP− when an off-event occurs, and outputs a low-level comparison result COMP− when there is no off-event.

1.4.8 Configuration Example of Transfer Unit

Figure 13:
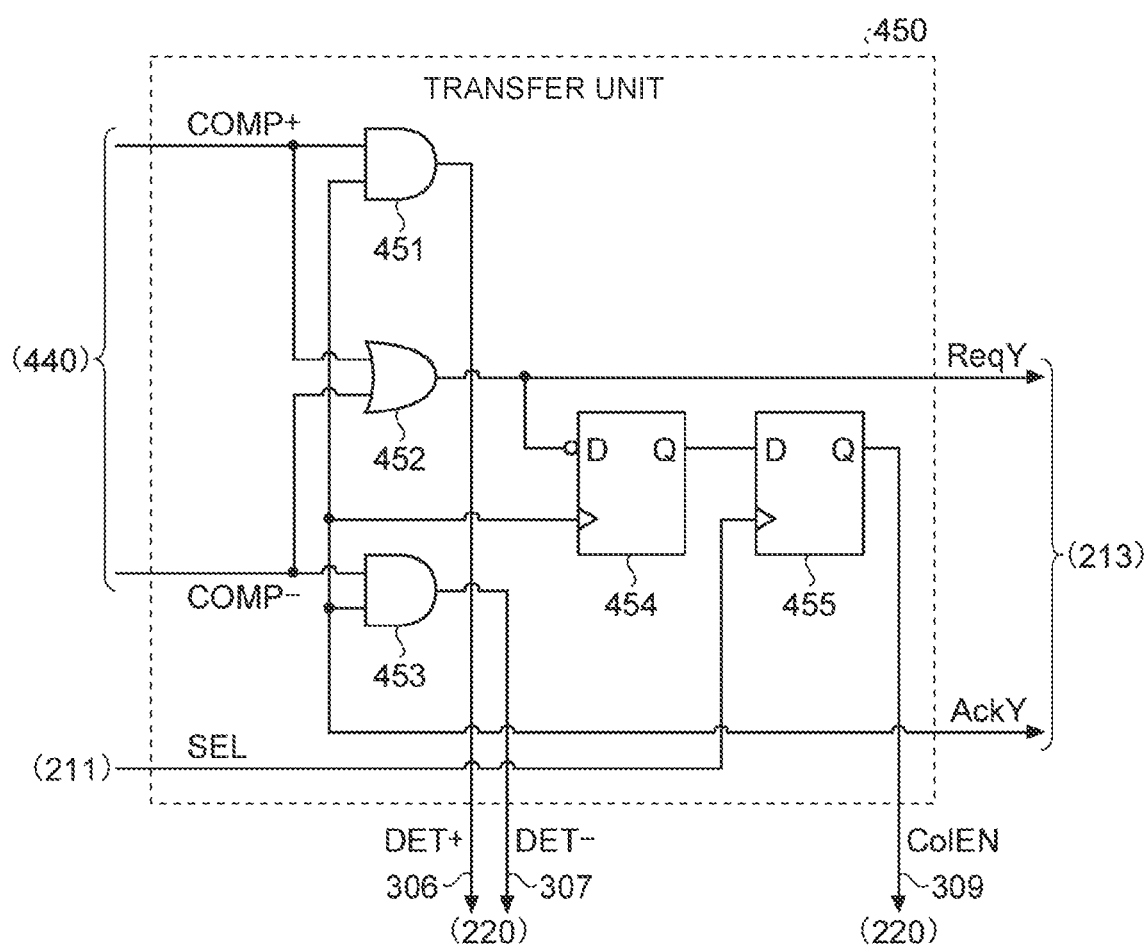
FIG. 13 is a circuit diagram illustrating a schematic configuration example of a transfer unit according to the first embodiment.

FIG. 13 is a circuit diagram illustrating a schematic configuration example of a transfer unit according to the first embodiment. As illustrated in FIG. 13, the transfer unit 450 includes AND (logical product) gates 451 and 453, a logical sum (OR) gate 452, and flip-flops 454 and 455.

The AND gate 451 outputs the logical product of the comparison result COMP+ of the quantizer 440 and the response AckY from the Y arbiter 213 to the column ADC 220 as a detection signal DET+. The AND gate 451 outputs a high-level detection signal DET+ when an on-event occurs, and outputs a low-level detection signal DET+ when there is no on-event.

The OR gate 452 outputs the logical sum of the comparison result COMP+ of the quantizer 440 and the comparison result COMP− as a request ReqY to the Y arbiter 213. The OR gate 452 outputs a high-level request ReqY when an address event occurs, and outputs a low-level request ReqY when there is no address event. An inverted value of the request ReqY is input to an input terminal D of the flip-flop 454.

The AND gate 453 outputs the logical product of the comparison result COMP− of the quantizer 440 and the response AckY from the Y arbiter 213 to the column ADC 220 as a detection signal DET−. The AND gate 453 outputs a high-level detection signal DET− when an off-event occurs, and outputs a low-level detection signal DET− when there is no off-event.

The flip-flop 454 holds the inverted value of the request ReqY in synchronization with the response AckY. Then, the flip-flop 454 outputs the holding value as an internal signal ColEN' to the input terminal D of the flip-flop 455.

The flip-flop 455 holds the internal signal ColEN' in synchronization with the selection signal SEL from the drive circuit 211. Then, the flip-flop 455 outputs the holding value as a column enable signal ColEN to the column ADC 220.

1.4.9 Configuration Example of Column ADC

Figure 14:
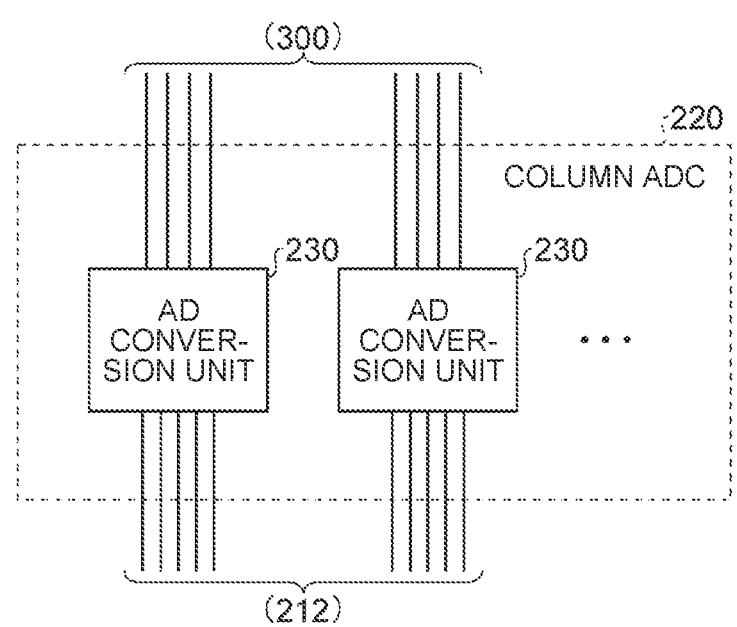
FIG. 14 is a block diagram illustrating a schematic configuration example of a column ADC according to the first embodiment.

FIG. 14 is a block diagram illustrating a schematic configuration example of a column ADC according to the first embodiment. As illustrated in FIG. 14, in the column ADC 220, for example, one AD conversion unit 230 is arranged for each column in the pixel array unit 300. However, it is not essential to provide the AD conversion unit 230 on a one-to-one basis for each column. For example, one AD conversion unit 230 may be arranged for a plurality of columns of two or more columns.

The AD conversion unit 230 converts the analog pixel signal appearing on the vertical signal line 308 of each column into a digital pixel signal.

1.4.9.1 Configuration Example of AD Conversion Unit

Figure 15:
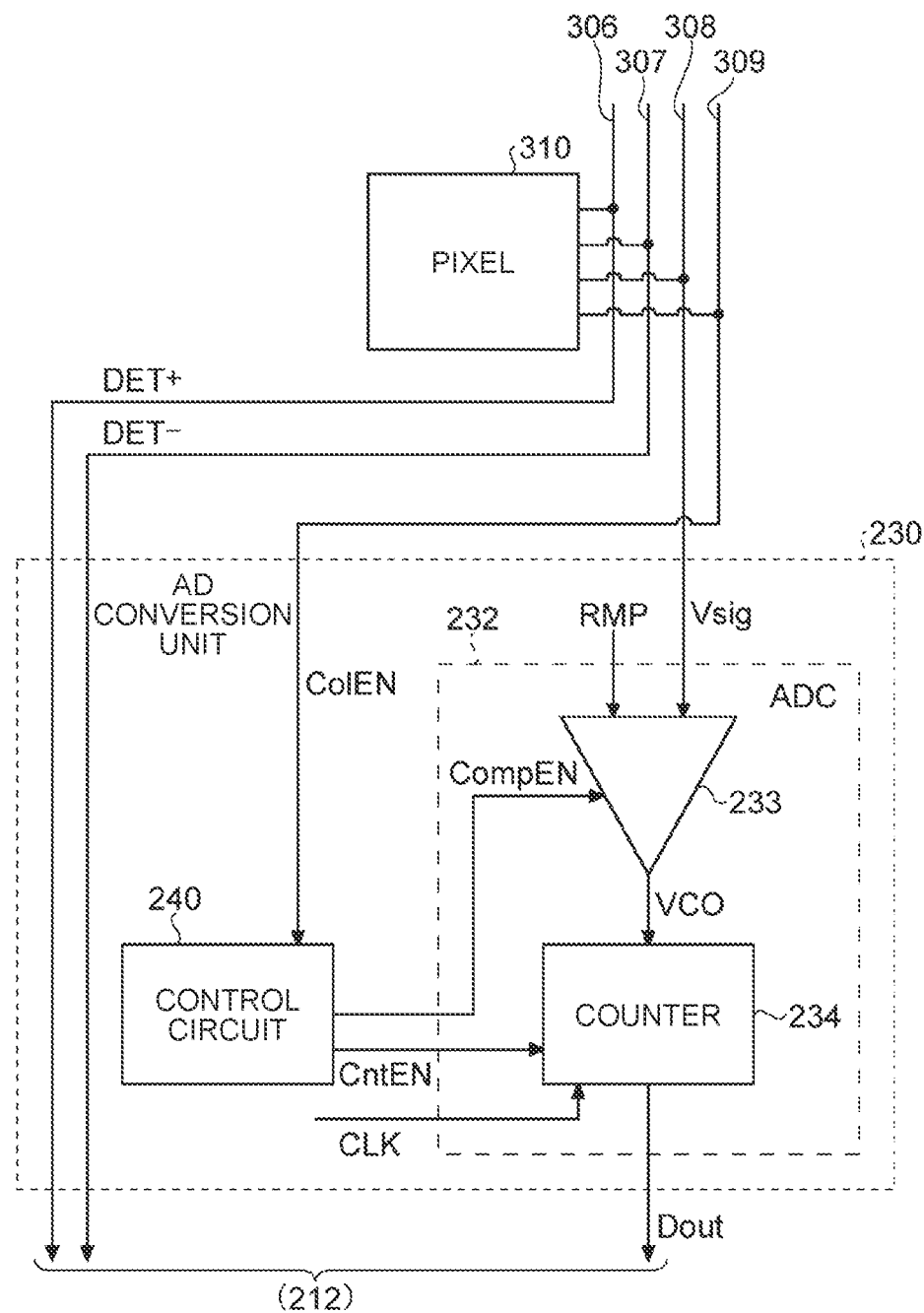
FIG. 15 is a block diagram illustrating a schematic configuration example of an AD conversion unit according to the first embodiment.

FIG. 15 is a block diagram illustrating a schematic configuration example of an AD conversion unit according to the first embodiment. As illustrated in FIG. 15, the AD conversion unit 230 includes an ADC 232 and a control circuit 240.

The ADC 232 converts the pixel signal Vsig into a digital pixel signal Dout. The ADC 232 includes a comparator 233 and a counter 234.

The comparator 233 compares the predetermined reference signal RMP with the pixel signal Vsig according to the comparator enable signal CompEN from the control circuit 240. As the reference signal RMP, for example, a lamp signal that changes in a slope shape or a step shape can be used. The comparator enable signal CompEN is a signal for enabling or disabling the comparison operation of the comparator 233. The comparator 233 supplies a comparison result VCO to the counter 234.

The counter 234 counts the count value in synchronization with the clock signal CLK for a period until the comparison result VCO is inverted according to the counter enable signal CntEN from the control circuit 240. The counter enable signal CntEN is a signal for enabling or disabling the counting operation of the counter 234. This counter 234 outputs a digital pixel signal Dout indicating the count value to the signal processing unit 212.

The control circuit 240 controls a multiplexer 231 and the ADC 232 according to the column enable signal ColEN. The details of the control contents will be described later.

The detection signals DET+ and DET− output from each pixel block 310 are output to the signal processing unit 212 via the AD conversion unit 230.

A single-slope ADC consisting of the comparator 233 and the counter 234 is used as the ADC 232, but the configuration is not limited to this. For example, a delta-sigma ADC can be used as the ADC 232.

1.4.9.2 Configuration Example of Control Circuit

Figure 16:
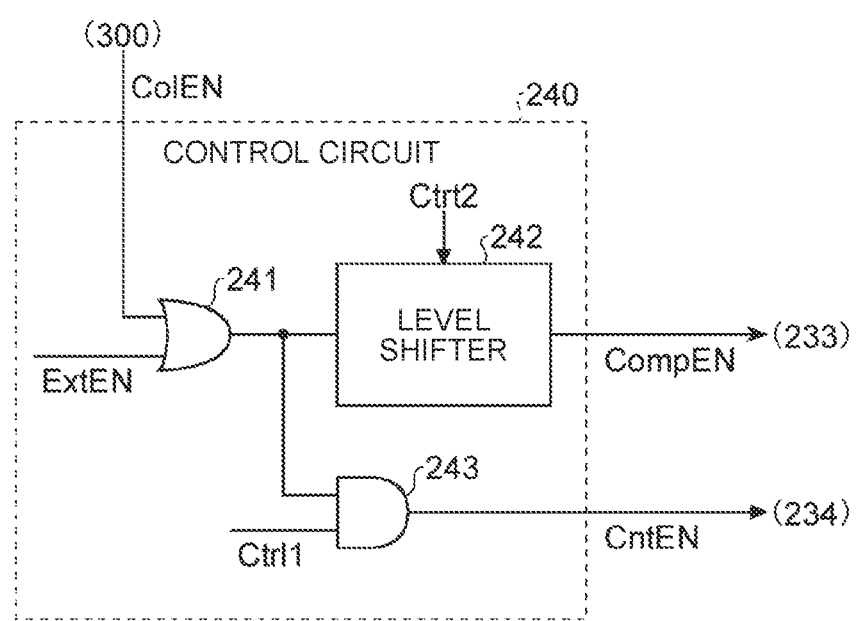
FIG. 16 is a block diagram illustrating a schematic configuration example of a control circuit according to the first embodiment.

FIG. 16 is a block diagram illustrating a schematic configuration example of a control circuit according to the first embodiment. As illustrated in FIG. 16, the control circuit 240 includes a logical sum (OR) gate 241, a level shifter 242, and a logical product (AND) gate 243.

The OR gate 241 outputs the logical sum of the column enable signal ColEN and the extra enable signal ExtEN to the level shifter 242 and the AND gate 243. The extra enable signal ExtEN is a signal instructing that AD conversion is enabled regardless of the presence or absence of an address event, and is set according to user operation or the like. For example, the extra enable signal ExtEN is set to high level when the AD conversion is enabled, and the extra enable signal ExtEN is set to low level when the AD conversion is disabled.

The level shifter 242 converts the voltage of the output signal of the OR gate 241. The level shifter 242 supplies the converted signal as a comparator enable signal CompEN to the comparator 233 in the ADC 232 according to, for example, a block control signal Crtl2. The block control signal Crtl2 is a signal for disabling the comparator 233 regardless of the presence or absence of an address event. For example, the block control signal Crtl2 is set to low level when the comparator 233 is disabled, and the block control signal Crtl2 is set to high level when the comparator 233 is not disabled, regardless of the presence or absence of an address event.

The AND gate 243 outputs the logical product of the output signal of the OR gate 241 and the block control signal Crtl1 to the counter 234 as a counter enable signal CntEN. The block control signal Crtl1 is a signal for disabling the counter 234 regardless of the presence or absence of an address event. For example, the block control signal Crtl1 is set to low level when the counter 234 is disabled, and the block control signal Crtl1 is set to high level when the counter 234 is not disabled, regardless of the presence or absence of an address event.

1.5 Operation Example of Solid-State Imaging Apparatus

Figure 17:
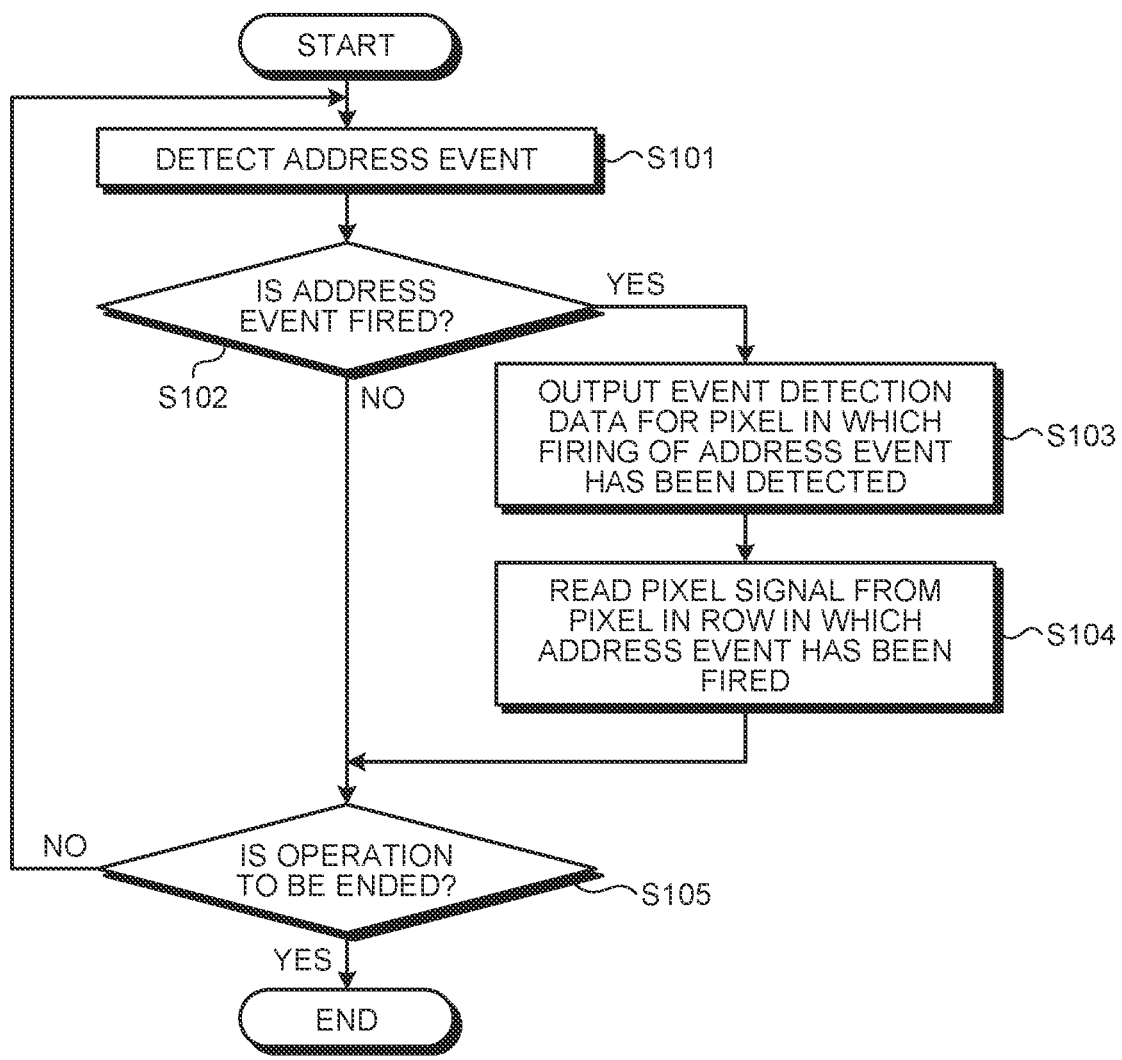
FIG. 17 is a flowchart illustrating a schematic operation example of the solid-state imaging apparatus according to the first embodiment.

FIG. 17 is a flowchart illustrating a schematic operation example of the solid-state imaging apparatus according to the first embodiment. This operation is started, for example, when an application for detecting and imaging an address event is executed.

As illustrated in FIG. 17, the solid-state imaging apparatus 200 starts detecting presence or absence of firing of an address event (Step S101), and determines whether or not an address event occurs (Step S102). The event pixel 330 is used to detect firing of an address event. When the firing of the address event is not detected (NO in Step S102), this operation proceeds to Step S105.

On the other hand, when the firing of the address event is detected (YES in Step S102), the event encoder 250 outputs the event detection data for the pixel block 310 in which the firing of the address event is detected (Step S103).

Next, the column ADC 220 reads a pixel signal from all the pixel blocks 310 included in the row to which the pixel block 310 in which the firing of the address event is detected belongs (Step S104). The gradation pixel 320 is used for reading the pixel signal. The pixel signal for one row is read out in parallel (parallel in column) from all the pixel blocks 310 included in the row to which the pixel block 310 in which the firing of the address event is detected belongs. Thereafter, this operation proceeds to Step S105.

In Step S105, the solid-state imaging apparatus 200 determines whether or not to end the main operation, and when the main operation is ended (YES in Step S105), the solid-state imaging apparatus 200 ends the main operation. On the other hand, when the operation is not ended (NO in Step S105), the process returns to Step S101 and the subsequent operations are performed.

1.6 Action and Effect

As described above, according to the first embodiment, pixel signals are read out in parallel in columns from all the pixel blocks 310 included in the row to which the pixel block 310 in which the firing of the address event is detected belongs. As a result, it is possible to omit the procedure of identifying the pixel blocks 310 in which the address event has been fired one by one and reading the pixel blocks 310 individually, and therefore, it is possible to reduce the time difference from the detection of the firing of the address event to the reading of the pixel signal (gradation).

According to the first embodiment, since it is possible to omit the X arbiter that arbitrates the reading order for the pixel block 310 in which the firing of the address event is detected in the column direction, and therefore, it is also possible to simplify the configuration and reduce the size of the solid-state imaging apparatus 200.

In the present embodiment, in one pixel block 310, a pixel for event detection (event pixel 330) and a pixel for gradation acquisition (gradation pixel 320) are separately provided, and each of them can be controlled independently. Therefore, it is also possible to eliminate the dead time from the detection of the firing of the address event to the pixel signal (gradation) reading, and perform the event detection and the gradation acquisition simultaneously in parallel.

1.7 First Modification

In the present embodiment, the case where the event pixel 330 and the gradation pixel 320 are provided with separate photoelectric conversion elements 331 or 321 has been illustrated, but the present embodiment is not limited to such a configuration, and for example, it is possible to make various modifications such as a configuration in which one photoelectric conversion element is shared by the event pixel 330 and the gradation pixel 320.

Figure 18:
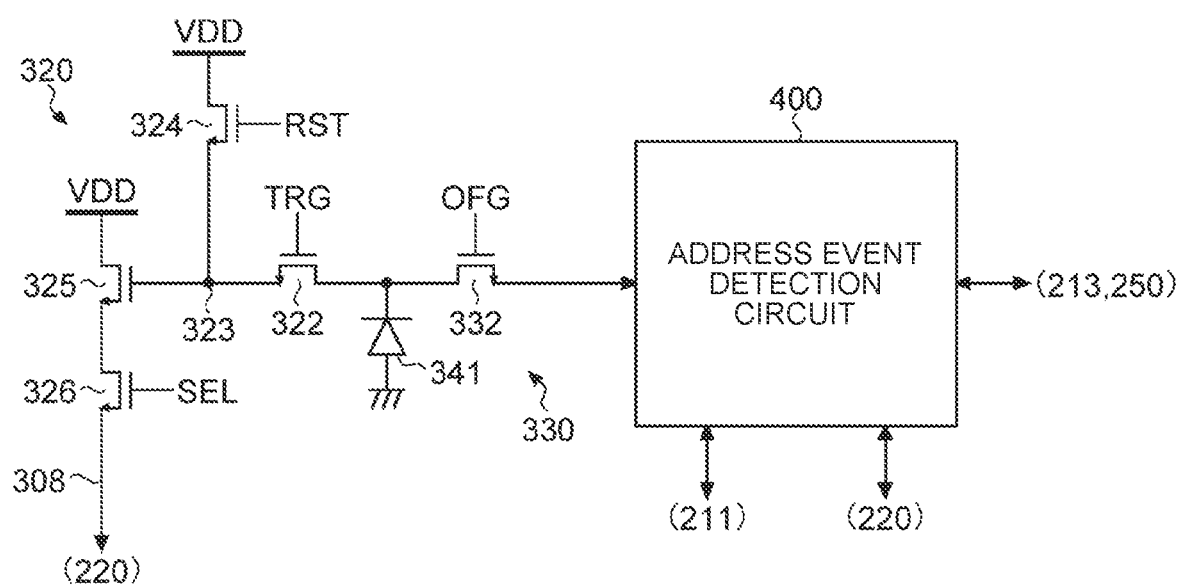
FIG. 18 is a circuit diagram illustrating a circuit configuration example of a pixel block according to a first modification of the first embodiment.

When one photoelectric conversion element is shared by the event pixel 330 and the gradation pixel 320, as illustrated in FIG. 18, a configuration is made in which a circuit configuration other than the photoelectric conversion element 331 in the event pixel 330 and a circuit configuration other than the photoelectric conversion element 321 in the gradation pixel 320 are connected to one photoelectric conversion element 341.

In the drive for the configuration illustrated in FIG. 18, an OverFlow Gate (OFG) transistor 332 is first turned on for monitoring the address event, and when the firing of the address event is detected in that state, the OFG transistor 332 is turned off and the transfer transistor 322 is turned on, and therefore, the electric charge generated in the photoelectric conversion element 341 is transferred to the floating diffusion layer 323 of the gradation pixel 320. Since the pixel signal read operation at that time is the same as the operation described above, detailed description thereof will be omitted here.

1.8 Second Modification

Figure 19:
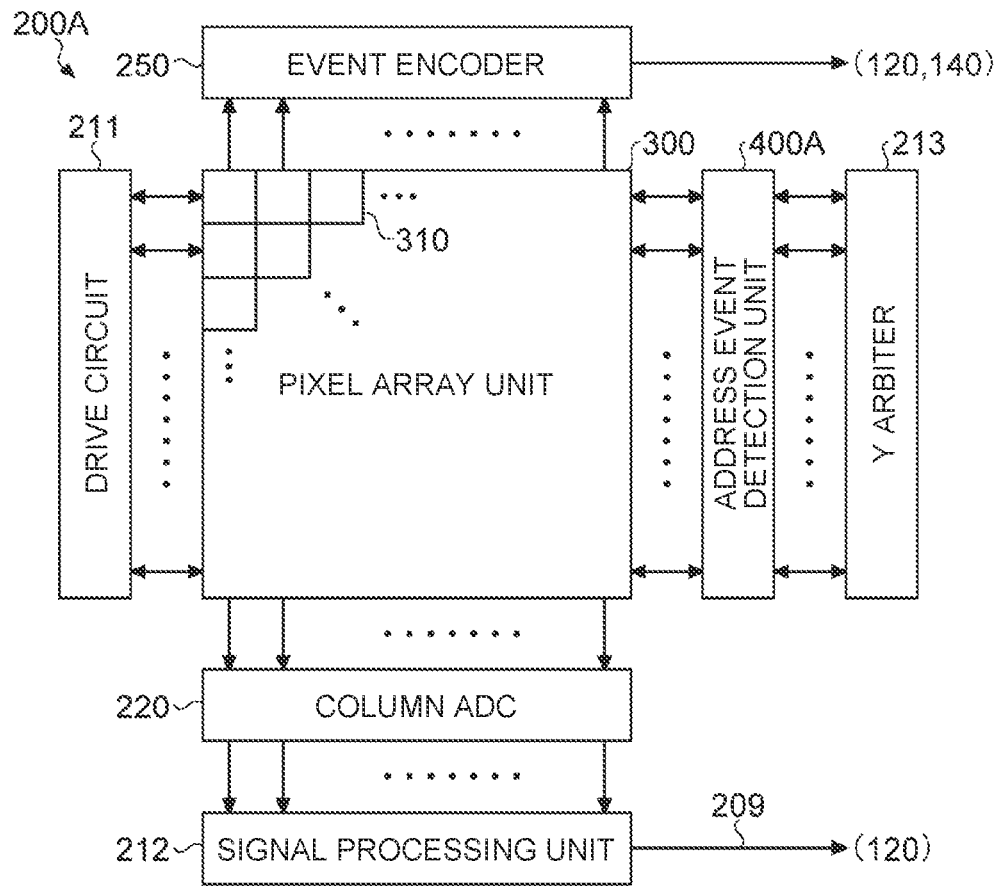
FIG. 19 is a block diagram illustrating a schematic configuration example of a solid-state imaging apparatus according to a second modification of the first embodiment.
Figure 20:
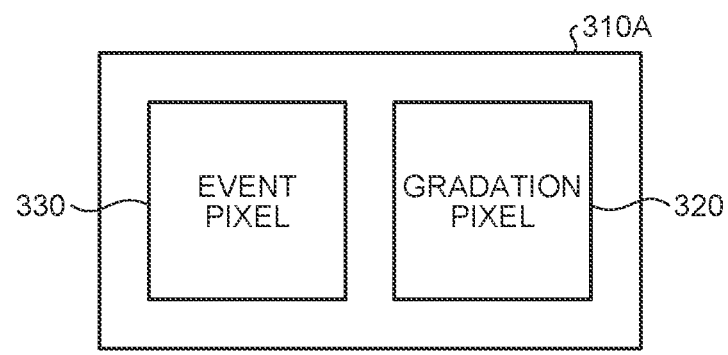
FIG. 20 is a block diagram illustrating a schematic configuration example of a pixel block according to the second modification of the first embodiment.

FIG. 19 is a block diagram illustrating a schematic configuration example of a solid-state imaging apparatus according to a second modification of the first embodiment. FIG. 20 is a block diagram illustrating a schematic configuration example of a pixel block according to the second modification of the first embodiment.

In the first embodiment described above, the case where the address event detection circuit 400 is provided in each pixel block 310 has been illustrated, but the configuration is not limited to this, and for example, as illustrated in FIG. 19, it is also possible to replace the address event detection circuit 400 of each pixel block 310A with an address event detection unit 400A composed of the common address event detection circuit 400 for each row.

With this configuration, as illustrated in FIG. 20, since the address event detection circuit 400 can be omitted from each pixel block 310A, it is possible to reduce the size of the solid-state imaging apparatus 200.

2. Second Embodiment

Next, the second embodiment will be described in detail with reference to the drawings. In the present embodiment, for the same configurations and operations as those in the above-described embodiment, above description will be referred to, and duplicate description will be omitted.

In the first embodiment described above, a configuration of a so-called one-column 1ADC in which one AD conversion unit 230 is provided for each column has been illustrated, but the configuration is not limited to such a configuration, and for example, a configuration can be adopted in which one AD conversion unit 230 is shared by two or more columns. Therefore, in the second embodiment, a case where one AD conversion unit 230 is shared by two or more columns will be described with an example.

The configuration of the imaging apparatus and the solid-state imaging apparatus according to the present embodiment may be the same as those of the imaging apparatus 100 and the solid-state imaging apparatus 200 exemplified in the first embodiment, for example. However, in the present embodiment, the AD conversion unit 230 is replaced with an AD conversion unit 530 described later.

2.1 Configuration Example of AD Conversion Unit

Figure 21:
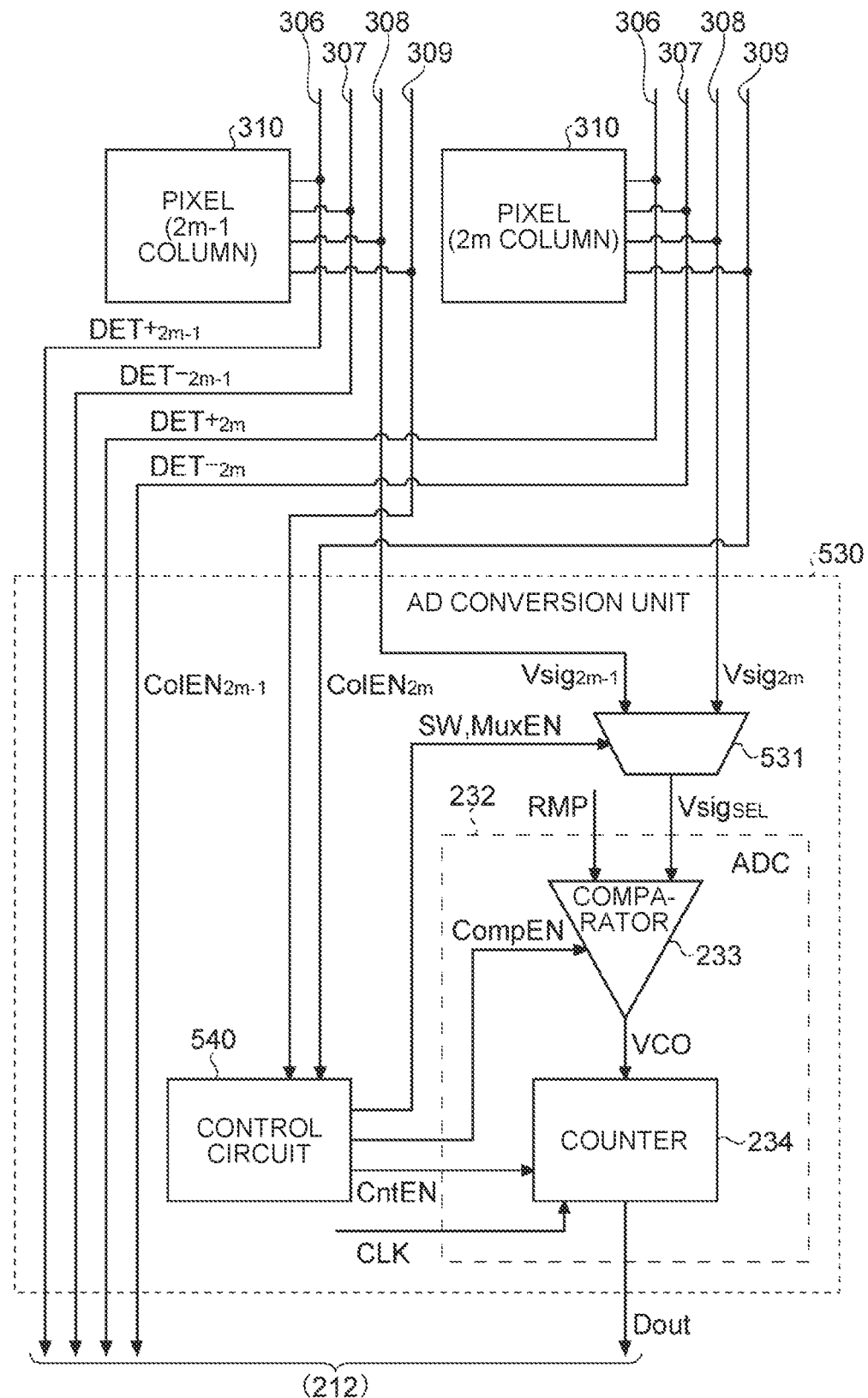
FIG. 21 is a block diagram illustrating a schematic configuration example of an AD conversion unit according to a second embodiment.

FIG. 21 is a block diagram illustrating a schematic configuration example of an AD conversion unit according to a second embodiment. As illustrated in FIG. 21, the AD conversion unit 530 includes a configuration in which the control circuit 240 is replaced with a control circuit 540 and a multiplexer 531 is added in the same configuration as that of the AD conversion unit 230 illustrated in FIG. 15. In this description, the two columns corresponding to the AD conversion unit 530 are 2m−1 (m is an integer of 1 to M) column and 2m column.

The multiplexer 531 selects one of a pixel signal Vsig2m−1 in the 2m−1 column and a pixel signal Vsig2m in the 2m column according to the control signal from the control circuit 540, and outputs the selected one as a pixel signal VsigSEL to the ADC 232. A switching signal SW and a multiplexer enable signal MuxEN are input to the multiplexer 531 as control signals.

As similar to the ADC 232 in FIG. 15, the ADC 232 includes a comparator 233 and a counter 234, and converts the pixel signal VsigSEL into a digital pixel signal Dout.

However, the comparator 233 compares a predetermined reference signal RMP with the pixel signal VsigSEL according to the comparator enable signal CompEN from the control circuit 540.

The control circuit 540 controls the multiplexer 531 and ADC 232 according to the column enable signals ColEN2m−1 and ColEN2m in the 2m−1 column and the 2m column, respectively. The details of the control contents will be described later.

The detection signals DET+ and DET− are output to the signal processing unit 212 via the AD conversion unit 530.

A single-slope ADC consisting of the comparator 233 and the counter 234 is used as the ADC 232, but the configuration is not limited to this. For example, a delta-sigma ADC can be used as the ADC 232.

2.2 Configuration Example of Control Circuit

Figure 22:
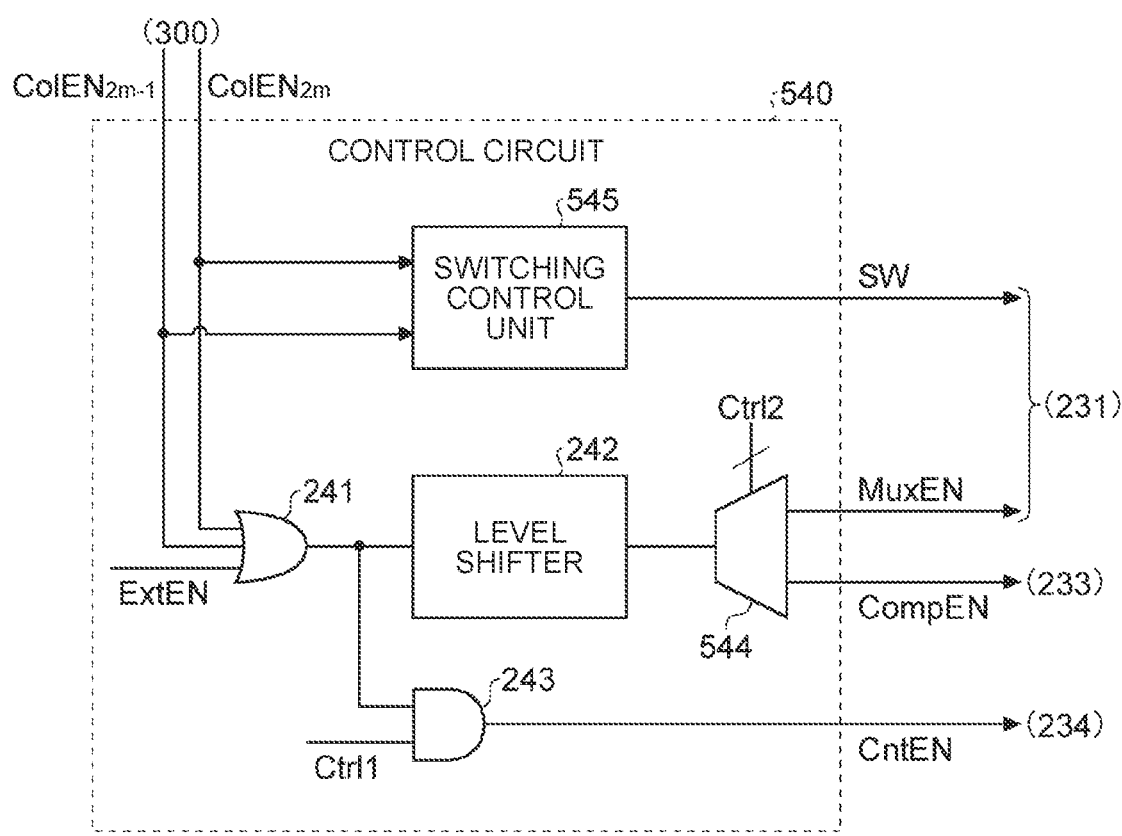
FIG. 22 is a block diagram illustrating a schematic configuration example of a control circuit according to the second embodiment.

FIG. 22 is a block diagram illustrating a schematic configuration example of the control circuit 540 according to the second embodiment. As illustrated in FIG. 22, the control circuit 540 further includes a demultiplexer 544 and a switching control unit 545 in addition to the same configuration as that of the control circuit 240 illustrated in FIG. 16.

The demultiplexer 544 distributes an output signal of the level shifter 242 to the multiplexer 531 and the comparator 233 according to a block control signal Crtl2. The block control signal Crtl2 is a signal for disabling at least one of the multiplexer 531 and the comparator 233 regardless of the presence or absence of an address event.

For example, when only the multiplexer 531 is disabled regardless of presence or absence of an address event, the binary number "10" is set in the block control signal Crtl2. In this case, the output signal of the level shifter 242 is output to the comparator 233 as a comparator enable signal CompEN. When only the comparator 233 is disabled, the binary number "01" is set in the block control signal Crtl2. In this case, the output signal of the level shifter 242 is output to the multiplexer 531 as a multiplexer enable signal MuxEN. When both the multiplexer 531 and the comparator 233 are disabled, "00" is set, and in other cases, "11" is set. When "11" is set, the output signal of the level shifter 242 is output to both the multiplexer 531 and the comparator 233.

The switching control unit 545 switches the pixel signal output by the multiplexer 531 on the basis of the column enable signals ColEN2m−1 and ColEN2m. For example, when only one of them is set to be enabled, the switching control unit 545 causes the multiplexer 531 to select the pixel signal of the enabled column by the switching signal SW. When both of the two columns are enabled, the switching control unit 545 causes the multiplexer 531 to select the pixel signal of one column by the switching signal SW, and then select the pixel signal of the other column.

2.3 Example of Switching Control in Pixel Signal Reading

Figure 23:
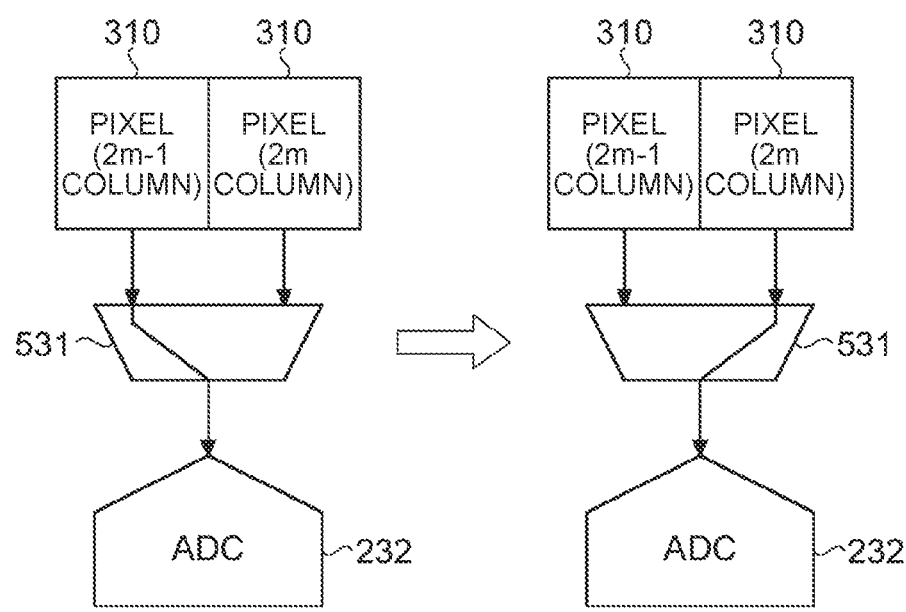
FIG. 23 is a diagram for explaining an example of read control at the time of reading a pixel signal according to the second embodiment.

FIG. 23 is a diagram for explaining an example of read control at the time of reading a pixel signal according to the second embodiment. In the present embodiment, as similar to the first embodiment, pixel signals are read from all the pixel blocks 310 included in the row to which the pixel block 310 in which the firing of the address event is detected belongs, and therefore, the control illustrated in FIG. 23 is performed in a case where firing of an address event is detected in at least one pixel block 310 among the pixel blocks 310 included in the row to which the pixel blocks 310 in the 2m−1 column and the 2m column belong.

As illustrated in FIG. 23, when firing of an address event is detected in at least one of the pixel block 310 in the 2m−1 column and the pixel block 310 in the 2m column, the control circuit 540 causes the multiplexer 531 to, for example, first select the pixel block 310 in the 2m−1 column, by the switching signal SW, and then select the pixel block 310 in the 2m column. In this case, the control circuit 540 enables the ADC 232 for the AD conversion period of the 2m−1 column and the 2m column.

When both the 2m−1 column and the 2m column are disabled, the control circuit 540 sets the ADC 232 to be disabled.

2.4 Action and Effect

As described above, a configuration where one AD conversion unit 230 is shared by two or more columns is adopted, and therefore, the number of AD conversion units 230 can be reduced, so that the size of the solid-state imaging apparatus 200 can be further reduced.

Since other configurations, operations, and effects may be the same as those in the above-described embodiment, detailed description thereof will be omitted here.

3. Third Embodiment

In the above-described embodiment, the case where one ADC 232 is associated with one or more columns is exemplified, but the configuration is not limited to such a configuration, and various modifications such as a configuration in which a plurality of ADCs 232 are associated with one column can be performed. Hereinafter, some of modifications will be described with reference to specific examples.

3.1 First Example

Figure 24:
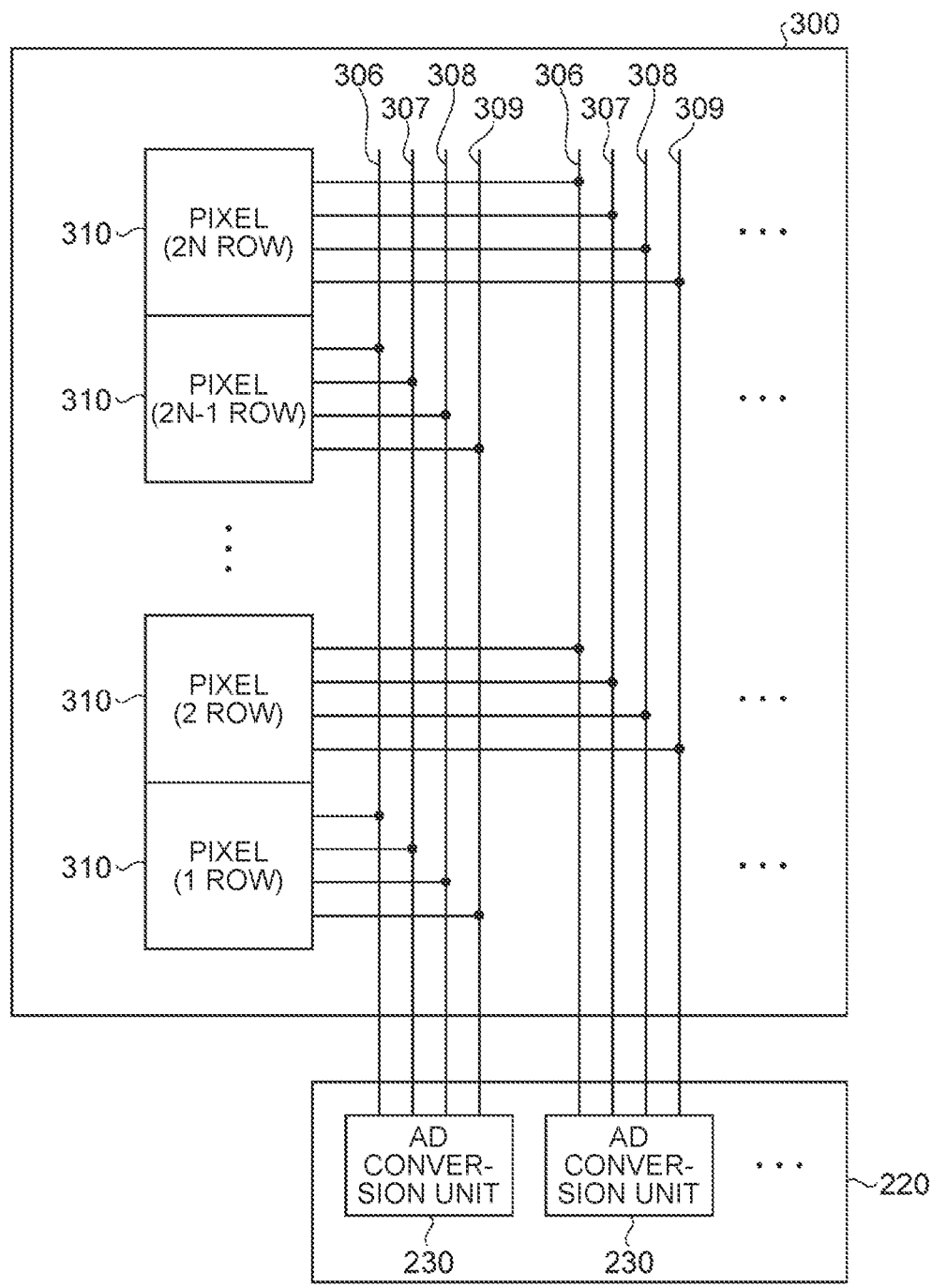
FIG. 24 is a plan view illustrating a layout example of a part of a pixel array unit and a column ADC according to a first example of a third embodiment.

FIG. 24 is a plan view illustrating a layout example of a part of a pixel array unit and a column ADC according to a first example of a third embodiment. As illustrated in FIG. 24, in the pixel array unit 300 according to a first example, two ADCs 232 are associated with one column.

The pixel block 310 of 2n (n is an integer of 1 to N) row in a case of a 2N (N is an integer) row is connected to one of the AD conversion units 230 via signal lines 306 to 309, and a 2n−1 row pixel block 310 is connected to the other AD conversion unit 230 via different signal lines 306 to 309.

With such a configuration, when a plurality of rows are read, it is possible to read the odd-numbered rows and the even-numbered rows in parallel, so that it is possible to further reduce the time difference from the detection of firing of an address event to the reading of the pixel signal (gradation).

3.2 Second Example

Figure 25:
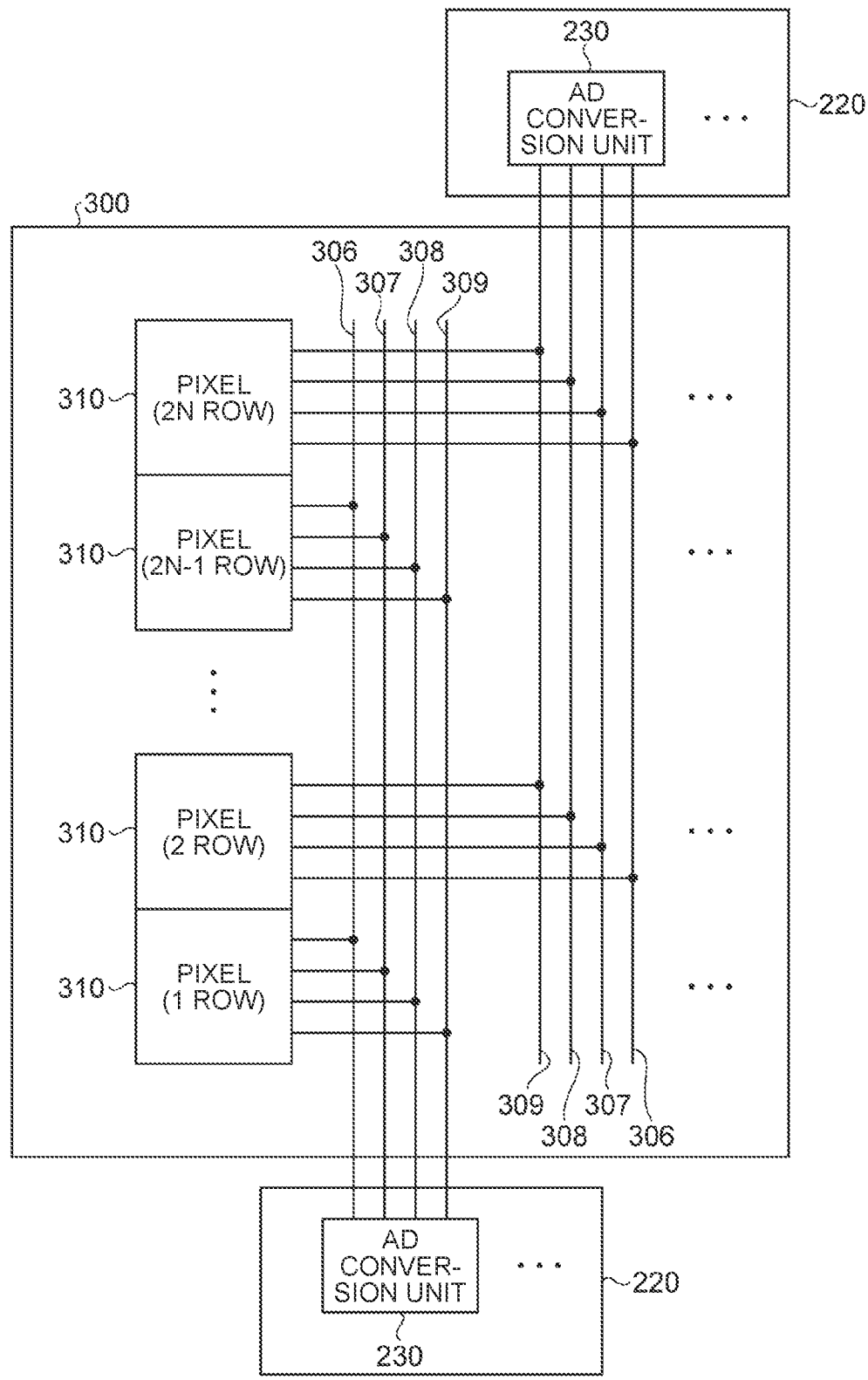
FIG. 25 is a plan view illustrating a layout example of a part of a pixel array unit and a column ADC according to a second example of the third embodiment.

FIG. 25 is a plan view illustrating a layout example of a part of a pixel array unit and a column ADC according to a second example of the third embodiment. As illustrated in FIG. 25, in the second example, in the same configuration as that in the first example, two ADCs 232 are arranged so as to sandwich the pixel array unit 300.

By dividing the column ADC 220 into two and arranging the divided column ADC 220 at a position sandwiching the pixel array unit 300 as described above, it is possible to reduce the circuit scale per column ADC 220.

3.3 Third Example

Figure 26:
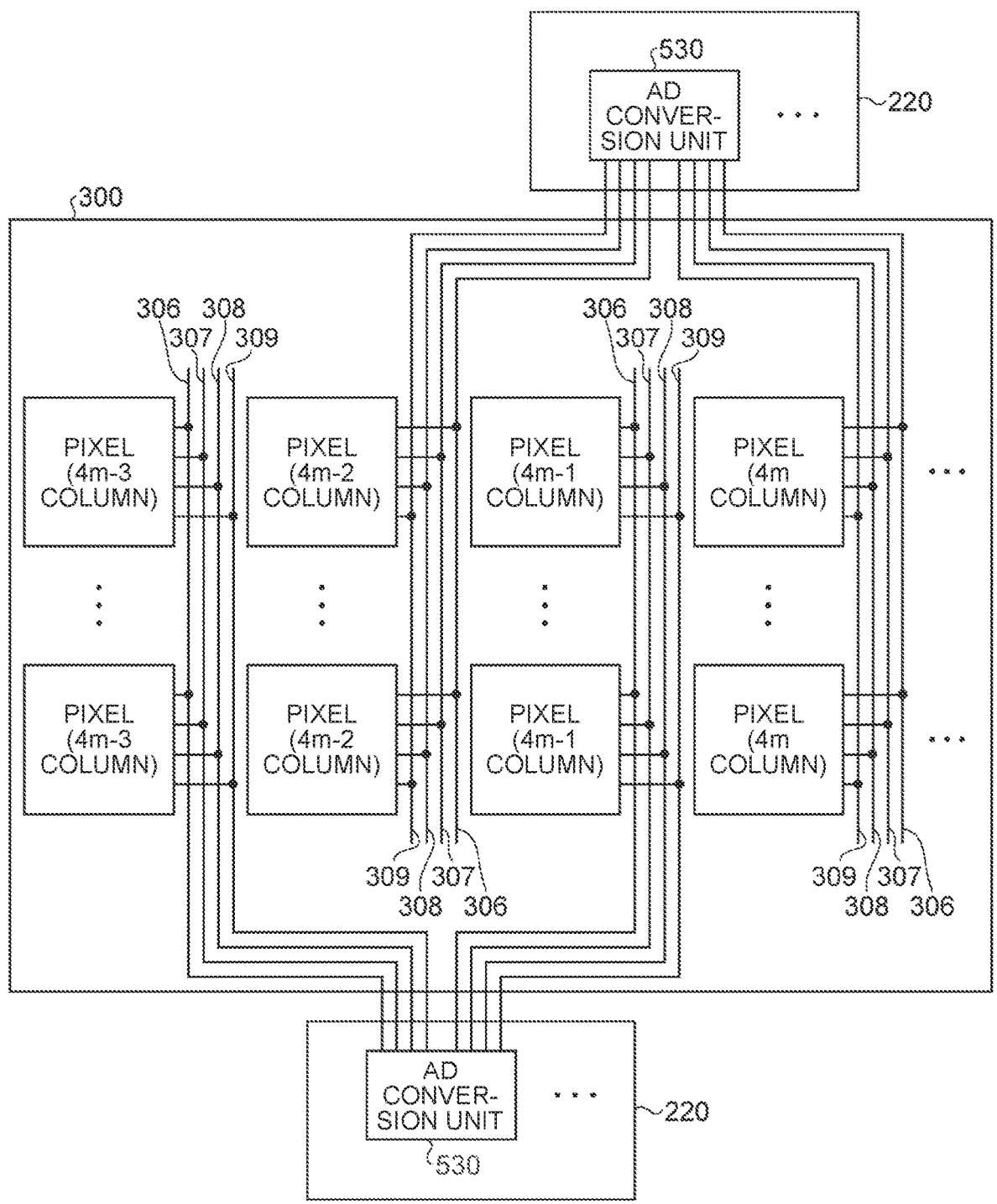
FIG. 26 is a plan view illustrating a layout example of a part of a pixel array unit and a column ADC according to a third example of the third embodiment.

FIG. 26 is a plan view illustrating a layout example of a part of a pixel array unit and a column ADC according to a third example of the third embodiment. As illustrated in FIG. 26, in a third example, assuming that the number of columns is 4M, a 4m column and a 4m−2 column are connected to the column ADC 220 arranged in the upper side from the pixel array unit 300, and the 4m−1 column and the 4m−3 column are connected to the column ADC 220 that is arranged in the lower side from the pixel array unit 300.

In the column ADC 220 in the lower side, an AD conversion unit 230 is arranged for every K columns for a total of 2M columns connected. When K is "2", M AD conversion units 530 are arranged. The configuration of each AD conversion unit 530 according to the third example may be the same as that of the AD conversion unit 530 according to the second embodiment.

As similar to this, the AD conversion unit 530 is arranged for every two columns in the upper column ADC 220.

As described above, the configuration of the third example is a configuration in which one AD conversion unit 530 is shared by a plurality of columns, and the column ADC 220 is further divided into two and arranged at a position sandwiching the pixel array unit 300. Therefore, it is possible to reduce the circuit scale of the entire column ADC 220 and reduce the circuit scale per column ADC 220.

4. Fourth Embodiment

Next, the fourth embodiment will be described in detail with reference to the drawings. In the following description, for the same configurations and operations as those in the above-described embodiment, above description will be referred to, and duplicate description will be omitted.

The configuration of the imaging apparatus according to the present embodiment may be the same as that of the imaging apparatus 100 exemplified in the first embodiment, for example. However, in the present embodiment, the solid-state imaging apparatus 200 is replaced with a solid-state imaging apparatus 600 described later.

4.1 Schematic Configuration Example of Solid-State Imaging Apparatus

Figure 27:
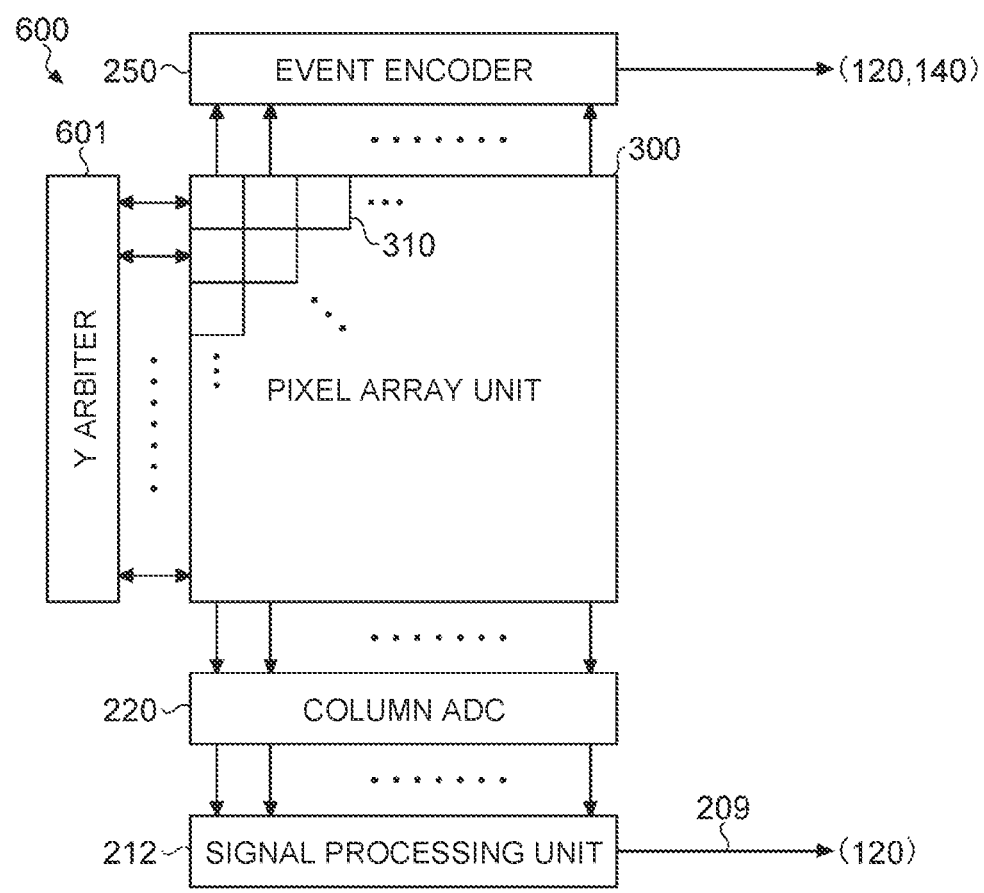
FIG. 27 is a block diagram illustrating a schematic configuration example of a solid-state imaging apparatus according to a fourth embodiment.

FIG. 27 is a block diagram illustrating a schematic configuration example of a solid-state imaging apparatus according to a fourth embodiment. As illustrated in FIG. 27, the solid-state imaging apparatus 600 has a configuration similar to that of the solid-state imaging apparatus 200 illustrated in FIG. 3, in which the drive circuit 211 is omitted and the Y arbiter 213 is replaced with a Y arbiter 601.

The Y arbiter 601 has the same function as that of the Y arbiter 213 in the first embodiment, and also has the function of the drive circuit 211 in the first embodiment. Therefore, when firing of an address event is detected in one or more pixel blocks 310 in the pixel array unit 300, the Y arbiter 601 arbitrates the reading order for the row to which each of the pixel blocks 310 in which firing of an address event is detected belongs, and drives each row according to the arbitrated reading order. As a result, pixel signals are read out in parallel in columns from each row to which the pixel block 310 in which firing of an address event is detected belongs.

4.2 Schematic Configuration Example of Y Arbiter

Figure 28:
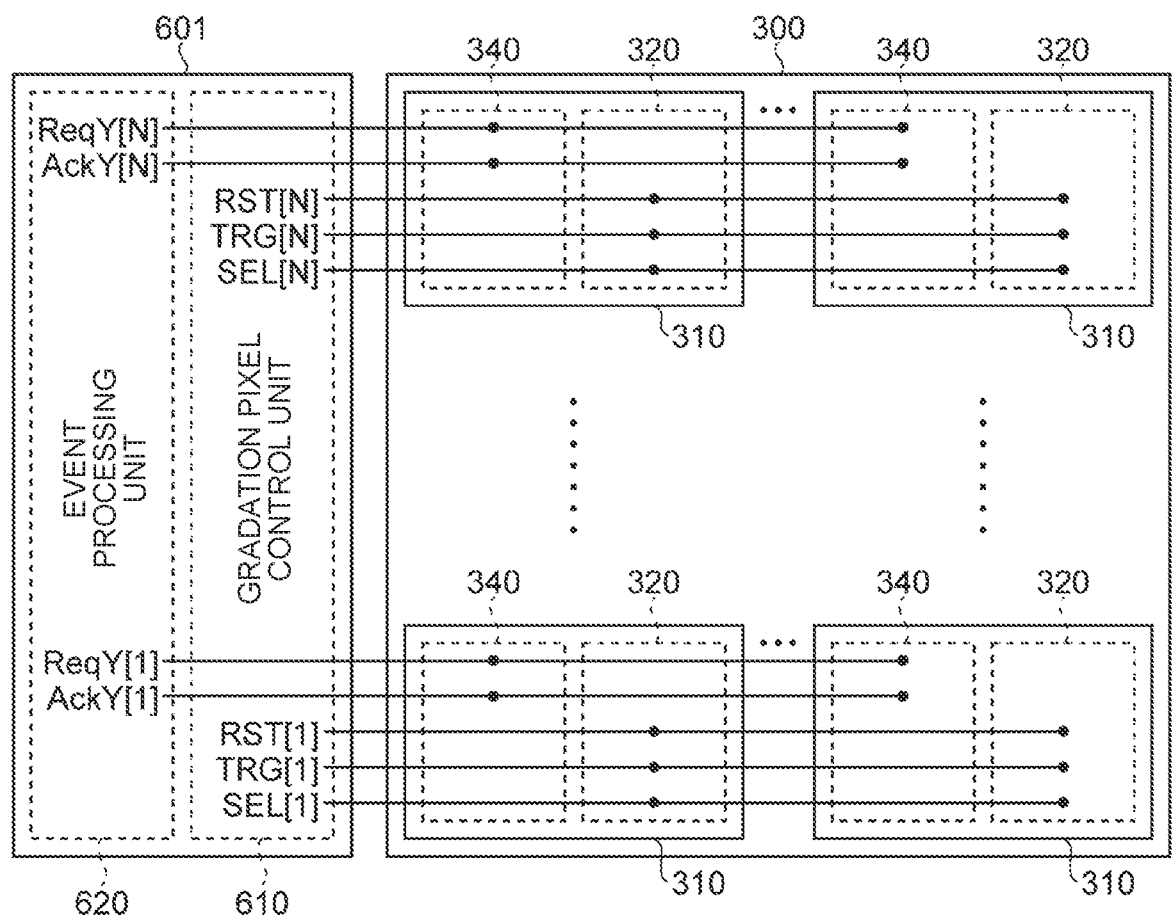
FIG. 28 is a block diagram illustrating a schematic configuration example of a Y arbiter according to the fourth embodiment.

FIG. 28 is a block diagram illustrating a schematic configuration example of a Y arbiter according to the fourth embodiment. As illustrated in FIG. 28, the Y arbiter 601 includes an event processing unit 620 and a gradation pixel control unit 610.

When a request ReqY is input from a plurality of pixel blocks 310 belonging to different rows, the event processing unit 620 arbitrates the reading order for the row and returns a response AckY according to the arbitration result to all the pixel blocks 310 belonging to that row. On the other hand, each pixel block 310 that has received the response AckY transmits a detection signal to the column ADC 220.

The event processing unit 620 inputs the arbitrated reading order to the gradation pixel control unit 610. The gradation pixel control unit 610 drives the rows according to the input reading order. As a result, in all the pixel blocks 310 included in the driven row, a pixel signal of a voltage value according to the amount of incident light on the photoelectric conversion element 321 appears on the vertical signal line 308.

The column ADC 220 reads the pixel signals appearing on each vertical signal line 308 in parallel in the column, thereby collectively reading the pixel signals for one row.

4.3 Schematic Configuration Example of Event Processing Unit

Figure 29:
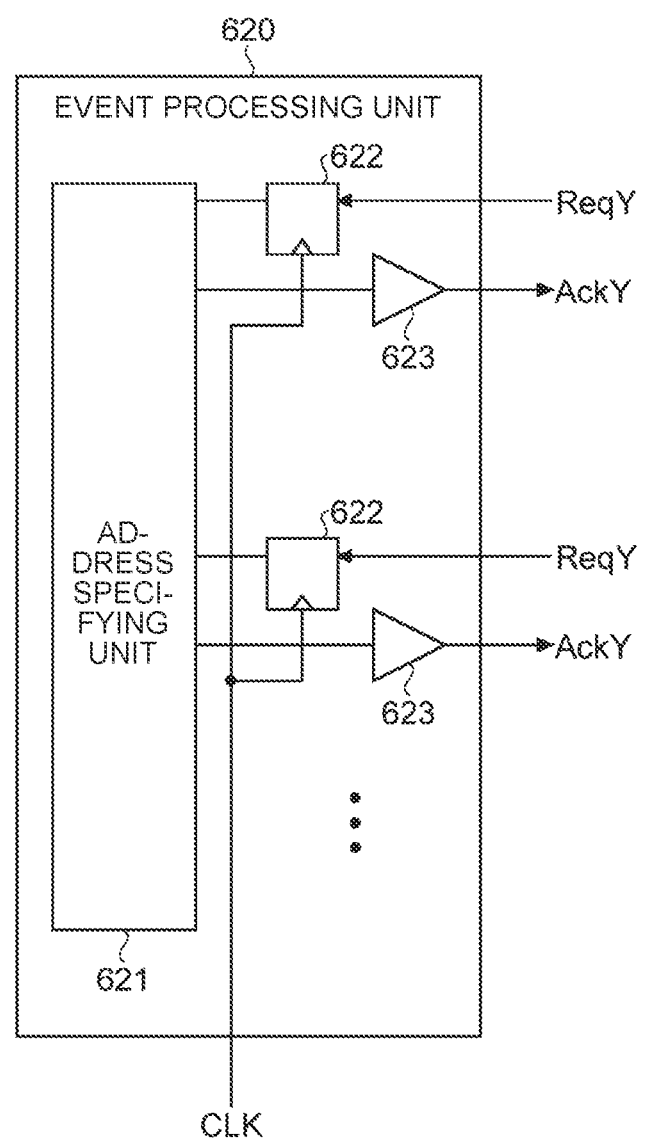
FIG. 29 is a block diagram illustrating a schematic configuration example of an event processing unit according to the fourth embodiment.

FIG. 29 is a block diagram illustrating a schematic configuration example of an event processing unit according to the fourth embodiment. As illustrated in FIG. 29, the event processing unit 620 includes an address specifying unit 621, a latch circuit 622, and a driver 623.

The latch circuit 622 is provided for each row and temporarily holds the request ReqY input from the pixel block 310. Then, the latch circuit 622 inputs the held request ReqY to the address specifying unit 621 in synchronization with the input clock CLK.

On the basis of the input request ReqY, the address specifying unit 621 identifies a Y address of the row to which the pixel block 310, which is the source of the request ReqY, belongs, and outputs a response AckY to the driver 623 corresponding to the identified Y address.

The driver 623 that has received an input of the response AckY inputs the input response AckY to all the pixel blocks 310 included in the row corresponding to the Y address.

4.4 Schematic Configuration Example of Gradation Pixel Control Unit

Figure 30:
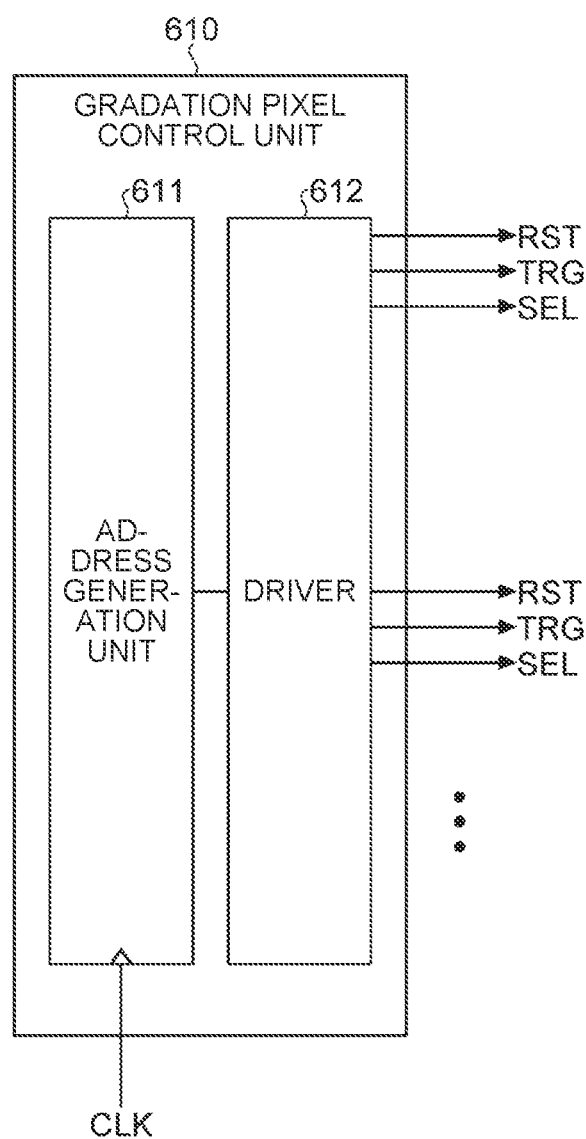
FIG. 30 is a block diagram illustrating a schematic configuration example of a gradation pixel control unit according to the fourth embodiment.

FIG. 30 is a block diagram illustrating a schematic configuration example of a gradation pixel control unit according to the fourth embodiment. As illustrated in FIG. 30, the gradation pixel control unit 610 includes an address generation unit 611 and a driver 612.

The address generation unit 611 identifies the Y address of the pixel block 310, which is the source of the detection signal, and inputs the identified Y address to the driver 612 in synchronization with the clock CLK.

The driver 612 appropriately inputs the reset signal RST, the transfer signal TRG, and the selection signal SEL to all the pixel blocks 310 included in the row of the Y address input from the address generation unit 611, to drive all the pixel blocks 310 of the row.

4.5 Action and Effect

As described above, according to the present embodiment, since the drive circuit 211 can be omitted, the circuit scale of the solid-state imaging apparatus 600 can be reduced to reduce the size.

Since other configurations, operations, and effects may be the same as those in the above-described embodiment, detailed description thereof will be omitted here.

5. Fifth Embodiment

In the above-described embodiment, a case has been exemplified in which, when firing of an address event is detected in a certain pixel block 310, pixel signals are read out in parallel in columns from all the pixel blocks 310 included in the row to which the pixel block 310 belongs. On the other hand, in the fifth embodiment, a case where pixel signals are periodically read from all or part of the pixel blocks 310 regardless of firing of an address event, and image data (hereinafter, referred to as gradation image data) including the read pixel signals is updated with event detection data will be described with an example.

The configuration of the imaging apparatus and the solid-state imaging apparatus according to the present embodiment may be the same as those of the imaging apparatus 100 and the solid-state imaging apparatus 200, 200A, or 600 exemplified in the above-described embodiment, for example. In the following description, a case based on the fourth embodiment will be exemplified. However, the based embodiment is not limited to the fourth embodiment, and other embodiments can be used.

5.1 Operation Example of Solid-State Imaging Apparatus

In the present embodiment, the solid-state imaging apparatus 200 performs address event detection operation for asynchronously detecting firing of an address event and periodic read operation for periodically acquiring gradation image data from the pixel block 310.

5.1.1 Event Detection Operation Example

Figure 31:
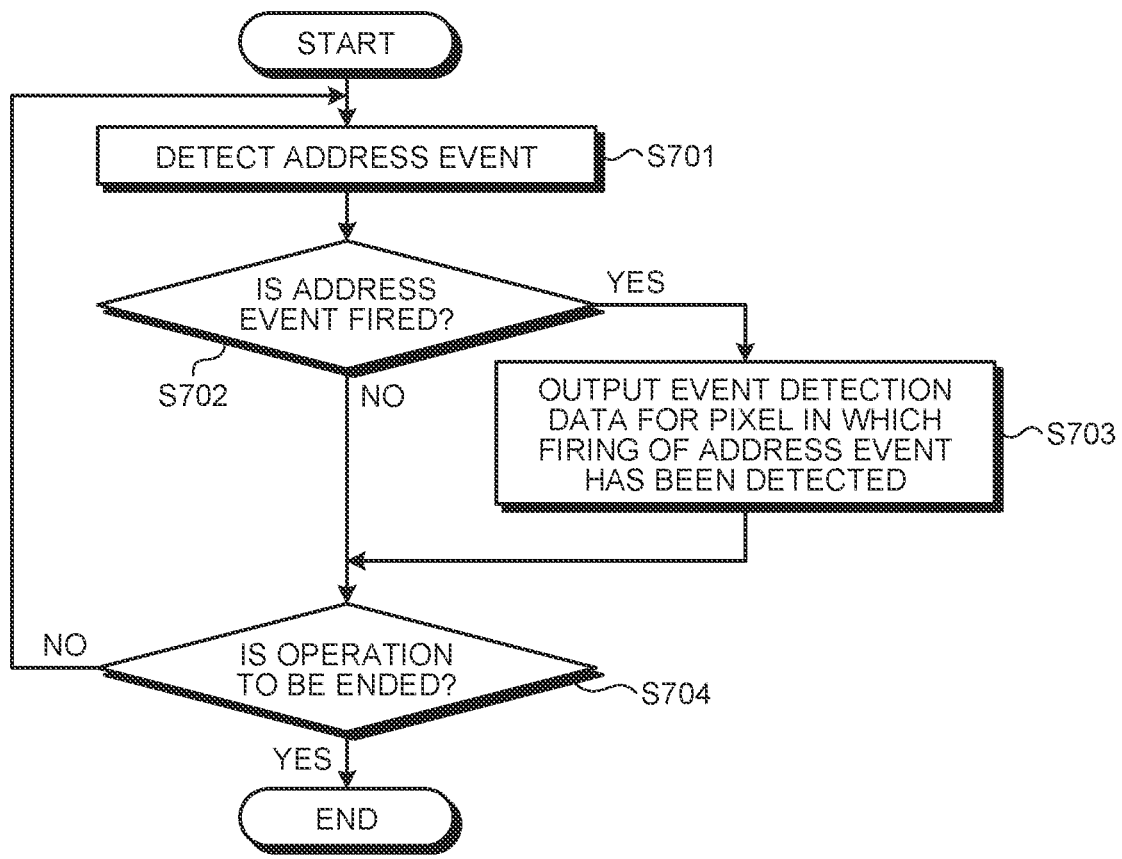
FIG. 31 is a flowchart illustrating an example of event detection operation according to a fifth embodiment.

FIG. 31 is a flowchart illustrating an example of event detection operation according to a fifth embodiment. This operation is started, for example, when an application for detecting and imaging an address event is executed.

As illustrated in FIG. 31, the solid-state imaging apparatus 200 starts detecting presence or absence of firing of an address event (Step S701), and determines whether or not an address event occurs (Step S702). The event pixel 330 is used to detect firing of an address event. When the firing of the address event is not detected (NO in Step S702), this operation proceeds to Step S704.

On the other hand, when the firing of the address event is detected (YES in Step S702), the event encoder 250 outputs the event detection data for the pixel block 310 in which the firing of the address event is detected (Step S703), and thereafter, the operation proceeds to Step S704. The event detection data read in Step S703 is stored in the recording unit 120 or transmitted to the host 150 via the external I/F 140.

In Step S704, the solid-state imaging apparatus 200 determines whether or not to end the main operation, and when the main operation is ended (YES in Step S704), the solid-state imaging apparatus 200 ends the main operation. On the other hand, when the main operation is not ended (NO in Step S704), the process returns to Step S701 and the subsequent operations are performed.

5.1.2 Periodic Read Operation Example

Figure 32:
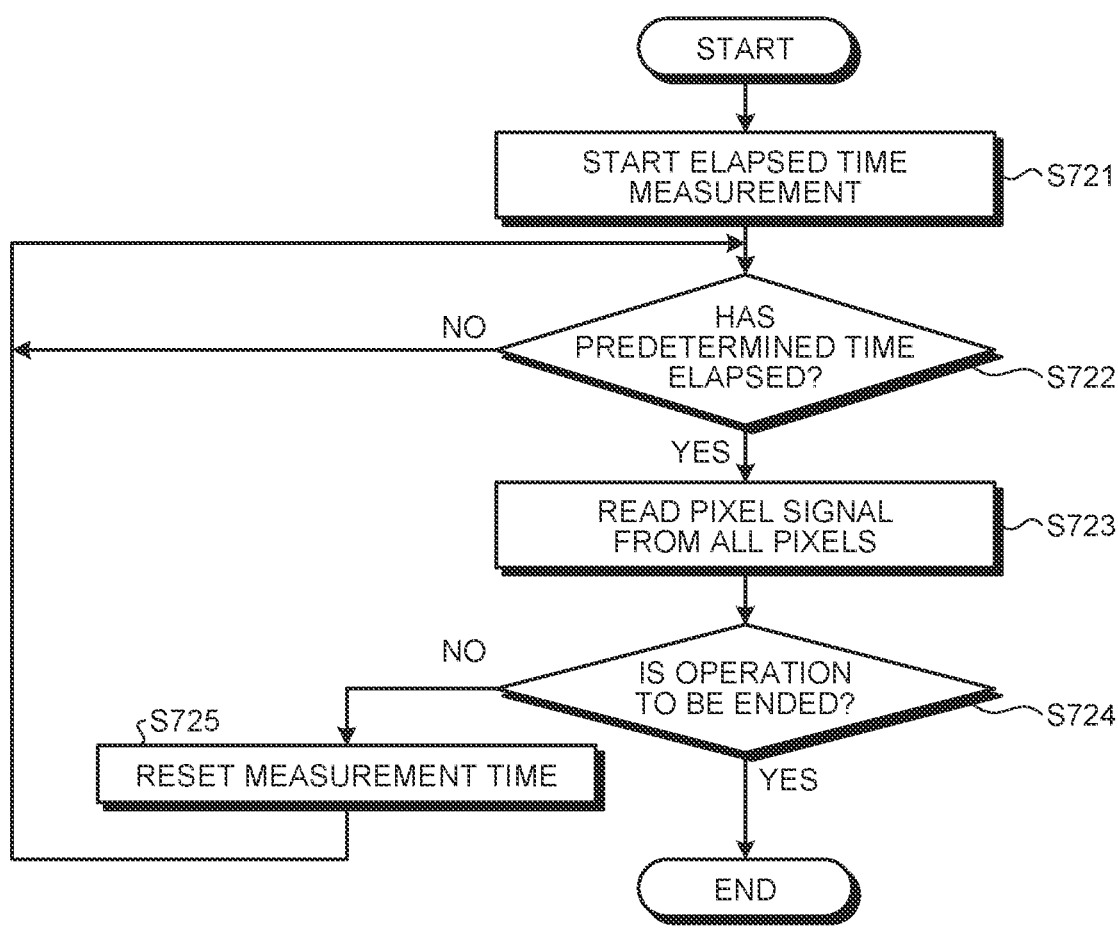
FIG. 32 is a flowchart illustrating an example of periodic read operation according to the fifth embodiment.

FIG. 32 is a flowchart illustrating an example of periodic read operation according to the fifth embodiment. As similar to event detection operation, this operation is started, for example, when an application for detecting and imaging an address event is executed.

As illustrated in FIG. 32, the solid-state imaging apparatus 200 starts measuring the elapsed time (Step S721) and waits until the predetermined time elapses (NO in Step S722). Thereafter, when a predetermined time elapses (YES in Step S722), the solid-state imaging apparatus 200 causes the gradation pixel control unit 610 of the Y arbiter 601 to read the pixel signal from all pixel blocks 310 (step S723), and the process proceeds to Step S724. The pixel signal read in Step S723 is stored in the recording unit 120 as gradation image data, or is transmitted to the host 150 via the external I/F 140.

In Step S724, the solid-state imaging apparatus 200 determines whether or not to end the operation, and when the main operation is ended (YES in Step S724), the solid-state imaging apparatus 200 ends the main operation. On the other hand, when the operation is not ended (NO in Step S724), the counter or the like measuring the elapsed time is reset (Step S725), then the process returns to Step S722, and subsequent operations are performed.

As described above, the gradation image data read by the periodic read operation is sequentially updated using the event detection data output by the event detection operation (gradation image data update operation). This gradation image data update operation may be performed by, for example, the signal processing unit 212 in the solid-state imaging apparatus 200, or may be performed by the external control unit 130, the host 150, or the like.

5.2 Gradation Image Data Update Operation Example

Next, the gradation image data update operation according to the fifth embodiment will be described in detail with reference to the drawings.

5.2.1 Flowchart

Figure 33:
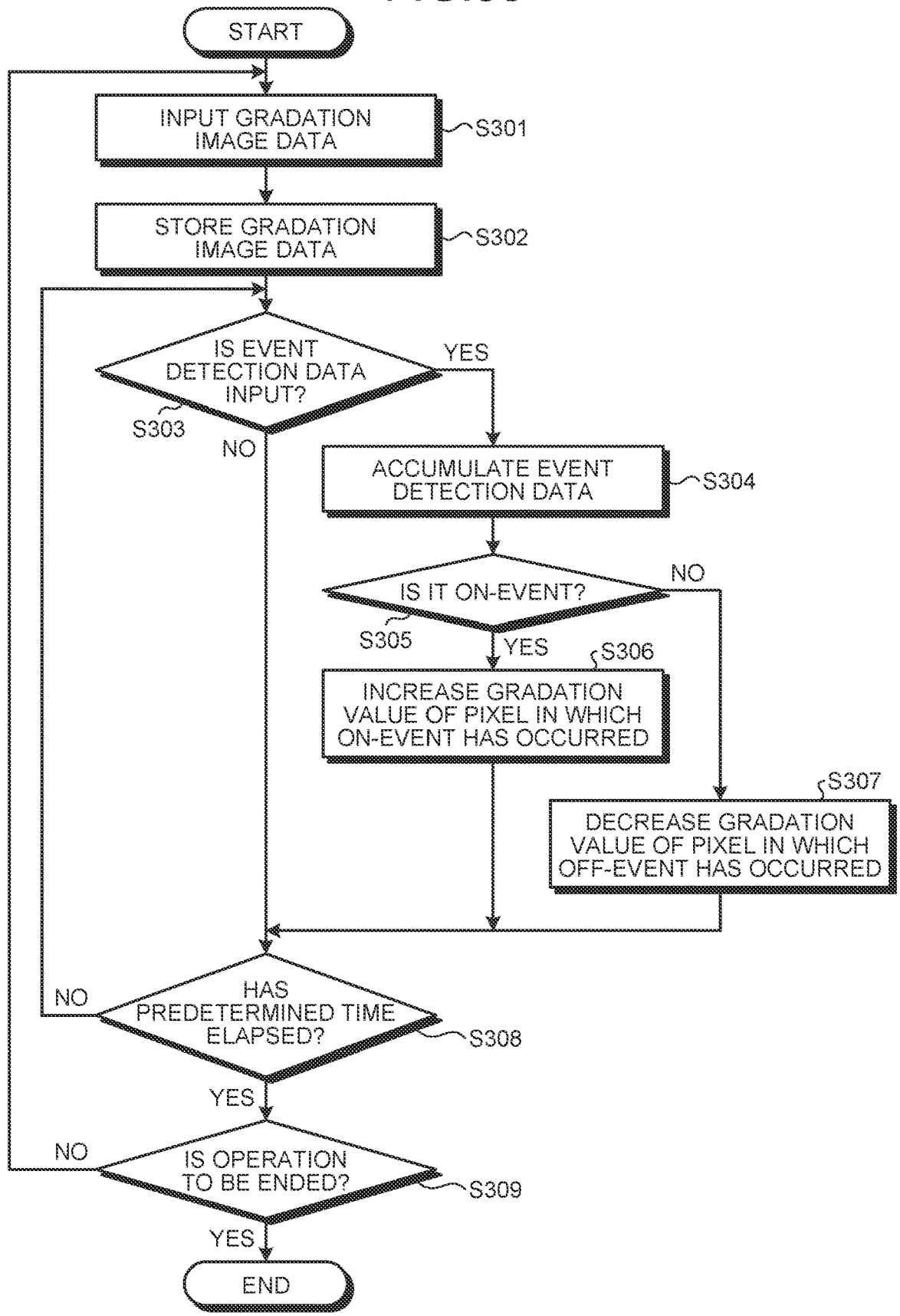
FIG. 33 is a flowchart illustrating an example of gradation image data update operation according to the fifth embodiment.

FIG. 33 is a flowchart illustrating an example of gradation image data update operation according to the fifth embodiment. In this description, an example will be given in which the host 150 executes the gradation image data update operation.

As illustrated in FIG. 33, when the host 150 inputs the gradation image data from the solid-state imaging apparatus 200 (Step S301), the host 150 stores the input gradation image data in a predetermined memory (Step S302).

Next, the host 150 determines whether or not the event detection data has been input from the solid-state imaging apparatus 200 within a predetermined time (Step S303), and when the event detection data has not been input (NO in Step S303), the process proceeds to Step S308.

On the other hand, when the event detection data is input (YES in Step S303), the host 150 stores the input event detection data in a predetermined memory (Step S304).

Next, the host 150 determines whether the input event detection data indicates on-event or off-event (Step S305), and when the event detection data indicates on-event (YES in Step S305), the host adds a predetermined value to a gradation value (also referred to as pixel value) of the pixel identified from the X address and Y address included in the event detection data to increase the gradation value of the pixel (Step S306), and the process proceeds to Step S308.

When the address event indicated by the input event detection data is not an on-event, that is, an off-event (NO in Step S305), the host 150 subtracts a predetermined value from a gradation value of a pixel (also referred to as a pixel value) identified from the X address and the Y address included in the event detection data to decrease the gradation value of the pixel (Step S307), and the process proceeds to Step S308.

In Step S308, it is determined whether or not a predetermined time has elapsed since the input of the previous gradation image data, and when the predetermined time has not elapsed (NO in Step S308), the process returns to step S303, and the host 150 performs subsequent operations. On the other hand, when the predetermined time has elapsed (YES in Step S308), the host 150 determines whether or not the operation is ended (Step S309), and when the operation is ended (YES in Step S309), the operation is ended. On the other hand, when the operation is not ended (NO in Step S309), the process returns to Step S301, and the host 150 inputs the next gradation image data, and performs subsequent operations. The predetermined time may be an acquisition period of gradation image data in the solid-state imaging apparatus 200, that is, the frame rate.

5.2.2 Timing Chart

Figure 34:
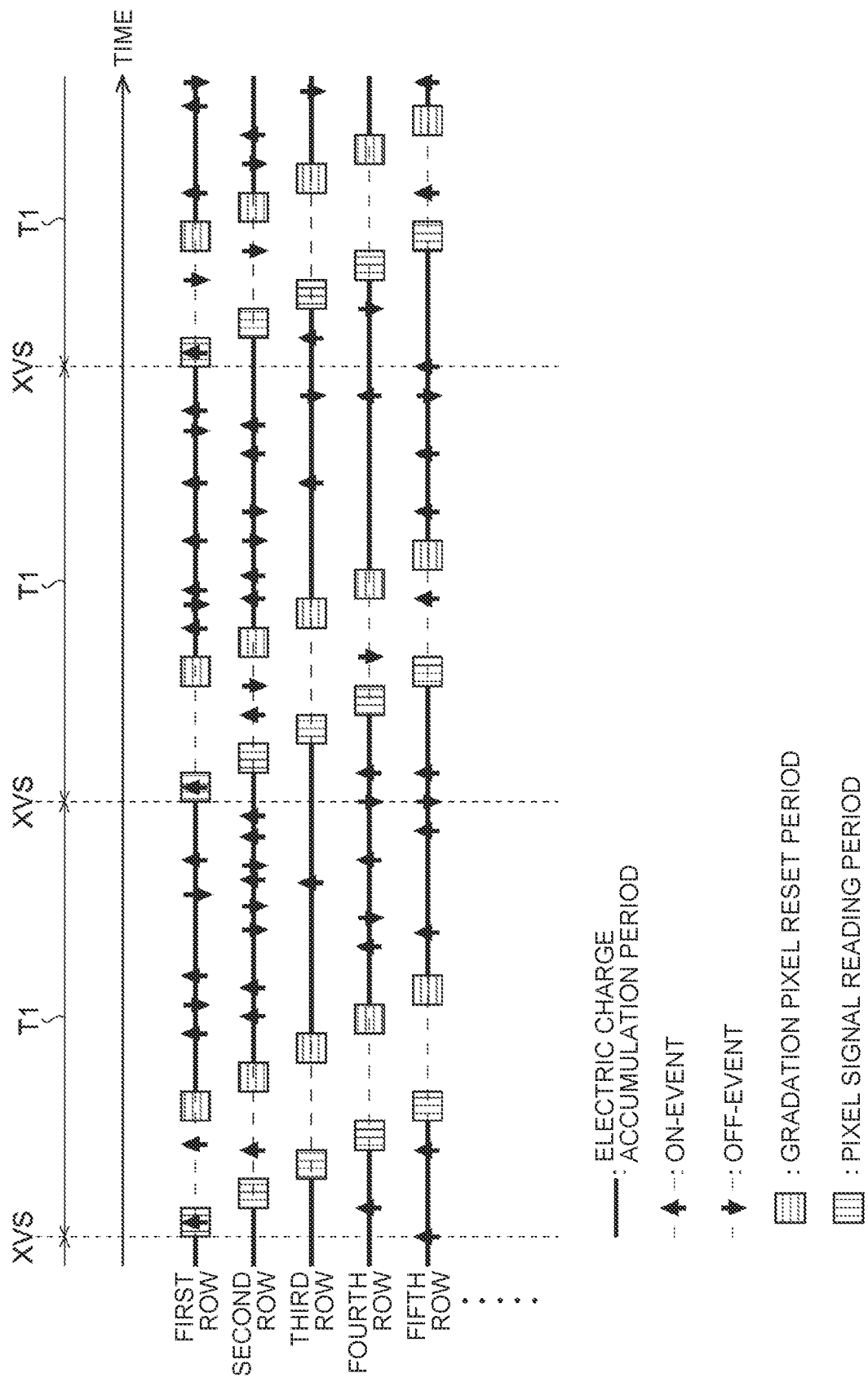
FIG. 34 is a timing chart illustrating an operation example of a solid-state imaging apparatus according to the fifth embodiment.
Figure 35:
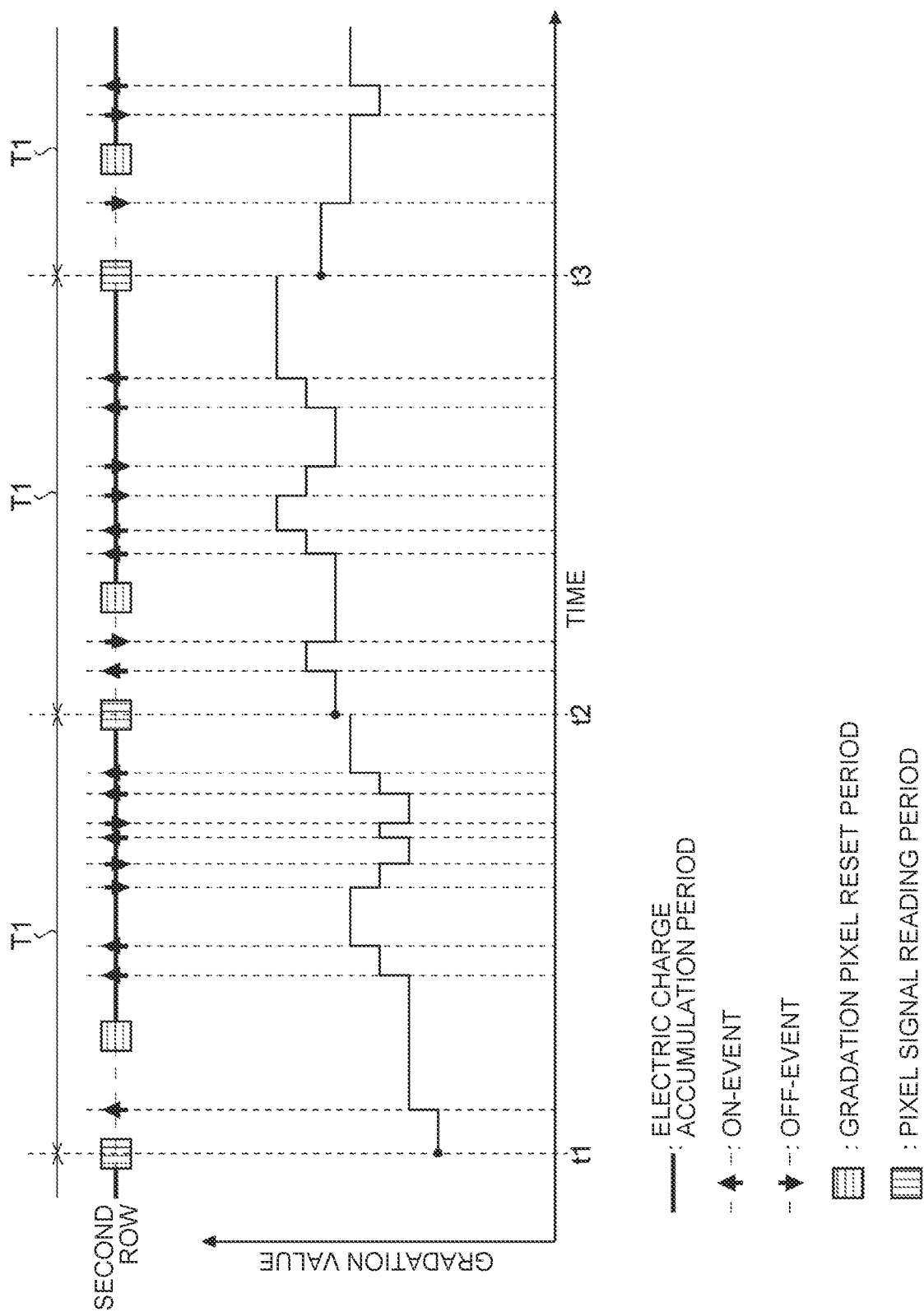
FIG. 35 is a timing chart for explaining updating of a gradation value focusing on a pixel block in the second row in FIG. 34.

FIG. 34 is a timing chart illustrating an operation example of a solid-state imaging apparatus according to the fifth embodiment. Note that FIG. 34 illustrates an operation example of the pixel block 310 in a certain column. FIG. 35 is a timing chart for explaining updating of a gradation value focusing on a pixel block in the second row in FIG. 34.

First, as illustrated in FIG. 34, in the present embodiment, reset operation and pixel signal read operation for the gradation pixel 320 are performed in order from the pixel block 310 in the first row in synchronization with a frame synchronization signal XVS input in a predetermined cycle T1.

On the other hand, separately from the periodic reset operation and read operation for the gradation pixel 320 described above, the presence or absence of firing of an address event using the event pixel 330 is detected asynchronously.

Focusing on the pixel block 310 in the second row in FIG. 34, for example, as illustrated in FIG. 35, the gradation value by the pixel signal read from the gradation pixel 320 at timing t1 is increased or decreased with a predetermined value according to whether the detected address event is an on-event or an off-event, until the pixel signal is read from the gradation pixel 320 at next timing t2, that is, during the period from timing t1 to t2, every time an address event is detected in the event pixel 330.

As similar to this, also in the next period from timing t2 to t3, the gradation value by the pixel signal read from the gradation pixel 320 at timing t2 is increased or decreased with a predetermined value according to whether the detected address event is an on-event or an off-event, during the period from timing t2 to t3, every time an address event is detected in the event pixel 330.

5.3 Action and Effect

In general, for the time required for event detection, a storage period or a transfer period as in the pixel signal read operation is not necessary, so that the time resolution is higher than that of the time required for reading a pixel signal. Therefore, as in the present embodiment, by increasing or decreasing the gradation value of each pixel in the gradation image data acquired by the pixel signal read operation on the basis of the on-event and the off-event detected by the event detection operation, it is possible to improve the time resolution of the gradation image data read from the solid-state imaging apparatus 200, in other words, to increase the frame rate.

In addition, by accumulating the gradation image data acquired periodically and the event detection data acquired asynchronously in chronological order, it is also possible to generate a gradation image between frames in an ex-post facto manner.

Since other configurations, operations, and effects may be the same as those in the above-described embodiment, detailed description thereof will be omitted here.

6. Sixth Embodiment

In the fifth embodiment described above, a case where pixel signals are periodically read from all or part of the pixel blocks 310 regardless of firing of an address event, and the gradation image data read thereby is updated with as event detection data has been exemplified. However, for the pixel block 310 in which firing of an address event is not detected during a certain period, there is a high possibility that the gradation value by the pixel signal read from the gradation pixel 320 has not changed.

Therefore, in the sixth embodiment, a case will be described where, in the periodic reading of the pixel signal from the pixel block 310, pixel signal reading from the gradation pixel 320 is not performed for the pixel block 310 in which firing of an address event is not detected during the immediately preceding period.

As similar to the fifth embodiment, the configuration of the imaging apparatus and the solid-state imaging apparatus according to the present embodiment may be the same as those of the imaging apparatus 100 and the solid-state imaging apparatus 200, 200A, or 600 exemplified in the above-described embodiment, for example. However, in the present embodiment, the event processing unit 620 illustrated in FIG. 29 is replaced with an event processing unit 720 described later. In the following description, a case based on the fourth embodiment will be exemplified, but the based embodiment is not limited to the fourth embodiment, and other embodiments may be used.

6.1 Schematic Configuration Example of Event Processing Unit

Figure 36:
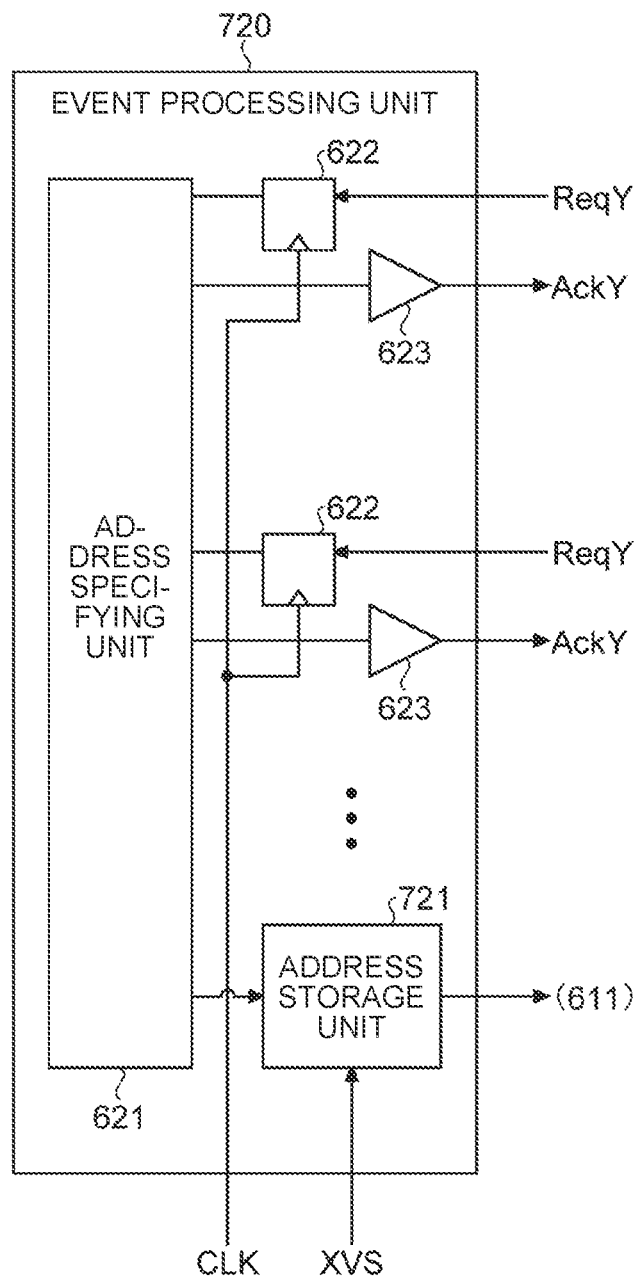
FIG. 36 is a block diagram illustrating a schematic configuration example of an event processing unit according to a sixth embodiment.

FIG. 36 is a block diagram illustrating a schematic configuration example of an event processing unit according to the sixth embodiment. As illustrated in FIG. 36, the event processing unit 720 further includes an address storage unit 721 in addition to the same configuration as that of the event processing unit 620 illustrated in FIG. 29.

In the present embodiment, the address specifying unit 621 identifies an X address and a Y address of the pixel block 310, which is the source of the request ReqY on the basis of the input request ReqY, and outputs a response AckY to the driver 623 corresponding to the identified X address and Y address.

The driver 623 that has received an input of the response AckY inputs the input response AckY to the pixel block 310 identified by the X address and the Y address.

The address storage unit 721 temporarily holds the X address and the Y address (address information) identified by the address specifying unit 621. Thereafter, the address storage unit 721 inputs the held X address and Y address to the address generation unit 611 of the gradation pixel control unit 610 in synchronization with the frame synchronization signal XVS.

The address generation unit 611 of the gradation pixel control unit 610 inputs the X address and the Y address input from the address storage unit 721 to the driver 612 in synchronization with the clock CLS. The driver 612 appropriately inputs the reset signal RST, the transfer signal TRG, and the selection signal SEL to the pixel block 310 identified by the X address and the Y address input from the address generation unit 611, to drive the pixel block 310.

6.2 Gradation Image Data Update Operation Example

Figure 37:
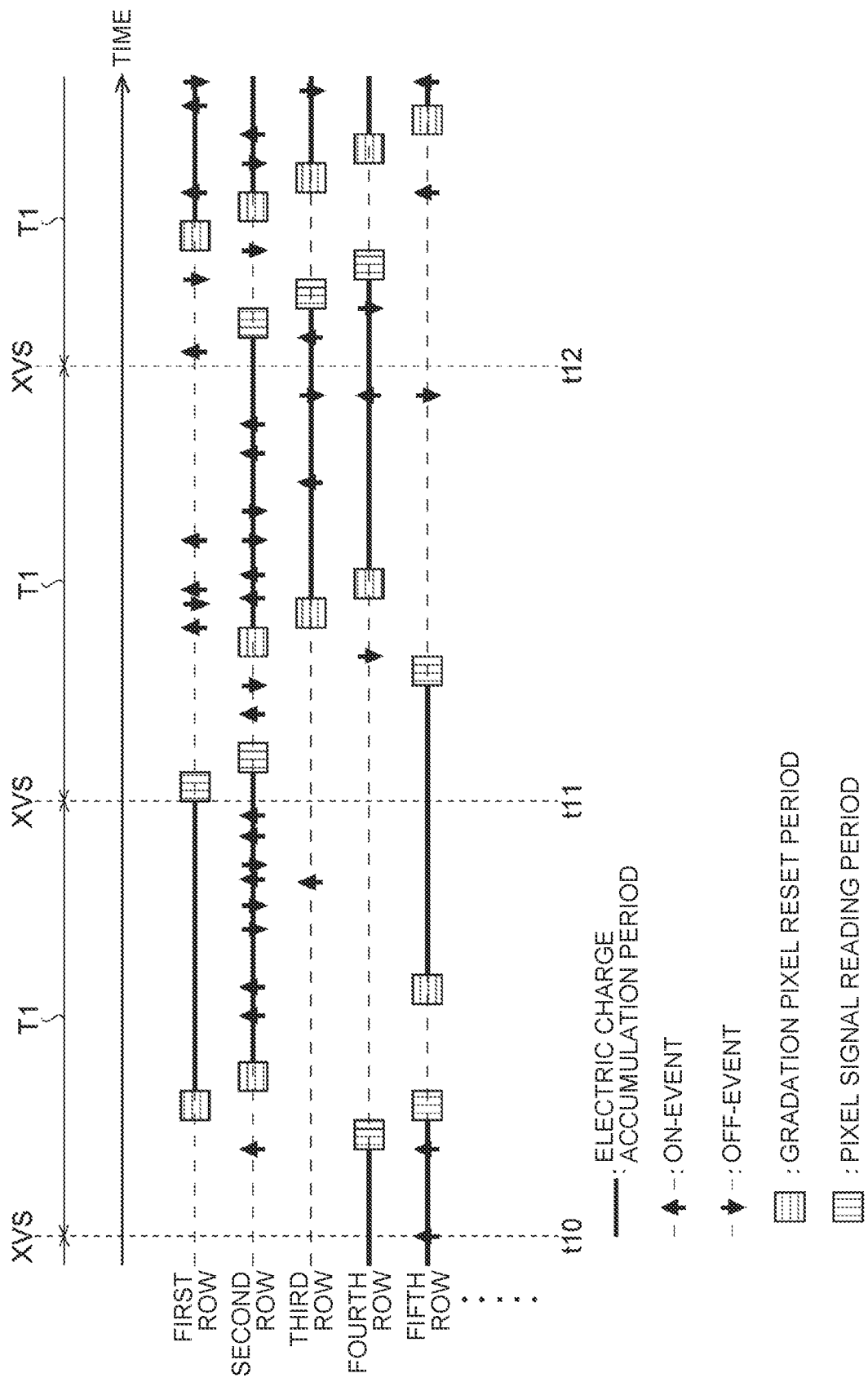
FIG. 37 is a timing chart illustrating an operation example of a solid-state imaging apparatus according to the sixth embodiment.

FIG. 37 is a timing chart illustrating an operation example of a solid-state imaging apparatus according to the sixth embodiment. As similar to FIG. 34, FIG. 37 illustrates an operation example of the pixel block 310 in a certain column.

As illustrated in FIG. 37, in the present embodiment, for the pixel block 310 in which firing of an address event is not detected in the period of the immediately preceding cycle T1, reset operation of the gradation pixel 320 and pixel signal read operation are not performed in the next period of the cycle T1.

Explaining this by focusing on the pixel block 310 in the first row and the pixel block 310 in the second row, firing of an address event is not detected in the event pixel 330 of the pixel block 310 in the first row during the period from timing t10 to t11. In this case, since the X address and Y address of the pixel block 310 in the first row are not held in the address storage unit 721, reset operation and read operation for the gradation pixel 320 of the pixel block 310 in the first row are not performed in the next cycle (timing t12 to t13).

On the other hand, for the pixel block 310 in the second row, since firing of one or more address events is detected during the period from timing t10 to t11, reset operation and read operation for the gradation pixel 320 of the pixel block 310 in the second row are performed in the next cycle (timing t12 to t13).

6.3 Action and Effect

As described above, according to the present embodiment, for the pixel block 310 in which firing of an address event is not detected during the immediately preceding period, pixel signal reading from the gradation pixel 320 of the pixel block 310 is omitted. As a result, it is possible to simplify the periodic pixel signal read operation, thereby improving the operating speed of the solid-state imaging apparatus 600 and reducing the power consumption.

Since other configurations, operations, and effects may be the same as those in the above-described embodiment, detailed description thereof will be omitted here.

7. Seventh Embodiment

In the above-described embodiment, a case where the gradation value of each pixel in the gradation image data is updated on the basis of the address event detected between the frames has been exemplified. On the other hand, in a seventh embodiment, a case where a pixel signal is read asynchronously from the gradation pixel 320 of the pixel block 310 in which firing of an address event is detected, and the gradation image data that has been periodically read is updated will be described with an example.

As similar to the fifth embodiment, the configuration of the imaging apparatus and the solid-state imaging apparatus according to the present embodiment may be the same as those of the imaging apparatus 100 and the solid-state imaging apparatus 200, 200A, or 600 exemplified in the above-described embodiment, for example. However, in the present embodiment, the pixel block 310 illustrated in FIG. 4 is replaced with a pixel block 810 described later. In the following description, a case based on the fourth embodiment will be exemplified, but the based embodiment is not limited to the fourth embodiment, and other embodiments may be used.

7.1 Pixel Block Configuration Example

Figure 38:
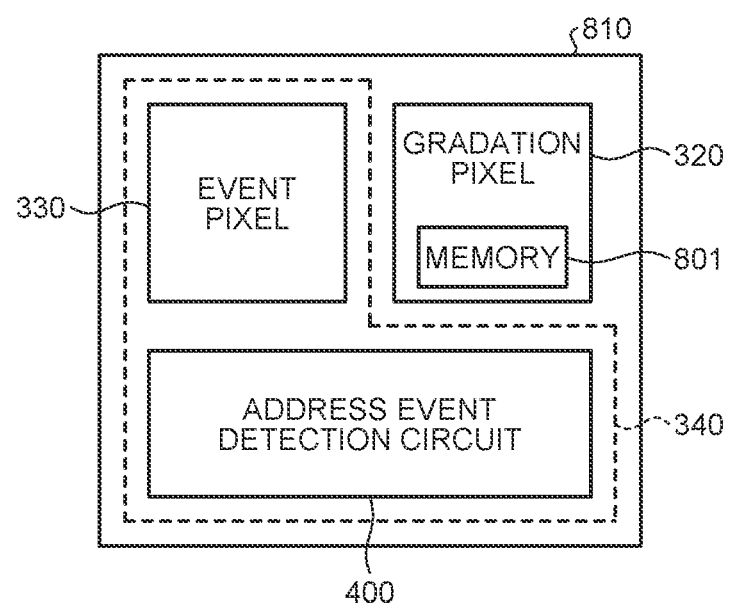
FIG. 38 is a block diagram illustrating a schematic configuration example of a pixel block according to a seventh embodiment.

FIG. 38 is a block diagram illustrating a schematic configuration example of a pixel block according to a seventh embodiment. As illustrated in FIG. 38, in the pixel block 810, for example, in the same configuration as the pixel block 310 illustrated in FIG. 4, the gradation pixel 320 further includes a memory 801.

The memory 801 is an electric charge storage unit that temporarily holds the electric charge generated in the photoelectric conversion element 321 and may be configured by using, for example, a capacitance element formed on the same semiconductor substrate as the photoelectric conversion element 321.

The electric charge generated in the photoelectric conversion element 321 according to the amount of incident light is temporarily transferred to the memory 801 and held. Thereafter, the electric charge held in the memory 801 is transferred to the floating diffusion layer 323 by the read operation for the gradation pixel 320, and then the same operation as the normal read operation is performed.

7.2 Pixel Signal Read Operation Example

Figure 39:
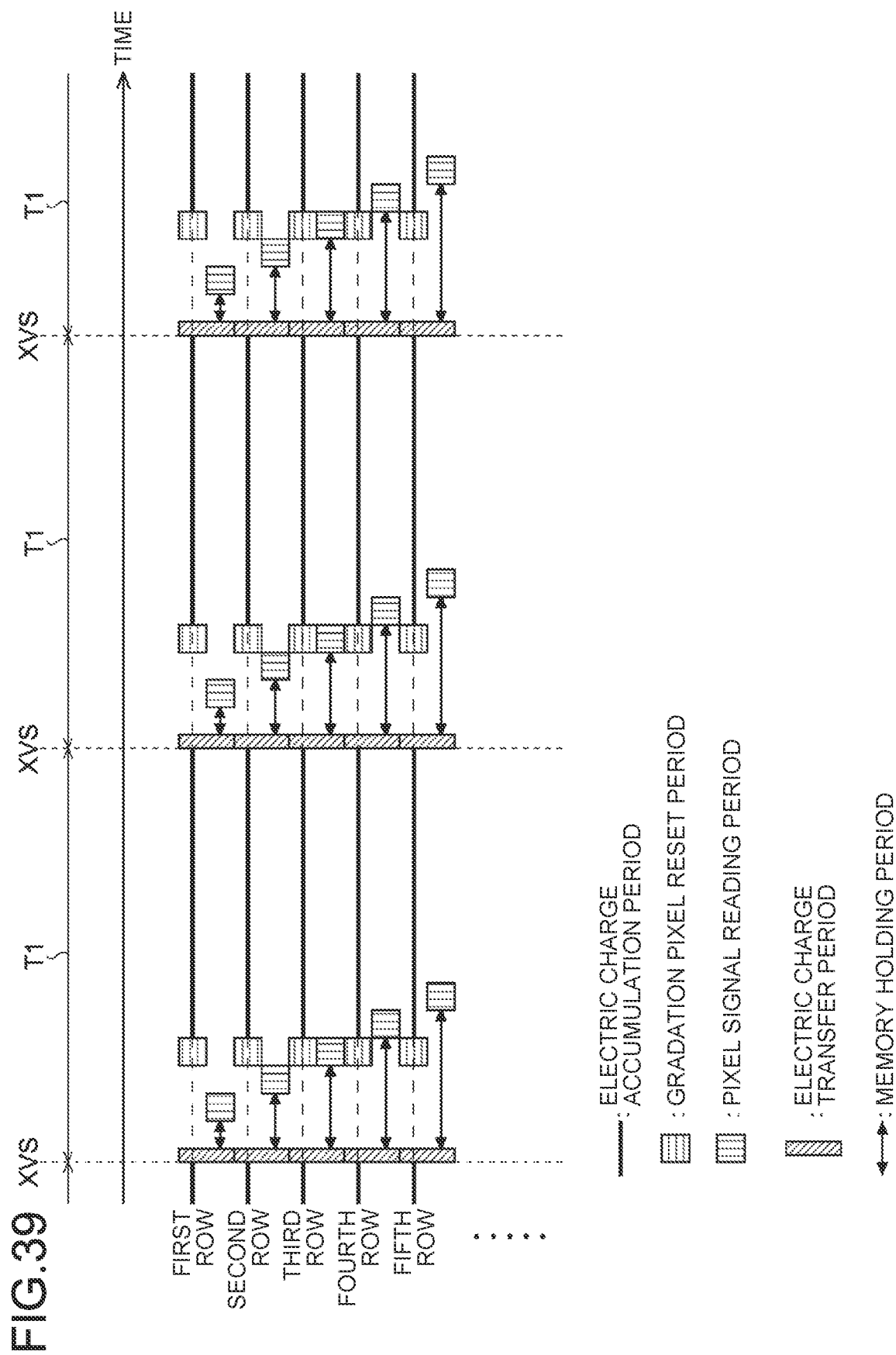
FIG. 39 is a timing chart illustrating an example of pixel signal read operation according to the seventh embodiment.

FIG. 39 is a timing chart illustrating an example of pixel signal read operation according to the seventh embodiment.

Note that FIG. 39 illustrates an operation example of the pixel block 810 in a certain column.

As illustrated in FIG. 39, in the present embodiment, electric charges are transferred from the photoelectric conversion element 321 in the gradation pixel 320 of each pixel block 810 to the memory 801 in synchronization with the frame synchronization signal XVS. Thereafter, for example, pixel signal read operation is performed in order from the pixel block 810 in the first row to the pixel block 810 in the last row.

The event detection operation may be the same as that of the above-described embodiment.

7.3 Action and Effect

As described above, by temporarily holding the electric charge generated by the photoelectric conversion element 321 of the gradation pixel 320 in the memory 801, so-called global shutter operation can be realized in which shutter operation (corresponding to the reset operation) of all the pixel blocks 810 is performed at the same time.

Since other configurations, operations, and effects may be the same as those in the above-described embodiment, detailed description thereof will be omitted here.

7.4 Modification

The pixel signal read operation using the memory 801 according to the present embodiment can be combined with a configuration that has been exemplified in the sixth embodiment in which pixel signal reading for the gradation pixel 320 in the pixel block 310 (810) in which firing of an address event is not detected in a certain period is omitted.

Figure 40:
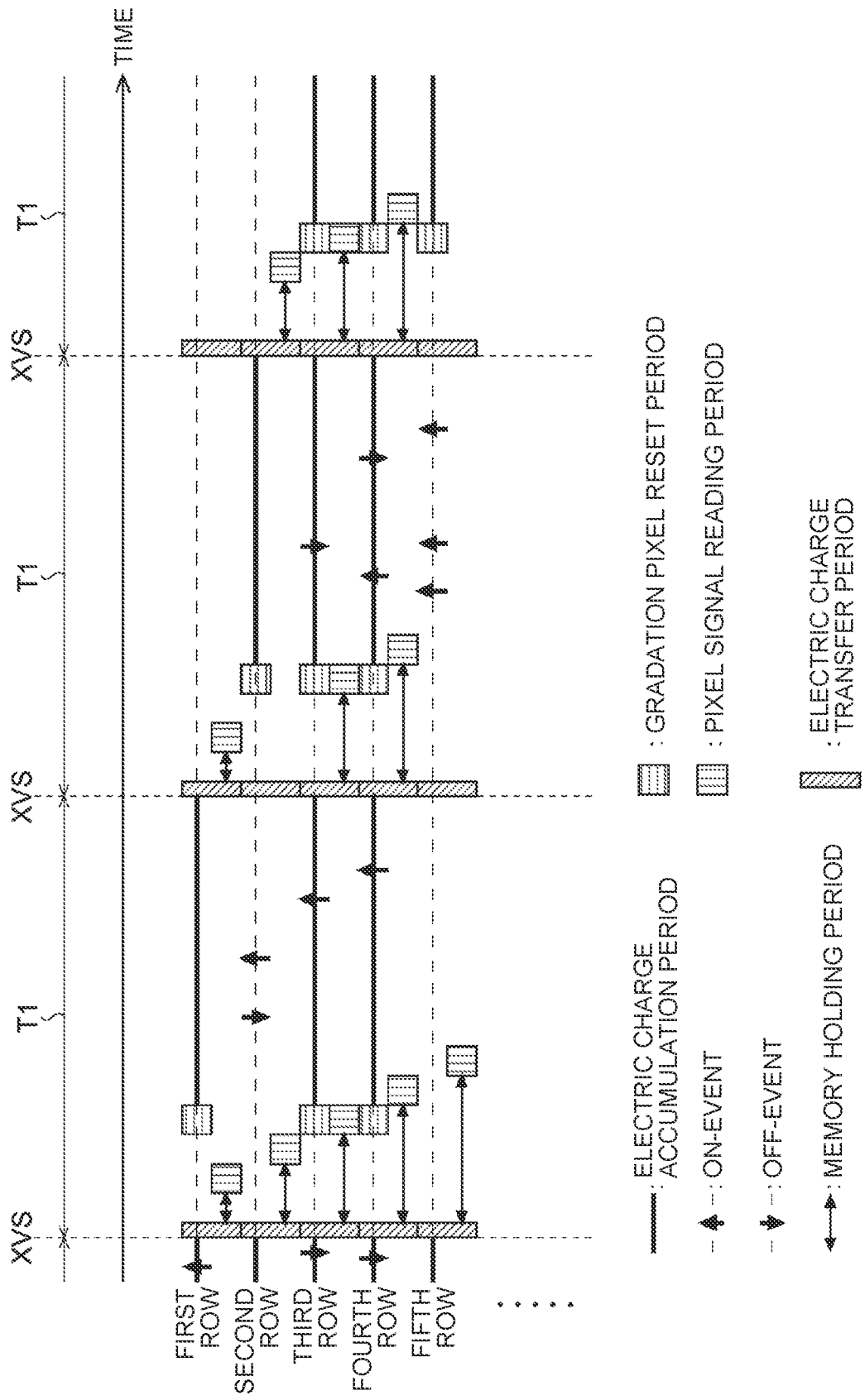
FIG. 40 is a timing chart illustrating an example of pixel signal read operation according to a modification of the seventh embodiment.

In this case, as illustrated in FIG. 40, for the pixel block 810 in which firing of an address event is not detected in the period of the immediately preceding cycle T1, reset operation of the gradation pixel 320 and pixel signal read operation are not performed in the next period of the cycle T1. As a result, it is possible to simplify the periodic pixel signal read operation, thereby improving the operating speed of the solid-state imaging apparatus 600 and reducing the power consumption.

8. Eighth Embodiment

In an eighth embodiment, some examples of modifications of the pixel block according to the above-described embodiment will be described. In the following description, the pixel block described with reference to FIGS. 4 and 5 in the first embodiment is used as a base, but the based pixel block is not limited to this, and the pixel block according to other embodiments may be used.

Due to recent advances in process technology, the gradation pixel 320 is becoming finer. Therefore, when the gradation pixel 320 and the event pixel 330 are combined as in the above-described embodiment, the difference between a pitch (which may be size) of the gradation pixel 320 and a pitch of the address event detection circuit 400 for detecting the presence or absence of firing of an address event from the event pixel 330 increases.

Here, in the above-described embodiment, for example, in the stacked chip illustrated in FIG. 5, in a region on the light receiving chip 201 having the same size as the region of one address event detection circuit 400, the gradation pixel 320 and the event pixel 330 belonging to the pixel block 310 that is the same as that of the address event detection circuit 400 can be arranged.

Therefore, it is conceivable to add the gradation pixel 320 to the surplus region on the light receiving chip 201 caused by the size difference between the gradation pixel 320 and the address event detection circuit 400. In that case, a plurality of gradation pixels 320 belong to one pixel block 310.

However, when a plurality of gradation pixels 320 are associated with one event pixel 330, the sensitivity to firing of an address event may decrease.

For example, in a distance measuring method using a structured light (hereinafter, referred to as a structured light method), it is necessary to improve the position accuracy of each dot by making the event pixel 330 finer so as to obtain the center of gravity of the dots.

On the other hand, in the structured light method, by including an on/off code in a time direction in the dots of the structured light to be emitted, that is, by blinking dots in a different pattern, it is possible to specify the dot in the structured light on the basis of the occurrence pattern of the address event in the event pixel 330, thereby, significantly simplifying signal processing in distance measurement.

Therefore, in the present embodiment, a configuration of a pixel block of interspersing and arranging a plurality of event pixels 330 in one pixel block, and receiving the sum of their currents by one address event detection circuit 400 to enable accurate acquisition of the center of gravity of the dots of the structured light without reducing sensitivity to firing of an address event will be described with an example.

Figure 41:
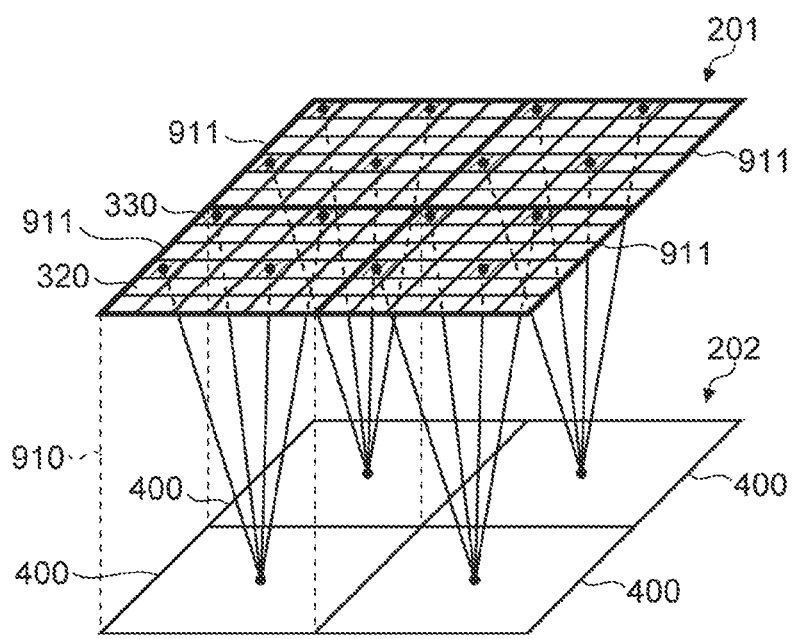
FIG. 41 is a schematic diagram illustrating a schematic configuration example of a pixel block according to an eighth embodiment.

FIG. 41 is a schematic diagram illustrating a schematic configuration example of a pixel block according to an eighth embodiment. In FIG. 41, the white cells in the light receiving chip 201 indicate the gradation pixels 320, and the hatched cells indicate the event pixels 330.

As illustrated in FIG. 41, a pixel block 910 according to the present embodiment includes one address event detection circuit 400, four event pixels 330, and 32 gradation pixels 320.

A total of 36 pixels, the event pixels 330 and the gradation pixels 320, are arranged in a 6×6 matrix. For example, if the size of the event pixel 330 and the size of the gradation pixel 320 are the same and the size is a square with a side of 1.5 μm (micrometer), the 6×6 matrix pixel array 911 is a rectangular region with all sides of 6 μm. In that case, the size of the address event detection circuit 400 in the detection chip 202 may be a rectangular region with all sides of 6 μm.

In the pixel array 911 in each pixel block 910, the event pixels 330 are interspersed at equal intervals (for example, every two in the vertical direction and the horizontal direction). By interspersing the event pixels 330 at equal intervals in this way, it is possible to accurately obtain the center of gravity of the dots of the structured light.

The four event pixels 330 of the same pixel block 910 are connected to the same address event detection circuit 400. As described above, the address event detection circuit 400 receives the sum of currents from a plurality of (four in this example) event pixels 330, so that the center of gravity of the dots of the structured light can be accurately obtained without reducing the sensitivity to firing of an address event.

As described above, according to the present embodiment, by interspersing and arranging a plurality of event pixels 330 in one pixel block 910, and receiving the sum of their currents by one address event detection circuit 400, it is possible to accurately acquire the center of gravity of the dots of the structured light without reducing sensitivity to firing of an address event.

8.1 Modification

In the eighth embodiment, a case where a plurality of event pixels 330 are interspersed in one pixel block 910, and thereby, the center of gravity of the dots of the structured light is accurately obtained without reducing the sensitivity to firing of an address event is exemplified. However, the configuration is not limited to this.

For example, the size of the light receiving region of the event pixel 330 included in one pixel block 1010 may be increased. For example, as in the modification of the eighth embodiment illustrated in FIG. 42, the size of the light receiving region of one event pixel 330 may be the same as the size of the light receiving region of 2×2 gradation pixels 320. In that case, the event pixels 330 are arranged using the 2×2 pixel region in the 6×6 pixel array 1011.

Even with such a configuration, it is possible to expand the light receiving region of the event pixel 330 to improve the sensitivity to firing of an address event, so that the center of gravity of the dots of the structured light can be accurately obtained without reducing the sensitivity to firing of an address event.

Figure 42:
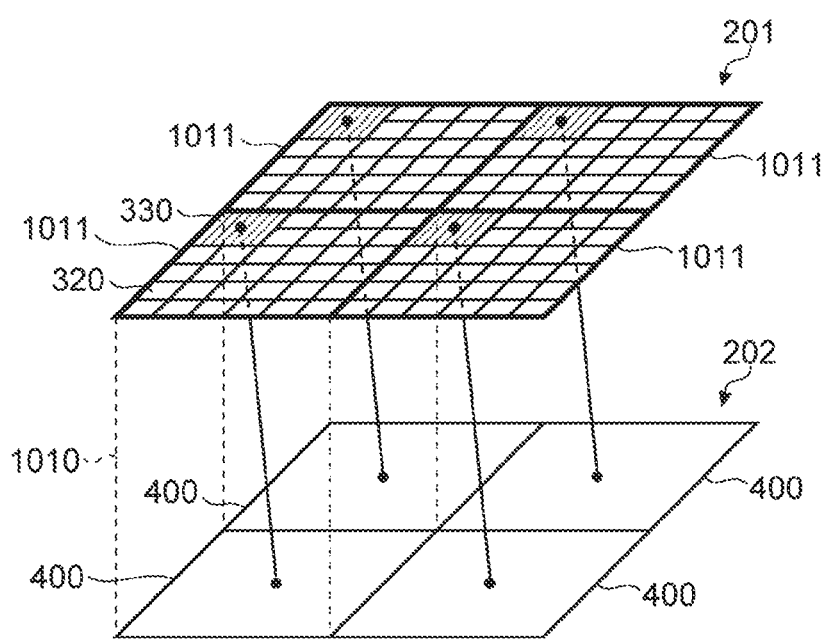
FIG. 42 is a schematic diagram illustrating a schematic configuration example of a pixel block according to a modification of the eighth embodiment.

In the pixel array 911 illustrated in FIG. 41, the size of the light receiving region of each event pixel 330 may be increased as illustrated in FIG. 42.

9. Application Example to Mobile Body

The technology according to the present disclosure (the present technology) can be applied to various products. For example, the technology according to the present disclosure may be realized as a device mounted on a mobile body of any kind such as an automobile, an electric vehicle, a hybrid electric vehicle, a motorcycle, a bicycle, a personal mobility, an airplane, a drone, a ship, and a robot.

Figure 43:
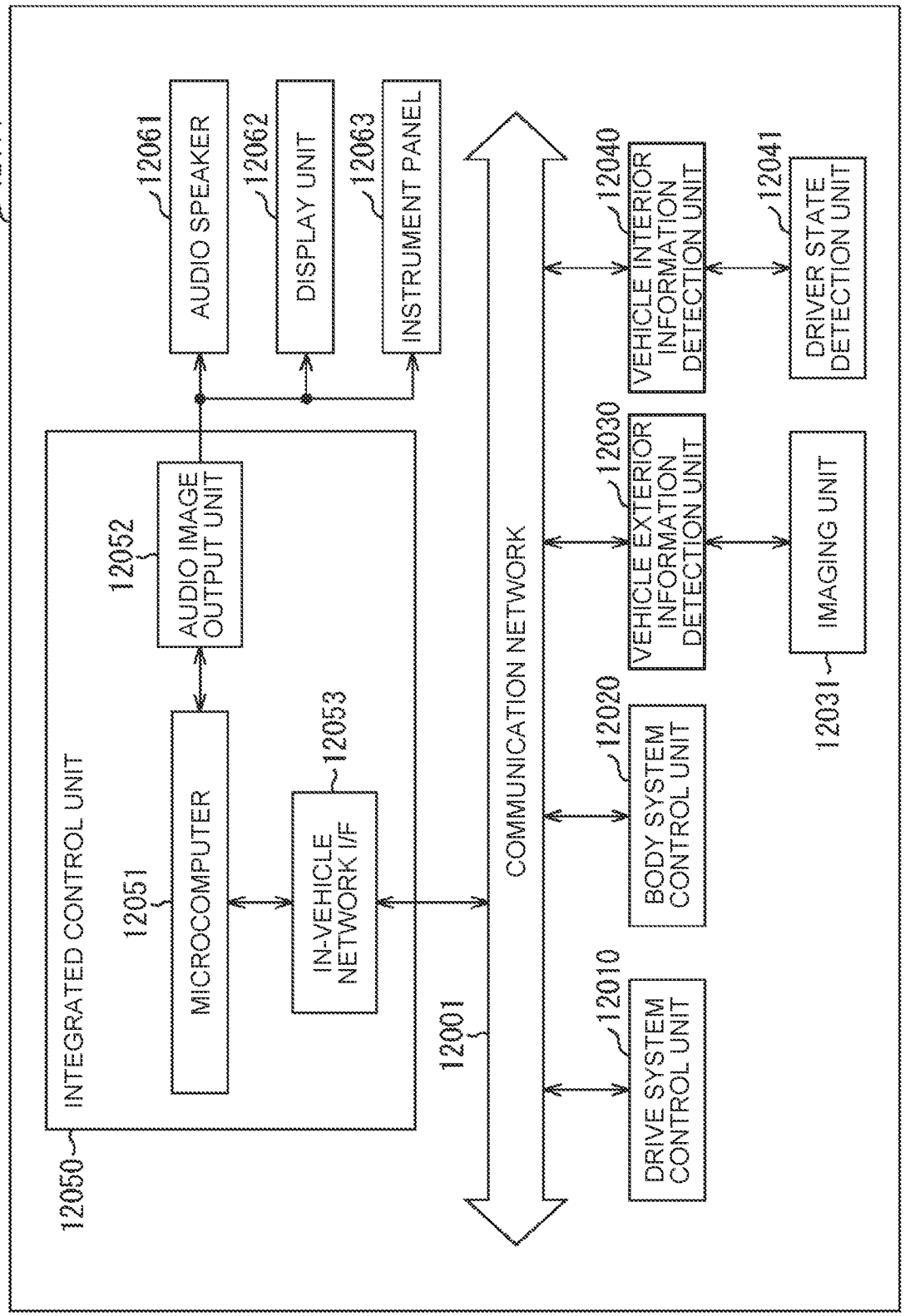
FIG. 43 is a block diagram illustrating an example of a schematic configuration of a vehicle control system.

FIG. 43 is a block diagram illustrating a schematic configuration example of a vehicle control system, which is an example of a mobile body control system to which the technology according to the present disclosure can be applied.

A vehicle control system 12000 includes a plurality of electronic control units connected via a communication network 12001. In the example illustrated in FIG. 43, the vehicle control system 12000 includes a drive system control unit 12010, a body system control unit 12020, a vehicle exterior information detection unit 12030, a vehicle interior information detection unit 12040, and an integrated control unit 12050. As the functional configuration of the integrated control unit 12050, a microcomputer 12051, an audio image output unit 12052, and an in-vehicle network interface (I/F) 12053 are illustrated.

The drive system control unit 12010 controls the operation of the device related to the drive system of the vehicle according to various programs. For example, the drive system control unit 12010 functions as a control device of a driving force generation device for generating a driving force of the vehicle such as an internal combustion engine or a driving motor, a driving force transmission mechanism for transmitting the driving force to the wheels, a steering mechanism for adjusting a steering angle of the vehicle, and a braking device for generating a braking force of the vehicle.

The body system control unit 12020 controls the operation of various devices mounted on the vehicle body according to various programs. For example, the body system control unit 12020 functions as a keyless entry system, a smart key system, a power window device, or a control device for various lamps such as headlamps, back lamps, brake lamps, blinkers, or fog lamps. In this case, the body system control unit 12020 may receive an input of radio waves transmitted from a portable device that substitutes for the key or signals of various switches. The body system control unit 12020 receives the input of these radio waves or signals and controls a door lock device, a power window device, lamps, and the like of the vehicle.

The vehicle exterior information detection unit 12030 detects information outside the vehicle mounted with the vehicle control system 12000. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for a person, a vehicle, an obstacle, a sign, characters on the road surface, or the like on the basis of the received image.

The imaging unit 12031 is an optical sensor that receives light and outputs an electric signal according to the amount of the light received. The imaging unit 12031 can output an electric signal as an image or can output an electric signal as distance measurement information. The light received by the imaging unit 12031 may be visible light or invisible light such as infrared light.

The vehicle interior information detection unit 12040 detects vehicle interior information. For example, a driver state detection unit 12041 that detects the driver's state is connected to the vehicle interior information detection unit 12040. The driver state detection unit 12041 includes, for example, a camera that images the driver, and the vehicle interior information detection unit 12040 may determine the degree of fatigue or concentration of the driver or may determine whether the driver is dozing on the basis of the detection information input from the driver state detection unit 12041.

The microcomputer 12051 can calculate the control target values of the driving force generation device, the steering mechanism, or the braking device on the basis of the interior and exterior information of the vehicle acquired by the vehicle exterior information detection unit 12030 or the vehicle interior information detection unit 12040, and output a control command to the drive system control unit 12010. For example, the microcomputer 12051 can perform coordinated control for the purpose of realizing the advanced driver assistance system (ADAS) functions including vehicle collision avoidance or impact mitigation, follow-up driving based on inter-vehicle distance, vehicle speed maintenance driving, vehicle collision warning, or vehicle lane deviation warning.

The microcomputer 12051 controls the driving force generation device, the steering mechanism, the braking device, or the like on the basis of the information on the periphery of the vehicle acquired by the vehicle exterior information detection unit 12030 or the vehicle interior information detection unit 12040, so that the microcomputer 12051 can perform coordinated control for the purpose of automatic driving in which the vehicle travels autonomously without depending on the driver's operation.

The microcomputer 12051 can output a control command to the body system control unit 12020 on the basis of the information on the outside of the vehicle acquired by the vehicle exterior information detection unit 12030. For example, the microcomputer 12051 can control the headlamps according to the position of the preceding vehicle or the oncoming vehicle detected by the vehicle exterior information detection unit 12030, and perform coordinated control for the purpose of anti-glare such as switching the high beam to the low beam.

The audio image output unit 12052 transmits an output signal of at least one of audio and image to an output device capable of visually or audibly notifying the passenger of the vehicle or the outside of the vehicle of information. In the example of FIG. 43, an audio speaker 12061, a display unit 12062, and an instrument panel 12063 are exemplified as output devices. The display unit 12062 may include, for example, at least one of an onboard display and a heads-up display.

Figure 44:
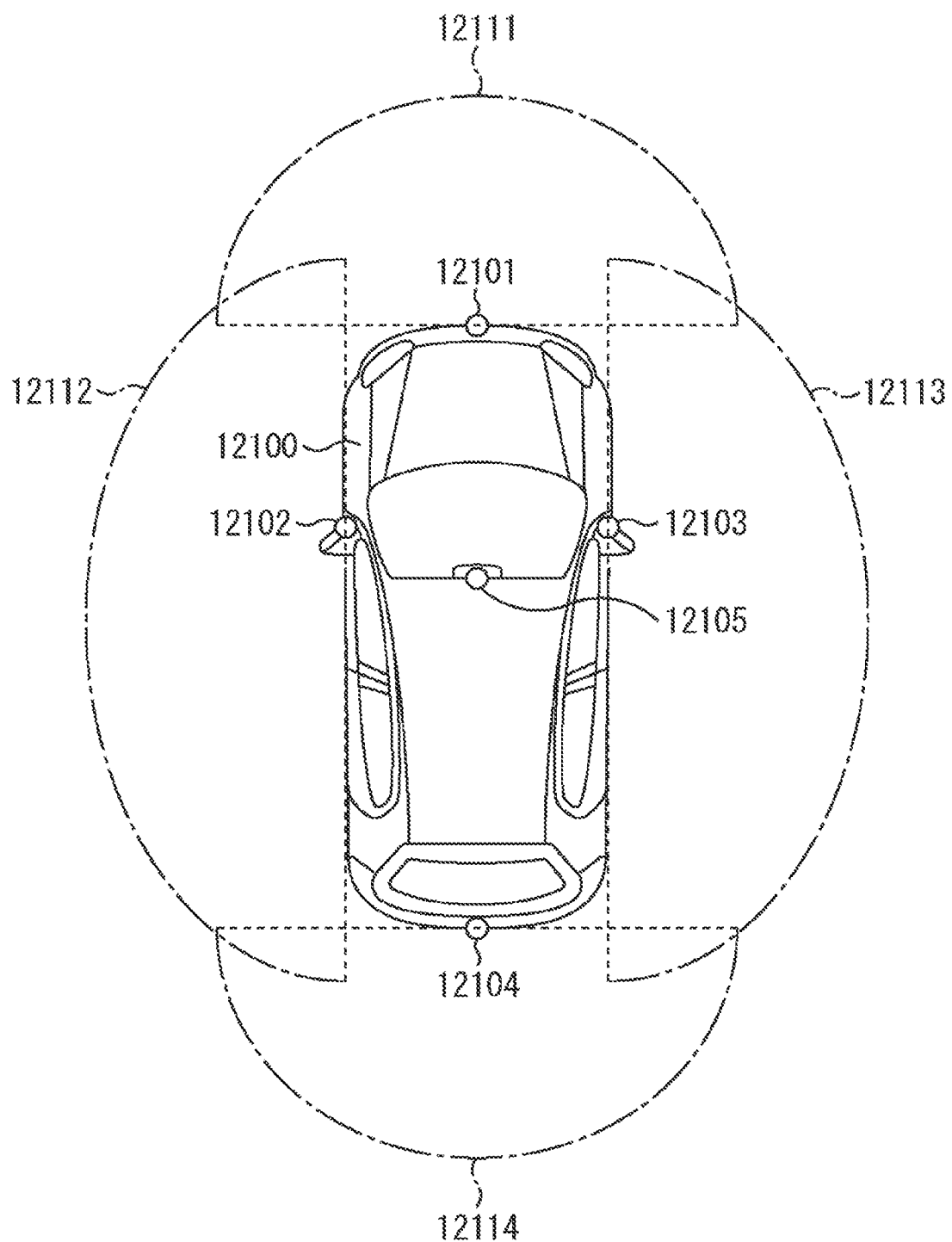
FIG. 44 is an explanatory diagram illustrating an example of installation positions of a vehicle exterior information detection portion and an imaging unit.

FIG. 44 is a diagram illustrating an example of the installation position of the imaging unit 12031.

In FIG. 44, as the imaging unit 12031, imaging units 12101, 12102, 12103, 12104, and 12105 are provided.

The imaging units 12101, 12102, 12103, 12104, and 12105 are provided at positions such as, for example, the front nose, side mirrors, rear bumpers, back doors, and the upper part of the windshield of the vehicle interior of a vehicle 12100. The imaging unit 12101 provided on the front nose and the imaging unit 12105 provided on the upper part of the windshield in the vehicle interior mainly acquire an image in front of the vehicle 12100. The imaging units 12102 and 12103 provided in the side mirrors mainly acquire images of the side of the vehicle 12100. The imaging unit 12104 provided on the rear bumper or the back door mainly acquires an image of the rear of the vehicle 12100. The imaging unit 12105 provided on the upper part of the windshield in the vehicle interior is mainly used for detecting a preceding vehicle, a pedestrian, an obstacle, a traffic light, a traffic sign, a lane, or the like.

FIG. 44 illustrates an example of the imaging range of the imaging units 12101 to 12104. The imaging range 12111 indicates the imaging range of the imaging unit 12101 provided on the front nose, the imaging ranges 12112 and 12113 indicate the imaging ranges of the imaging units 12102 and 12103 provided on the side mirrors, and an imaging range 12114 indicates the imaging range of the imaging unit 12104 provided on the rear bumper or the back door. For example, by superimposing the image data captured by the imaging units 12101 to 12104, a bird's-eye view image of the vehicle 12100 as viewed from above can be obtained.

At least one of the imaging units 12101 to 12104 may have a function of acquiring distance information. For example, at least one of the imaging units 12101 to 12104 may be a stereo camera composed of a plurality of imaging elements, or may be an imaging element having pixels for phase difference detection.

For example, the microcomputer 12051 can obtain the distance to each three-dimensional object within the imaging range 12111 to 12114 and the temporal change of this distance (relative velocity with respect to the vehicle 12100) on the basis of distance information obtained by the imaging units 12101 to 12104, and thus it is possible to extract as the preceding vehicle a three-dimensional object that is the closest three-dimensional object on the traveling path of the vehicle 12100 and that travels in substantially the same direction as the vehicle 12100 at a predetermined speed (for example, 0 km/h or more). The microcomputer 12051 can set an inter-vehicle distance to be secured in front of the preceding vehicle in advance, and can perform automatic braking control (including follow-up stop control), automatic acceleration control (including follow-up start control), and the like. As described above, coordinated control can be performed for the purpose of automatic driving or the like in which the vehicle travels autonomously without depending on the driver's operation.

For example, the microcomputer 12051 can extract three-dimensional object data related to a three-dimensional object by classifying the three-dimensional data into two-wheeled vehicles, ordinary vehicles, large vehicles, pedestrians, and other three-dimensional objects such as electric poles on the basis of the distance information obtained from the imaging units 12101 to 12104, and use the result for automatic avoidance of obstacles. For example, the microcomputer 12051 identifies obstacles around the vehicle 12100 into obstacles that are visible to the driver of the vehicle 12100 and obstacles that are difficult to view. Then, the microcomputer 12051 determines the collision risk indicating the risk of collision with each obstacle, and when the collision risk is equal to or higher than the set value and there is a possibility of collision, the microcomputer 12051 outputs an alarm to the driver via the audio speaker 12061 or the display unit 12062, or performs forced deceleration and avoidance steering via the drive system control unit 12010, so that driving support for collision avoidance can be provided.

At least one of the imaging units 12101 to 12104 may be an infrared camera that detects infrared rays. For example, the microcomputer 12051 can recognize a pedestrian by determining whether or not a pedestrian is present in the captured image of the imaging units 12101 to 12104. Such pedestrian recognition is, for example, performed by the procedure of extracting feature points in the captured image of the imaging units 12101 to 12104 as an infrared camera, and the procedure of determining whether or not an object is a pedestrian by performing pattern matching processing on a series of feature points indicating the outline of the object. When the microcomputer 12051 determines that a pedestrian is present in the captured images of the imaging units 12101 to 12104 and recognizes a pedestrian, the audio image output unit 12052 causes the display unit 12062 to superimpose and display a square contour line for emphasizing the recognized pedestrian. The audio image output unit 12052 may control the display unit 12062 so as to display an icon or the like indicating a pedestrian at a desired position.

An example of the vehicle control system to which the technology according to the present disclosure can be applied has been described above. The technology according to the present disclosure can be applied to, for example, the imaging unit 12031 among the configurations described above. Specifically, the imaging apparatus 100 of FIG. 1 can be applied to the imaging unit 12031. By applying the technology according to the present disclosure to the imaging unit 12031, the power consumption of the imaging unit 12031 can be reduced, so that the power consumption of the entire vehicle control system can be reduced.

The above-described embodiment shows an example for embodying the present technology, and the matters in the embodiment and the matters specifying the invention in the claims have a corresponding relationship with each other. Similarly, the matters specifying the invention in the claims and the matters in the embodiment of the present technology having the same names as those of the matters specifying the invention in the claims have a corresponding relationship with each other. However, the present technology is not limited to the embodiment, and can be embodied by applying various modifications to the embodiment without departing from the gist thereof.

The processing procedure described in the above-described embodiment may be regarded as a method having these series of procedures, and may be regarded as a program for causing a computer to execute these series of procedures or a recording medium for storing the program. As this recording medium, for example, a compact disc (CD), a MiniDisc (MD), a digital versatile disc (DVD), a memory card, a Blu-ray (registered trademark) Disc, and the like can be used.

The effects described in the present specification are merely examples and are not limited, and there may be other effects.

Note that the present technology can also have the following configurations.

(1)

A solid-state imaging apparatus comprising:
- a pixel array unit including a plurality of pixel blocks arrayed in a matrix; and
- a drive circuit that generates a pixel signal in a first pixel block in which firing of an address event is detected among the plurality of pixel blocks,
- each of the plurality of pixel blocks including
- a first photoelectric conversion element that generates an electric charge according to an amount of incident light,
- a detection unit that detects the firing of the address event based on the electric charge generated in the first photoelectric conversion element,
- a second photoelectric conversion element that generates an electric charge according to an amount of incident light, and
- a pixel circuit that generates a pixel signal based on the electric charge generated in the second photoelectric conversion element.

(2)

The solid-state imaging apparatus according to (1), wherein the drive circuit generates a pixel signal in each of a plurality of second pixel blocks included in a row to which the first pixel block belongs.

(3)

The solid-state imaging apparatus according to (2), further comprising a conversion unit that reads the pixel signal generated by each of the plurality of second pixel blocks in parallel.

(4)

The solid-state imaging apparatus according to (2) or (3), further comprising an arbitration unit that, when there are a plurality of the first pixel blocks and at least one of the plurality of the first pixel blocks belongs to a different row, determines a reading order for each of the rows to which one or more of the first pixel blocks belong.

(5)

The solid-state imaging apparatus according to (4), wherein the arbitration unit includes the drive circuit.

(6)

The solid-state imaging apparatus according to (4) or (5),
- wherein the first pixel block outputs a request for arbitration of a reading order for the row to which the first pixel block belongs to the arbitration unit,
- the arbitration unit includes a plurality of latch circuits provided one-to-one for each row and temporarily to hold the request input from respective corresponding rows,
- each of the latch circuits inputs the request that is being held to the arbitration unit in synchronization with a clock input from an outside, and
- the arbitration unit determines the reading order based on the request input via the latch circuit.

(7)

The solid-state imaging apparatus according to any one of (1) to (6), wherein the drive circuit generates the pixel signal in at least one third pixel block of the plurality of pixel blocks at a predetermined cycle.

(8)

The solid-state imaging apparatus according to (7), further comprising
- an arbitration unit that, when there are a plurality of the first pixel blocks and at least one of the plurality of the first pixel blocks belongs to a different row, determines a reading order for each of a plurality of the rows to which one or more of the first pixel block belong, wherein the arbitration unit includes an address storage unit that stores address information that identifies a position in the pixel array unit of the first pixel block in which the address event has been detected within a predetermined period, and
- the drive circuit generates the pixel signal at the predetermined cycle using, as the third pixel block, a plurality of second pixel blocks included in a row to which the first pixel block identified by the address information stored in the address storage unit belongs.

(9)

The solid-state imaging apparatus according to (7) or (8), further comprising a signal processing unit that increases or decreases a gradation value indicated by a pixel signal that has been read at the predetermined cycle from the third pixel block based on a number of address events that have been detected in the third pixel block within a period prescribed at the predetermined cycle.

(10)

The solid-state imaging apparatus according to (1), wherein each of the plurality of pixel blocks further includes a memory that temporarily holds an electric charge generated in the second photoelectric conversion element, and when the first pixel block detects firing of the address event, the drive circuit generates a pixel signal to the first pixel block based on the electric charge held in the memory of the first pixel block.

(11)

The solid-state imaging apparatus according to (10), further comprising
- an arbitration unit that, when there are a plurality of the first pixel blocks and at least one of the plurality of the first pixel blocks belongs to a different row, determines a reading order for each of a plurality of the rows to which one or more of the first pixel blocks belong, wherein the arbitration unit includes an address storage unit that stores address information that identifies a position in the pixel array unit of the first pixel block in which the address event has been detected within a predetermined period, and
- the drive circuit generates the pixel signal at the predetermined cycle in a plurality of second pixel blocks included in a row to which the first pixel block identified by the address information stored in the address storage unit belongs.

(12)

The solid-state imaging apparatus according to any one of (1) to (11),
- wherein each of the plurality of pixel blocks includes a plurality of the first photoelectric conversion elements, and
- the plurality of the first photoelectric conversion elements are connected to the detection unit.

(13)

The solid-state imaging apparatus according to (12), wherein each of the plurality of pixel blocks further includes a plurality of the second photoelectric conversion elements, the plurality of the first photoelectric conversion elements and the plurality of the second photoelectric conversion elements form a matrix array, and the plurality of the first photoelectric conversion elements are interspersed at equal intervals in the matrix array.

(14)

The solid-state imaging apparatus according to any one of (1) to (13), wherein a size of a light receiving region of the first photoelectric conversion element is larger than a size of a light receiving region of the second photoelectric conversion element.

(15)

An imaging apparatus comprising:

a solid-state imaging apparatus;

an optical system that forms an image of incident light on a light receiving surface of the solid-state imaging apparatus; and a recording unit that stores image data acquired by the solid-state imaging apparatus, the solid-state imaging apparatus including a pixel array unit including a plurality of pixel blocks arrayed in a matrix, and a drive circuit that generates a pixel signal in a first pixel block in which firing of an address event has been detected among the plurality of pixel blocks, each of the plurality of pixel blocks including a first photoelectric conversion element that generates an electric charge according to an amount of incident light, a detection unit that detects the firing of the address event based on the electric charge generated in the first photoelectric conversion element, a second photoelectric conversion element that generates an electric charge according to an amount of incident light, and a pixel circuit that generates a pixel signal based on the electric charge generated in the second photoelectric conversion element.

REFERENCE SIGNS LIST

100 IMAGING APPARATUS
110 OPTICAL SYSTEM
120 RECORDING UNIT
130 CONTROL UNIT
140 EXTERNAL I/F
150 HOST
200, 200A, 600 SOLID-STATE IMAGING APPARATUS
201 LIGHT RECEIVING CHIP
202 DETECTION CHIP
211 DRIVE CIRCUIT
212 SIGNAL PROCESSING UNIT
213, 601 Y ARBITER
220 COLUMN ADC
230, 530 AD CONVERSION UNIT
233 COMPARATOR
234 COUNTER
240, 540 CONTROL CIRCUIT
241 OR GATE
242 LEVEL SHIFTER
243 AND GATE
250 EVENT ENCODER
300 PIXEL ARRAY UNIT
306, 307 DETECTION SIGNAL LINE
308 VERTICAL SIGNAL LINE
309 ENABLE SIGNAL LINE
310, 310A, 810, 910, 1010 PIXEL BLOCK
320 GRADATION PIXEL
321, 331, 341 PHOTOELECTRIC CONVERSION ELEMENT
322 TRANSFER TRANSISTOR
323 FLOATING DIFFUSION LAYER
324 RESET TRANSISTOR
325 AMPLIFICATION TRANSISTOR
326 SELECTION TRANSISTOR
330 EVENT PIXEL
332 OFG TRANSISTOR
400 ADDRESS EVENT DETECTION CIRCUIT
400A ADDRESS EVENT DETECTION UNIT
410, 410A CURRENT-VOLTAGE CONVERSION UNIT
411, 414 LG TRANSISTOR
412 LOAD MOS TRANSISTOR
413, 415 AMPLIFICATION TRANSISTOR
420 BUFFER
430 SUBTRACTOR
431, 433 CAPACITOR
432 INVERTER
434 SWITCH
440 QUANTIZER
441, 442 COMPARATOR
450 TRANSFER UNIT
451, 453 AND GATE
452 OR GATE
454, 455 FLIP FLOP
531 MULTIPLEXER
545 SWITCHING CONTROL UNIT
544 DEMULTIPLEXER
610 GRADATION PIXEL CONTROL UNIT
611 ADDRESS GENERATION UNIT
612 DRIVER
620, 720 EVENT PROCESSING UNIT
621 ADDRESS SPECIFYING UNIT
622 LATCH CIRCUIT
623 DRIVER
721 ADDRESS STORAGE UNIT
801 MEMORY
911, 1011 PIXEL ARRAY

The invention claimed is:

1. A light detecting device, comprising:

a pixel array that includes a plurality of pixel blocks in a matrix, wherein each of the plurality of pixel blocks includes:

a first photoelectric conversion element configured to generate a first electric charge based on an amount of a first incident light;

a detection circuit configured to detect a firing of an address event based on the first electric charge;

a second photoelectric conversion element configured to generate a second electric charge based on an amount of a second incident light; and a pixel circuit configured to generate a pixel signal based on the second electric charge;

a drive circuit configured to drive a plurality of first pixel blocks of the plurality of pixel blocks to generate an analog pixel signal, wherein the plurality of first pixel blocks is driven based on the detection of the firing of the address event in a first pixel block of the plurality of pixel blocks, and the plurality of first pixel blocks is in a first row, of the matrix, to which the first pixel block belongs;
an analog to digital converter configured to convert the analog pixel signal to a digital pixel signal; and
a signal processor configured to:
execute signal processing on the digital pixel signal; and
output a processed digital pixel signal based on the execution of the signal processing.

2. The light detecting device according to claim 1, wherein the drive circuit is further configured to drive each pixel block of the plurality of first pixel blocks to generate a respective analog pixel signal in a case where the firing of the address event in the first pixel block is detected.

3. The light detecting device according to claim 2, wherein the analog to digital converter is further configured to read the respective analog pixel signal from each pixel block of the plurality of first pixel blocks in parallel.

4. The light detecting device according to claim 2, further comprising an arbitrator, wherein
the plurality of pixel blocks includes the plurality of first pixel blocks in a plurality of rows,
the plurality of rows includes the first row, and
the arbitrator is configured to determine a reading order for each row of the plurality of rows to which the plurality of first pixel blocks belongs.

5. The light detecting device according to claim 4, wherein the arbitrator includes the drive circuit.

6. The light detecting device according to claim 4, wherein
the first pixel block is configured to output, to the arbitrator, a request for arbitration of a reading order for the first row to which the first pixel block belongs,
the arbitrator includes a plurality of latch circuits one-to-one for each row of the plurality of rows,
each latch circuit of the plurality of latch circuits is configured to:
temporarily hold a request input from a respective row of the plurality of rows; and
input, to the arbitrator, the request input in synchronization with a clock,
the request input includes the request outputted from the first pixel block, and
the arbitrator is further configured to determine the reading order based on the request input.

7. The light detecting device according to claim 1, wherein the drive circuit is further configured to generate the analog pixel signal in a second pixel block of the plurality of pixel blocks at a specific cycle.

8. The light detecting device according to claim 7, further comprising an arbitrator, wherein
the plurality of pixel blocks includes the plurality of first pixel blocks in a plurality of rows,
the plurality of rows includes the first row,
the arbitrator is configured to determine a reading order for each row of the plurality of rows to which the plurality of first pixel blocks belongs,
the arbitrator includes an address storage unit configured to store address information that identifies a position, in the pixel array, of the first pixel block in which the address event has been detected within a specific period, and
the drive circuit is further configured to generate the analog pixel signal at the specific cycle using, as the second pixel block, the plurality of first pixel blocks in the first row to which the first pixel block belongs.

9. The light detecting device according to claim 7, wherein
the analog pixel signal indicates a gradation value, and
the signal processor is further configured to one of increase or decrease the gradation value based on a number of address events detected in the second pixel block within a period prescribed at the specific cycle.

10. The light detecting device according to claim 1, wherein
each of the plurality of pixel blocks further includes a memory configured to temporarily store the second electric charge, and
the drive circuit is further configured to generate the analog pixel signal to the first pixel block based on
the second electric charge held in the memory of the first pixel block, and
the detection of the firing of the address event in the first pixel block.

11. The light detecting device according to claim 10, further comprising an arbitrator, wherein
the plurality of pixel blocks includes the plurality of first pixel blocks in a plurality of rows,
the plurality of rows includes the first row,
the arbitrator is configured to determine a reading order for each row of the plurality of rows to which the plurality of first pixel blocks belongs,
the arbitrator includes an address storage unit configured to store address information that identifies a position, in the pixel array, of the first pixel block in which the address event has been detected within a specific period, and
the drive circuit is further configured to generate the analog pixel signal at a specific cycle in the plurality of first pixel blocks in the first row to which the first pixel block belongs.

12. The light detecting device according to claim 1, wherein
each of the plurality of pixel blocks further includes a plurality of first photoelectric conversion elements,
the plurality of first photoelectric conversion elements includes the first photoelectric conversion element, and
the plurality of the first photoelectric conversion elements are connected to the detection circuit.

13. The light detecting device according to claim 12, wherein
each of the plurality of pixel blocks further includes a plurality of second photoelectric conversion elements,
the plurality of second photoelectric conversion elements includes the second photoelectric conversion element,
the plurality of first photoelectric conversion elements and the plurality of second photoelectric conversion elements form a matrix array, and
the plurality of first photoelectric conversion elements are interspersed at equal intervals in the matrix array.

14. The light detecting device according to claim 1, wherein a size of a light receiving region of the first photoelectric conversion element is larger than a size of a light receiving region of the second photoelectric conversion element.

15. The light detecting device according to claim 1, wherein
the plurality of pixel blocks includes a plurality of second pixel blocks,
the plurality of second pixel blocks is in a second row of the matrix, and
in a case where the firing of the address event is undetected in a second pixel block of the plurality of second pixel blocks, the drive circuit is further configured to disable a drive operation of the plurality of second pixel blocks.

16. An imaging apparatus, comprising:
a light detecting device including:
   a pixel array that includes a plurality of pixel blocks in a matrix, wherein each of the plurality of pixel blocks includes:
      a first photoelectric conversion element configured to generate a first electric charge based on an amount of a first incident light;
      a detection circuit configured to detect a firing of an address event based on the first electric charge;
      a second photoelectric conversion element configured to generate a second electric charge based on an amount of a second incident light; and
      a pixel circuit configured to generate a pixel signal based on the second electric charge;
   a drive circuit configured to drive a plurality of first pixel blocks of the plurality of pixel blocks to generate an analog pixel signal, wherein
      the plurality of first pixel blocks is driven based on the detection of the firing of the address event in a first pixel block of the plurality of pixel blocks, and
      the plurality of first pixel blocks is in a first row, of the matrix, to which the first pixel block belongs;
   an analog to digital converter configured to convert the analog pixel signal to a digital pixel signal; and
   a signal processor configured to:
      execute signal processing on the digital pixel signal; and
      output a processed digital pixel signal based on the execution of the signal processing.

17. The imaging apparatus according to claim 16, the drive circuit is further configured to drive each pixel block of the plurality of first pixel blocks in the first row to generate a respective analog pixel signal in a case where the firing of the address event in the first pixel block is detected.

18. A light detecting device, comprising:
a pixel array that includes a plurality of pixel blocks in a matrix, wherein each of the plurality of pixel blocks includes:
   a first photoelectric conversion element configured to generate a first electric charge based on an amount of a first incident light;
   a detection circuit configured to detect a firing of an address event based on the first electric charge;
   a second photoelectric conversion element configured to generate a second electric charge based on an amount of a second incident light; and
   a pixel circuit configured to generate a pixel signal based on the second electric charge;
a drive circuit configured to drive a plurality of first pixel blocks of the plurality of pixel blocks to generate a plurality of pixel signals, wherein
   the plurality of first pixel blocks is driven based on the detection of the firing of the address event in a first pixel block of the plurality of pixel blocks, and
   the plurality of first pixel blocks is in a first row, of the matrix, to which the first pixel block belongs; and
an arbitrator configured to determine, based on a plurality of requests from the plurality of first pixel blocks, a reading order for each row of a plurality of rows to which at least one of the plurality of first pixel blocks belongs.

19. The light detecting device according to claim 18, wherein in a case where the firing of the address event in the first pixel block is detected, the drive circuit is further configured to drive each pixel block of the plurality of first pixel blocks to generate a respective pixel signal of the plurality of pixel signals.

20. The light detecting device according to claim 18, wherein
   the plurality of pixel blocks includes a plurality of second pixel blocks,
   the plurality of second pixel blocks is in a second row of the matrix, and
   in a case where the firing of the address event is undetected in a second pixel block of the plurality of second pixel blocks, the drive circuit is further configured to disable a drive operation of the plurality of second pixel blocks.

* * * * *